US012094304B1

(12) United States Patent
Weaver et al.

(10) Patent No.: US 12,094,304 B1
(45) **Date of Patent: *Sep. 17, 2024**

(54) CENTRALIZED MOBILE WAGERING AND VIDEO PRESENTATION

(71) Applicant: Pilot Games, Inc., Minnetonka, MN (US)

(72) Inventors: Jon Weaver, Saint Paul, MN (US); Warren R. White, Reno, NV (US); Anthony M. Morelli, Mt. Pleasant, MI (US); William D. Hermansen, Reno, NV (US)

(73) Assignee: Pilot Games, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,136

(22) Filed: Jan. 28, 2022

Related U.S. Application Data

(63) Continuation-in-part of application No. 16/659,469, filed on Oct. 21, 2019, now Pat. No. 11,238,704, and a continuation-in-part of application No. 16/677,366, filed on Nov. 7, 2019, now Pat. No. 11,210,906, and a continuation-in-part of application No. 15/419,008, filed on Jan. 30, 2017, now Pat. No. 10,515,514, and (Continued)

(51) Int. Cl.
*G07F 17/32* (2006.01)

(52) U.S. Cl.
CPC ........ *G07F 17/329* (2013.01); *G07F 17/3211* (2013.01); *G07F 17/3223* (2013.01); *G07F 17/3227* (2013.01); *G07F 17/3237* (2013.01); *G07F 17/3241* (2013.01); *G07F 17/3258* (2013.01); *G07F 17/3276* (2013.01); *G07F 17/3288* (2013.01)

(58) Field of Classification Search
CPC ........................................................ G07F 17/34
See application file for complete search history.

(56) References Cited

U.S. PATENT DOCUMENTS

2002/0039923 A1 4/2002 Cannon et al.
2003/0064805 A1 4/2003 Wells
(Continued)

*Primary Examiner* — Jay Trent Liddle
(74) *Attorney, Agent, or Firm* — Kerr IP Group, LLC

(57) ABSTRACT

Disclosed herein is a system and method for administering a wagering game and an integrated broadcast announcement. The wagering game is facilitated by a wagering sub-system that communicates with a plurality of gaming machines over a wide area network so that each gaming machine presents a unique wagering game session having a random wagering game result. The integrated broadcast announcement is provided by a video presentation sub-system that is communicatively coupled to the wagering sub-system and at least one stationary monitor over the wide area network. The video presentation sub-system integrates a first wagering game session result associated with a first gaming machine, a second wagering game session result associated with a second gaming machine, and commentary about the first and second wagering game session results into the integrated broadcast announcement. The video presentation sub-system then communicates the integrated broadcast announcement to the stationary monitor client, which then displays the integrated broadcast announcement.

40 Claims, 45 Drawing Sheets

Related U.S. Application Data a continuation-in-part of application No. 15/418,985, filed on Jan. 30, 2017, now Pat. No. 10,453,312.

(60) Provisional application No. 62/287,922, filed on Jan. 28, 2016.

(56) References Cited

U.S. PATENT DOCUMENTS

| | | | | |
|---|---|---|---|---|
| 2005/0020358 | A1 | 1/2005 | Cram | |
| 2008/0254854 | A1* | 10/2008 | Slomiany | G07F 17/32 463/19 |
| 2009/0286604 | A1 | 11/2009 | Clowes et al. | |
| 2010/0210339 | A1 | 8/2010 | Chamberlain et al. | |
| 2011/0092276 | A1* | 4/2011 | Acres | G07F 17/3213 463/27 |
| 2011/0105208 | A1 | 5/2011 | Bickley | |
| 2011/0256924 | A1 | 10/2011 | Mcghie et al. | |
| 2014/0370959 | A1 | 12/2014 | Yacenda | |
| 2015/0379805 | A1 | 12/2015 | Harrelson et al. | |
| 2016/0030841 | A1 | 2/2016 | Perlman et al. | |
| 2016/0063817 | A1 | 3/2016 | Guinn | |
| 2017/0092074 | A1* | 3/2017 | Watkins | G07F 17/3211 |
| 2019/0143204 | A1 | 5/2019 | Aman et al. | |
| 2020/0286329 | A1 | 9/2020 | Weaver et al. | |

* cited by examiner

Figure 9B
ADD
CASH
MENU
GAME
INFO
CASH
WIN
OPEN
ADD
CASH
MENU
GAME
INFO
CASH
WIN
PLAY

920

922

1102

1200

1400

Figure 16
MegaSota
Game Night
07:54 PM
Flash Bingo Tournament:
-Compete with other players across Minnesota in a competition to get the best Flash Bingo scores in the tournament time.
-Prizes for getting the most points with a maximum number of game plays.
-One buy-in for the cost of the tournament.
-Select GAME INFO for more details.
GOOD LUCK!
FLASH BINGO
69696901
TOP DOG
Warren 2005 2016-08-26
The game starts in:
00:10:19
at 08:05 PM
CASH
$ 1,000.00
SIGN-UP NOW OPEN
Reno 1
EDIT
COST
$ 20.00
SIGN-UP
MENU
GAME INFO
$ 1,000.44
$ 1,000.00

1620

1610

Figure 17
1720
MegaSota Game Night
January 26, 2017
01:32 PM
Flash Bingo Tournament:
-Compete with other players across Minnesota in a competition to get the best Flash Bingo scores in the tournament time.
-Prizes for getting the most points (and fewest points in some games) after completing all plays.
-One buy-in for the cost of the tournament.
-Select GAME INFO for more details.
GOOD LUCK!
FLASH BINGO
TOPDOG
test 2017-01-26
The game starts in:
00:02:49
at 01:35 PM
CASH
$ 967.20
YOU ARE
taylor
SESSION START 01:35 PM
CANCEL
You may wait or go to the menu and return before the session begins
MENU
GAME INFO
$ 967.20
1710

Figure 18
MegaSota Game Night
01:15 PM
Flash Bingo Tournament:
-Compete with other players across Minnesota in a competition to get the best Flash Bingo scores in the tournament time.
-Prizes for getting the most points (and fewest points in some games) after completing all plays.
-One buy-in for the cost of the tournament.
-Select GAME INFO for more details.
GOOD LUCK!
FLASH BINGO
TOP DOG
The game starts in:
PLAYING
CASH
$ 980.00
YOU ARE
taylor
TOTAL PLAYERS
6
TOTAL REVENUE
$ 120.00
PLAY
MENU
GAME INFO
1830
1820
1810

2100

Figure 24
2400
2420
2410
MegaSota
Game Night
08:25 AM
Jackpot
$ 1,472.00
COVERALL BINGO
CASH
$ 184.00
Enter Your Screen Name
Enter Here
Coverall Sign Up:
- Compete with others players across Minnesota in a Coverall Game.
- Prizes for 1st Line Bingo, Large M and Coverall.
- Win the coverall in under 52 balls and win a Jackpot!
- Jackpot grows every game until won.
- Buy from 4 to 36 cards.
- Select GAME INFO for more details.
GOOD LUCK!
Jackpot Jungle
Warren CG 830 2016-06-25
The game starts in:
00:04:55
at 08:30 AM
You have 0 CARDS
BUY MORE CARDS
$ 20.00
MENU
GAME INFO
$ 184.00
2430
2440
2450

Figure 25
2500
2510
MegaSota
Game Night
08:30 AM
Jackpot
$ 1,488.00
Coverall Sign Up:
- Compete with others players across Minnesota in a Coverall Game.
- Prizes for 1st Line Bingo, Large M and Coverall.
- Win the coverall in under 52 balls and win a Jackpot!
- Jackpot grows every game until won.
- Buy from 4 to 36 cards.
- Select GAME INFO for more details.
GOOD LUCK!
COVERALL BINGO
Warren CG 830 2016-06-25
The game starts in:
PLAYING
at 08:30 AM
CASH
$ 164.00
PLAY
TOTAL PLAYERS
TOTAL REVENUE
$ 40.00
MENU
GAME INFO
2540
2550
2530

Figure 27
Pilot Games
Bingo
$ 4.00
JACKPOT
$ 1,488.00
GAME INFO
CASH
$ 164.00
WIN
$ 8.00
PLAYERS

2700

2720

2800

2820

3000

Figure 31
3100
NOW AVAILABLE AT PARTICIPATING BARS
PILOT GAMBLING LEAGUE
SPECIAL EVENT. WIN YOUR SEAT IN LAS VEGAS!
JOIN NOW
BECOME A
LEAGUE
CHAMPION
VIDEOS
UPCOMING EVENTS
REWARDS
CURRENT STANDINGS
OUR GAMES
PGL

MAIN SCREEN

PLAYER STANDINGS

PLAYER PROFILE

EVENT SCHEDULE

Figure 35
3500
GAMING LOCATIONS
HOME
Gaming Locations
Locations
States
Region
Map
1. Falls Bar
2. VFW - Brainerd 1647
3. Commander Bar - JJs Pub
4. Gilman Municipal Liquor Store

VENUES

VIRTUAL REWARDS

NEWS AND BLOG

3800

MWS GAMES

CENTRALIZED MOBILE WAGERING AND VIDEO PRESENTATION

CROSS-REFERENCES

This patent application is a continuation-in-part of patent application Ser. No. 16/659,469 (now U.S. Pat. No. 11,238,704) entitled CENTRALIZED MOBILE WAGERING AND VIDEO PRESENTATION, filed on Oct. 21, 2019;

this patent application is a continuation-in-part of patent application Ser. No. 16/677,366 (now U.S. Pat. No. 11,210,906) entitled CENTRALIZED TOURNAMENT GAME, filed on Nov. 7, 2019;

this patent application is a continuation-in-part of patent application Ser. No. 15/419,008 (now U.S. Pat. No. 10,515,514) entitled CENTRALIZED TOURNAMENT GAME, filed on Jan. 30, 2017 that claims the benefit of provisional patent application 62/287,922, filed on Jan. 28, 2016 which is entitled MOBILE WAGERING AND ENTERTAINMENT SYSTEM AND METHOD; and this patent application is a continuation-in-part of patent application Ser. No. 15/418,985 (now U.S. Pat. No. 10,453,312) entitled CENTRALIZED MOBILE WAGERING AND VIDEO PRESENTATION, filed on Jan. 30, 2017 that claims the benefit of provisional patent application 62/287,922, filed on Jan. 28, 2016 which is entitled MOBILE WAGERING AND ENTERTAINMENT SYSTEM AND METHOD;

the above patent applications are hereby incorporated by reference in this patent application.

FIELD

The present disclosure relates to a centralized wagering and video presentation system and method. More particularly, the various embodiments presented herein are related to a centralized wagering system and a video presentation module that accesses wagering activity on casino slot machines and prepares informational content for display on television screens in retail outlets which host the wagering activity.

BACKGROUND

Typical wagering devices include slot machines and video lottery terminals and are normally managed by various types of computer systems which monitor and control their activities. Such wagering devices are typically located in casinos, racetracks, tribal gaming locations or other authorized locations. These are generally capital-intensive operations where the high amount of play justifies a significant capital expenditure.

Smaller gaming venues, including charitable gaming venues, are challenged by such devices for several reasons: 1) play volume may not generate enough revenue to make expensive, proprietary devices cost-effective; 2) small locations cannot afford dedicated maintenance staffs to keep complex devices working; 3) considerable expertise is needed to coordinate effective operations; and, 4) such gaming devices require considerable space.

While gaming is still a popular and generally profitable enterprise, the popularity of gaming activity is not high among younger elements of the population. Indeed, most casinos and large gaming operations report an ever-increasing average age of players. This is an industry concern and results in a constant search for new ways to appeal to a younger age-group.

The systems and methods presented herein are directed to mobile devices, in combination with a video transmission system to produce a flexible, secure, low-cost gaming alternative. Additionally, the systems and methods presented herein support games which are socially-centered and may appeal to younger players. This system will be valuable as a secure low-cost method of bringing wagering systems to players in diverse retail environments, including but not limited to bars, taverns, restaurants, etc. It is anticipated that the systems will be especially valuable to charitable gaming operation in jurisdictions where such activity is permitted, as well as lotteries or other gaming organizations.

SUMMARY

A centralized gaming system and method for providing a wagering game and an integrated broadcast announcement is described. The gaming system includes a plurality of gaming machines, a wagering sub-system, a video presentation sub-system communicatively coupled to the wagering sub-system, a stationary monitor client, a first wagering game session result, and a second wagering game session result. The wagering sub-system is communicatively coupled to each of the plurality of gaming machines via a Wide Area Network (WAN) so that the wagering sub-system receives a wager input from each gaming machine over the WAN. Each wager input is associated with a particular wagering game session that is associated with a particular gaming machine. Each gaming machine accepts a player input corresponding to the wagering game session associated with the particular gaming machine from which the wager input was received, and the player input triggers a particular wagering game result for the wagering game session. The wagering sub-system receives the particular wagering game result triggered by the player input for each wagering game session. The video presentation sub-system receives the first wagering game session result associated with a first gaming machine and the second wagering game session result associated with a second gaming machine from the mobile wagering sub-system. The video presentation sub-system then generates the integrated broadcast announcement by combining the first wagering game session result, the second wagering game session result, and a commentary about the first and second game session result. The stationary monitor client is communicatively coupled to the video presentation sub-system and displays the integrated broadcast announcement from the video presentation sub-system.

In another illustrative embodiment, a method for providing centralized wagering game sessions and an integrated broadcast announcement is described. The method includes enabling a plurality of gaming machines to receive wager inputs and communicate those wager inputs to a wagering sub-system via a wide area network, where the wager inputs are each associated with a particular wagering session. The method continues by communicatively coupling each gaming machine to the wagering sub-system via the wide area network. The method proceeds by enabling each casino gaming machine to accept a player input corresponding to the particular wagering game session associated with the gaming machine accepting the player input. The wagering sub-system receives a wagering game result that is triggered by the player input corresponding to the particular wagering game session and associated with the particular game session. A video presentation sub-system is communicatively coupled to the wagering sub-system. The video presentation sub-system then receives from the wagering sub-system a first wagering game session result corresponding to a first wagering game session that is associated with a first gaming machine, and a second wagering game session result corresponding to a second wagering game session that is associated with a second gaming machine. The video presentation sub-system combines the first wagering game session result, the second wagering game session result, and a commentary about the first wagering game session result and the second wagering game session result to generate an integrated broadcast announcement. A stationary monitor is then communicatively coupled to the video presentation sub-system via the wide area network. The stationary monitor client then receives the integrated broadcast announcement from the video presentation sub-system via the wide area network and displays the integrated broadcast announcement.

FIGURES

The present invention will be more fully understood by reference to the following drawings which are presented for illustrative, not limiting, purposes.

DESCRIPTION

Persons of ordinary skill in the art will realize that the following description is illustrative and not in any way limiting. Other embodiments of the claimed subject matter will readily suggest themselves to such skilled persons having the benefit of this disclosure. The various illustrative embodiments will now be described more fully with reference to the accompanying drawings. It should be understood that this disclosure and the claims may be embodied in many different forms and should not be construed as limited to the embodiments set forth herein. Additionally, those familiar with computing systems shall appreciate that there are many variants possible for the described systems, depending on the nature of the available networks, legal frameworks, which can open or restrict the types of locations in which the system can be operated, advances in server and networking technologies, etc.

The gaming systems and methods presented herein include a mobile wagering and entertainment system that is designed to be used in wagering applications within legal gaming frameworks. More specifically, the gaming systems and methods presented herein support centralized control of wagering that takes place in multiple wagering venues and provides an integrated broadcast capability so that an entertaining complement to the wagering can be presented on television screens in the gaming venues.

A gaming venue includes a charity, a casino and any other such authorized or licensed gaming venue. Additionally, a gaming venue includes a church, hotel, bar, restaurant, convenience store and other such locations that support licensed gaming activity. Note, that the term "gaming" refers to games of chance or games that include a chance component, in which a wager is received and the awarded prize is dependent on the outcome of the game of chance or of the chance component.

As described in further detail herein, the gaming system and method includes a Mobile Wagering Sub-system (MWS) and a Video Presentation Sub-system (VPS). The gaming system is communicatively coupled to a plurality of remote gaming venues, in which each remote gaming venue has at least one mobile client device that supports customer wagering. Additionally, each remote gaming venue may include one or more Point-of-Sale stations that manage player funds. Furthermore, each remote gaming venue may include one or more television monitors that broadcast content complimentary to wagering activities. In the illustrative embodiments presented herein, the various elements of the gaming system are communicatively and operatively coupled to one another with a network structure that includes the Internet as the backbone and at least one secure Wi-Fi network within each gaming venue.

Figure 1:
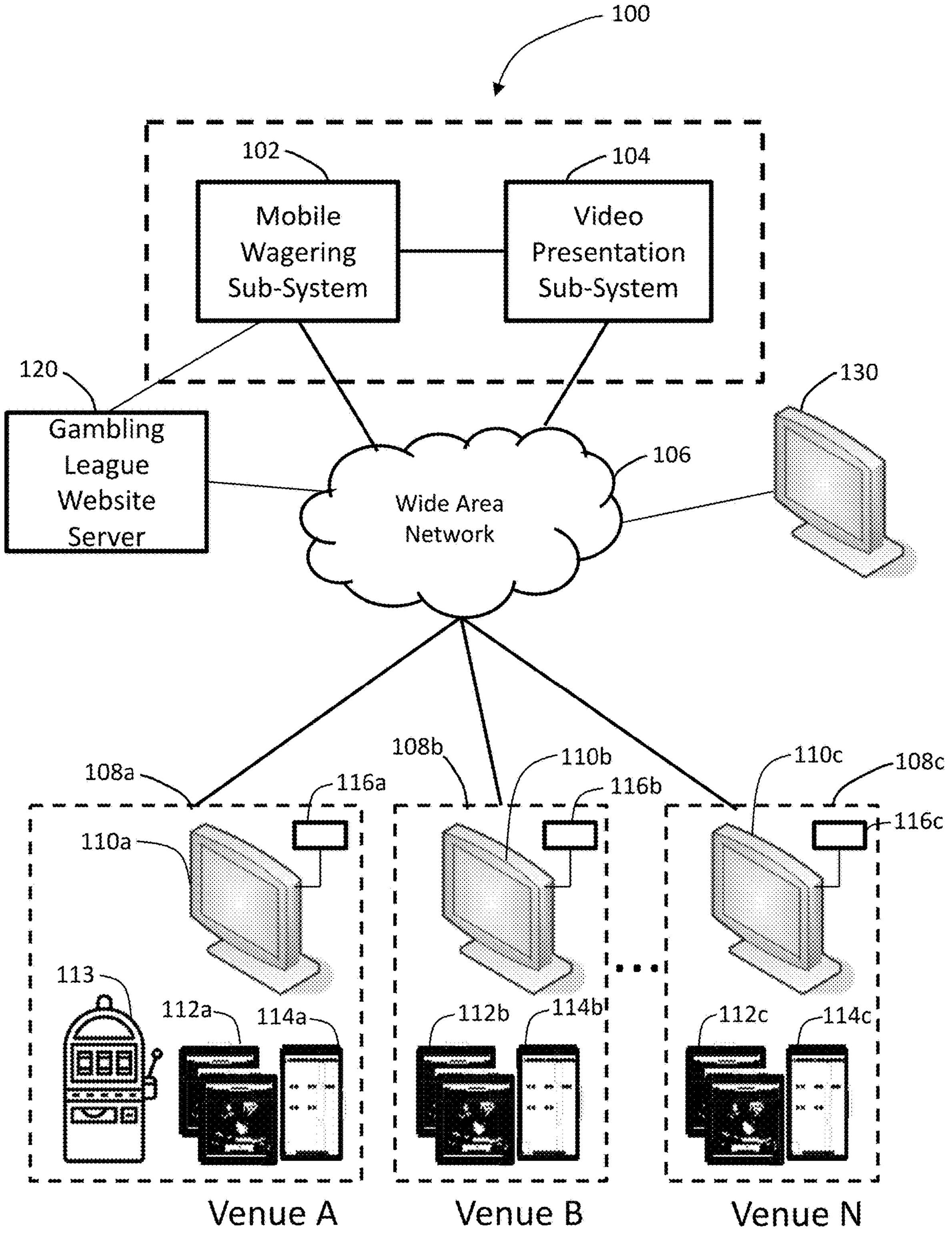
FIG. 1 shows an illustrative centralized gaming system.

Referring to FIG. 1, there is shown an illustrative centralized gaming system. The centralized gaming system 100 includes a mobile wagering sub-system 102 and a video presentation sub-system 104. The mobile wagering sub-system 102 and the video presentation sub-system 104 are communicatively coupled to one another. Additionally, the mobile wagering sub-system 102 and the video presentation sub-system 104 are communicatively coupled to a Wide Area Network 106, e.g. Internet, which is communicatively coupled to a plurality of gaming venues, namely, gaming illustrative Venue A 108*a*, Venue B 108*b* and other such gaming venues as represented by Venue N 108*c*. Each of the plurality of gaming venues 108*a*, 108*b* and 108*c* include a stationary monitor 110*a*, 110*b* and 110*c*, respectively. Each stationary monitor 110*a*, 110*b* and 110*c* is communicatively coupled to the video presentation client 116*a*, 116*b* and 116*c*, respectively. The video presentation clients 116 are also communicatively coupled to the video presentation subsystem 104. The combination of the stationary monitor 110 and the video presentation client 116 may also be referred as a "stationary monitor client," and as such reference to "stationary monitor client" refers to the combination of the stationary monitor 110 and the video presentation client 116.

Within the system architecture each gaming venue may be associated with a sponsoring organization, e.g. a charity, and an additional business entity, e.g. a distributor. The types of venues, sponsoring organizations and other business entities will vary according jurisdictional statures and regulation.

Additionally, each of the gaming venues 108*a*, 108*b* and 108*c* include a plurality of authorized mobile devices 112*a*, 112*b* and 112*c*, respectively. Gaming venue 108*a* also includes an illustrative authorized non-mobile device 113 (slot machine), however, each gaming venue 108*a*, 108*b* and 108*c* may include illustrative authorized non-mobile devices. Further still, each of the gaming venues includes a Point-of-Sale (POS) device 114*a*, 114*b* and 114*c*. The illustrative authorized mobile devices 112 and the POS devices 114 are client devices configured to communicate with each other and the mobile wagering subsystem 102. In operation, the authorized mobile devices 112 and POS devices 114 are registered with the mobile wagering sub-system 102, which includes a database (not shown) that associates the authorized mobile devices 112 and POS devices 114 with a designated gaming venue 108. Thus, authorized mobile devices 112 and POS devices 114 are not allowed to interact with the centralized gaming system 100 when the client devices are not located at the designated gaming venue.

The illustrative authorized mobile devices 112 operate as wireless client devices that are communicatively coupled to the centralized gaming system 100. Additionally, the centralized gaming system 100 may be communicatively coupled to authorized non-mobile clients. Furthermore, other client devices such as non-mobile clients may be disposed in the gaming venues and these non-mobile clients may be communicatively coupled to the centralized gaming system 100. These authorized non-mobile client devices include, but are not limited to, wired devices such as gaming machines, slot machines, PCs, stationary monitors, Internet appliances, Internet of Things (IOT) devices and other such non-mobile devices with hardwire connections or wireless connections to the Wide Area Network 106. The non-mobile client devices may be configured to participate in the games presented herein including, but not limited to, the tournament games described hereinafter.

Operationally, client devices must integrate with the system-centric gaming requirements in which all mobile gaming and accounting activity are controlled by the mobile wagering sub-system 102 servers, and have the communications infrastructure, directly or by proxy, to interact with the server in a manner consistent with the operations of the authorized mobile devices 112 described herein. The authorized non-mobile client devices perform gaming operations and accounting locally, and transmit gaming and accounting outputs to the mobile wagering sub-system 102 servers to facilitate inclusion of authorized non-mobile client devices in tournament games with both authorized mobile and non-mobile client devices.

The illustrative gaming system 100 includes a plurality of server applications that are configured to provide high-availability and redundancy, process all inputs and generates outputs. The illustrative gaming system 100 includes three different types of network communications. Firstly, there are network communications between the internal server components, namely, the mobile wagering sub-system 102 and the video presentation sub-system 104. Secondly, there are network communications between the server components, e.g. the mobile wagering sub-system 102 and the video presentation sub-system 104, and the remote gaming venues 108*a*, 108*b* and 108*c*, as well as the Gambling League Website server 120. Thirdly, there are network communications within the gaming venues 108*a*, 108*b*, and 108*c*.

With respect to network communications between the internal server components, the illustrative server components operate as a single network, in which the servers can communicate with one another using service requests. By way of example and not of limitation, the illustrative internal server components have two internet protocol addresses, namely, a Private IP used to maintain the server network and ensuring secure server-to-server communication, and a Public IP that is bound to the Internet and that provides access to server services through high security communications such as HTTPS. The internal server components use their private IPs for server-to-server communication so that these services are not exposed to the Internet, the game application running on the authorized mobile devices and the POS devices.

By way of example and not of limitation, each server is configured with an SSL certificate which supports HTTPS calls. The illustrative server is configured to forward some requests it receives through HTTPS to a local port, and the requests that are allowed to pass are only those available to authorized "Game" and "POS" devices. This illustrative configuration ensures that only very specific requests are allowed from the public IP.

By way of example and not of limitation the servers are implemented using the Linux operating system using Restful programming techniques using Java as the programming language with Jersey RS support. Database structures are contained in a MySQL database.

Communication between the server components, namely, the mobile wagering sub-system 102 and the video presentation sub-system 104, and the remote client devices is performed over a wide-area network 106. As described above, these network communications are performed using secure SSL communications over the Internet. In some embodiments, the network communications between the wagering sub-system 102 and the video presentation sub-system 104 are performed using secure SSL communications over the Internet. In some embodiments, the network communications between the wagering sub-system 102 and the authorized mobile devices 112 are performed using secure SSL communications over the Internet. In some embodiments, the network communications between the wagering sub-system 102 and the authorized non-mobile devices 113 are performed using secure SSL communications over the Internet.

Figure 2:
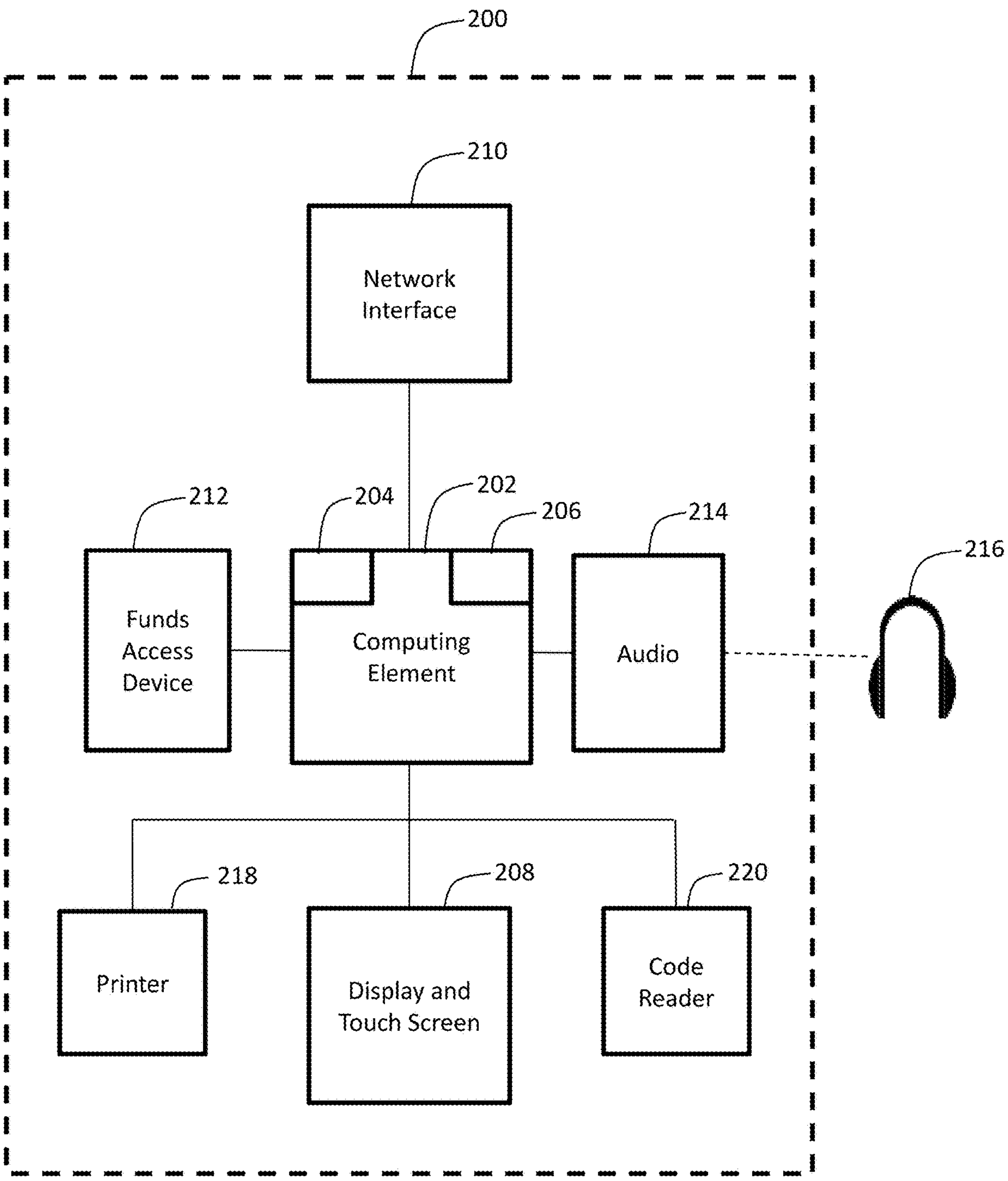
FIG. 2 shows an illustrative authorized mobile device or point-of-sale device.

The authorized mobile devices 112*a*, 112*b* and 112*c* are also referred to as a "player interface unit." An illustrative authorized mobile device is presented in FIG. 2. Operationally, each authorized mobile device 112 in an illustrative embodiment is associated with a player account.

By way of example and not of limitation, the player account is described as a short-term, anonymous entity tied to the client device being used by the player, and which expires when the fund balance drops to zero. However, it is possible in other embodiments to have player accounts which may exist for longer time periods and be tied to a player.

Additionally, it should be noted that while the illustrative embodiments presented herein generally describe financial transactions such as adding funds or cashing out at the POS device 114, in different regulatory environments or with different technology, such player accounts can have financial transactions originating at the player device or any other client device that may be configured to support POS transaction. Also, the financial transactions may be supported at a system level with a server component or server module that provides a web portal functions for financial transactions. Thus, the financial transactions may be performed by the client device, a server component, a server module, or any combination thereof. Depending on regulatory issues and available technology, financial transactions may be based on cash, credit cards, debit cards, digital currency or other mediums of finance.

Referring now to FIG. 2, there is shown an illustrative player interface unit 200. The player interface unit 200 can comprise the authorized mobile device 112, the point-of-sale device 114, and any combination thereof. For example, the illustrative player interface unit 200 may be one of the plurality of authorized mobile devices 112 that are associated with each venue. The illustrative player interface unit 200 includes a central computing element 202 with a processor 204 and memory storage 206. One or more games may be pre-installed on the player interface unit 200 before the player interface units are deployed in a gaming venue or other such production environment. Alternatively, the illustrate game title files may be stored in a remote server, e.g. an "App" store, and the player interface unit 200 may be configured to download the game title file, run the game title file and enable the user to interact with the corresponding game title.

The player interface unit 200 also includes a color display with a touch-screen 208 and a network interface component 210, which provides network access to a local area network, a wide area network or any combination thereof. By way of example and not of limitation the network interface component supports a wireless local area network such as a Wi-Fi network, which is based on IEEE 802.11 standards. Additionally, the player interface unit 200 may communicate with the wide area network 106 via the illustrative Wi-Fi network. The communication between the player interface unit 200 and the mobile wagering sub-system 102 may be performed using the illustrative HTTPS protocol or other such secure networking protocol that allows game session inputs, commands and outputs to be communicated securely across the Wide Area Network.

In an illustrative embodiment, the player interface unit 200 may be a tablet computing device running iOS or Android operating systems. The illustrative player interface unit may also include a Funds Access Device module 212 that may be configured to have a custom locked profile to evade security-bypassing attempts. The Funds Access Devices (FAD) 212 may also provide alternative methods for starting play sessions or adding funds to existing sessions. By way of example and not of limitation, the Funds Access Device module 212 may include currency readers and debit/credit card readers such as a magnetic stripe reader, a smart-card reader, an infra-red reader, a Near-Field-Communications reader and other such financial transaction readers.

The player interface unit 200 may also include an audio system component 214 that enhances the game-playing experience for the players. The audio system component 214 may also include a standard audio jack so that a player can use wired or wireless headphones 216 to improve the game audio environment without disturbing others.

In one illustrative embodiment, the player interface unit 200 may include a printer 218 and a code reader 220. By way of example and not of limitation, the printer 218 generates vouchers. The illustrative code reader 220 may be embodied as a bar-code reader that is configured to read vouchers generated by the printer.

By way of example and not of limitation, the player interface unit 200 may be configured to include a "HELP" button in the game client that also dispatches a signal to the POS to notify the operator that the player is requesting assistance. The player interface unit 200 may also be configured to include a text-to-speech functionality to aid a visually impaired player. Additionally, the player interface unit 200 may include a gaming application that downloads files, decompresses the downloaded files if they have been compressed, and caches all assets inside the player interface unit 200. The player interface unit 200 supports dynamic updates without the need to update the game client itself.

Referring now to FIG. 1 and FIG. 2, the mobile wagering sub-system 102 is communicatively coupled to a plurality of authorized mobile devices 112 such as illustrative player interface unit 200 presented in FIG. 2. In one illustrative embodiment, the mobile wagering sub-system 102 receives a wager input for a game session from the illustrative player interface unit 200. In another illustrative embodiment, the mobile wagering sub-system 102 receives the wager input for a game session from a plurality of authorized mobile devices 112 and/or non-mobile devices, which may disposed at one or more venues as presented in FIG. 1.

The illustrative player interface unit 200 presents a user interface on touch screen 208 that shows a plurality of game content associated with different types of game sessions. In the illustrative embodiment, the player interface unit 200 may also accept player inputs that are associated with a game session. The game session may perform various operations as described in further detail below.

In the illustrative embodiment, the video presentation sub-system 104 is communicatively coupled to the mobile wagering sub-system 102, the video presentation client 116, and the stationary monitors 110 disposed in the different gaming revenues. The video presentation sub-system 104 generates entertainment output associated with ongoing activity in the mobile gaming system.

One or more of the stationary monitors 110 then receives the entertainment output generated by the video presentation sub-system. The stationary monitors 110*a*, 110*b* and 110*c* then proceed to display the entertainment output generated by the video presentation sub-system 104.

In the illustrative embodiment, a first plurality of authorized devices 112*a* associated with a first gaming venue 108*a* includes a first stationary monitor 110*a* and first video presentation client 116*a*. Additionally, a second plurality of authorized devices 112*b* associated with a second gaming venue 108*b* includes a second stationary monitor 110*b* and second video presentation client 116*b*. The first stationary monitor 110*a* and the second stationary monitor 110 are both communicatively coupled to video presentation sub-system 104. The video presentation sub-system 104 may have stored thereon an entertainment output, such as a video, that is associated with wagering activity. The video presentation sub-system 104 communicates the output, e.g. video, to the first stationary monitor 110*a* and the second stationary monitor 110*b* via the video presentation client 116*a* and 116*b*, respectively.

By way of example and not of limitation, for an illustrative bingo tournament game that includes a bingo game session, the various stationary monitors 110*a*, 110*b* and 110*c* may present a bingo video related to the bingo tournament game. Thus, a plurality of different authorized device from different gaming venues 108 can participate in the bingo tournament game and share a similar video experience.

Figure 3:
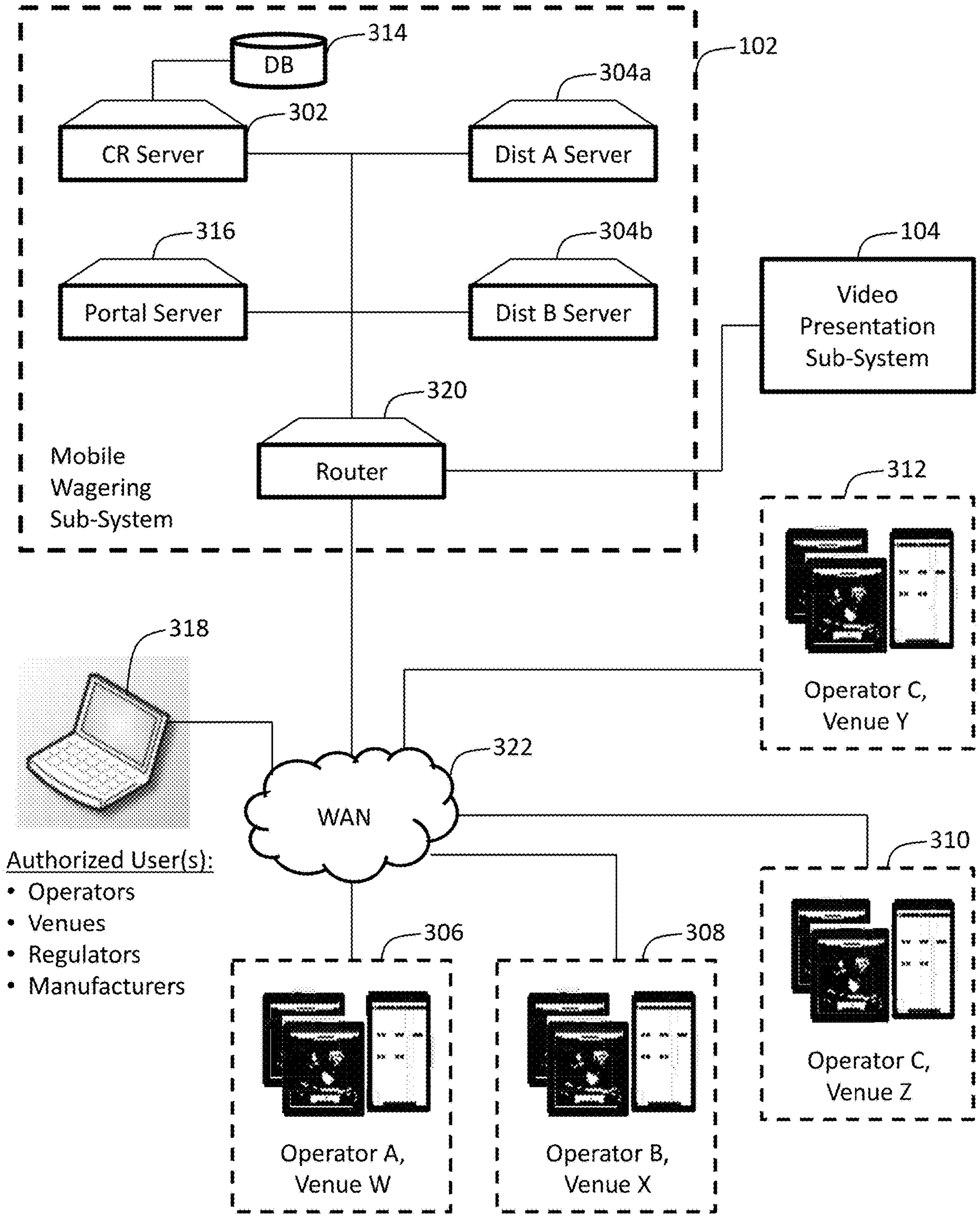
FIG. 3 shows detail of the mobile wagering sub-system.

Referring to FIG. 3, there is shown further detail for the mobile wagering sub-system 102 communicatively coupled to different venues. In an illustrative embodiment, the mobile wagering system functionality is distributed on multiple servers, including those that provide database 314 functionality. The illustrative mobile wagering sub-system 102 includes a centralized resource server 302 or centralized manufacturer server that performs as a coordinating entity for system operation and maintains authority over game operations controlled by the centralized gaming system 100. The mobile wagering sub-system 102 also includes a distributor server 304 that is communicatively coupled to the centralized resource server 302.

In the illustrative embodiment presented in FIG. 3, a first distributor server 304*a* and second distributor server 304*b* are also communicatively to the centralized resource server 302. Each of the illustrative distributor servers is configured to manage and control the game operations and cashier operations performed on mobile client devices at a set of gaming venues that are associated with a distributor who is responsible for sales and support of a multiplicity of venues.

For example, a first set of gaming venues 306 and 308 are configured to communicate with first distributor server 304*a*, which manages and controls the game operations at gaming venues 306 and 308. Additionally, for a second set of gaming venues 310 and 312 are configured to communicate with the illustrative second distributor server 304*b* manages and controls the game operations at gaming venues 310 and 312. Thus, multiple gaming venues may require additional distributor servers.

A variety of tasks may be performed by the centralized resource server 302. For example, one of the tasks performed by the centralized resource server 302 includes providing a central routing operation for each of the authorized mobile devices 112 so that each authorized mobile device 112 is routed to the proper distributor server 304*a* or 304*b* upon activation of each authorized mobile device. By way of example and not of limitation, the first request generated by a player interface unit 200 may direct the player interface unit 200 to an illustrative distributor of the player interface unit 200.

Additionally, the centralized resource server 302 may be configured to provide a central routing operation for cashier authentication. Thus, a cashier device may be authenticated by the appropriate distributor server 304, which may then forward an authentication to an illustrative mobile device distributor.

The centralized resource server 302 may also be configured to operate as a central authority for generation of finite decks of predetermined electronic pull-tab results.

Furthermore, the centralized resource server 302 may be configured to manage and control financial information. The centralized resource server 302 may include a centralized database 314 that stores data generated by the cashiers, authorized devices, and the various gaming venues. The centralized database 314 provides a central repository for accounting data, game play data, system configuration data, and other such data types.

The illustrative distributor servers 304 are communicatively coupled to the centralized resource server 302. Each of the distributor servers 304 may be configured to manage finances for the player accounts that are associated with the authorized devices. Additionally, the illustrative distributor servers 304 may be responsible for generating logs and reports required for the POS devices. Furthermore, the illustrative distributor servers 304 may be configured to manage game play operations, wagers and prizes. Further still, the illustrative distributor servers 304 may manage cashier operations including customer sales and redemptions. Further yet, the distributor servers 304 may be configured to maintain the financial status for the authorized mobile devices, including the actual credit balance on each player device.

In an alternative embodiment, the operations performed by the centralized resource server 302 and the distributor server 304 may be performed by a centralized resource software module (not shown) and a distributor software module (not shown) that may be associated with a client-server architecture, a distributed architecture, a peer-to-peer architecture, a hierarchical architecture, a "cloud" architecture or any combination thereof.

The mobile wagering sub-system 102 may also include an illustrative web portal server 316. The web portal server 316 provides a web interface to access system accounting and operational data, as well as to maintain and configure the system. The web portal server 316 is configured to support creating, editing and removing entities like distributors, operators, venues, cashiers, devices, game parameters and others as required. All actions performed on the portal are logged for auditing purposes. This action log can be access on the portal itself if the user has the necessary system privilege.

By way of example and not of limitation, the web portal server may be accessed from personal computers or tablet devices 318 over the internet. Authorized users having "administrator" privileges may access system reports and controls based upon their operational needs and organizational affiliation. The web portal server 316 supports a variety of different authorized users having different roles with different levels of access to the mobile wagering sub-system 102. For example, the web portal server may be configured to support the following roles: regulator, manufacturer, distributor with access to multiple operators, operator with access to multiple venues, a particular venue, a particular cashier and other such preconfigured roles.

An illustrative router 320 is disposed within the mobile wagering sub-system 102. The router 320 is communicatively coupled to a wide area network 322, e.g. Internet, which is communicatively coupled to the various venues and authorized users. Additionally, the illustrative router 320 is communicatively coupled to the portal server 316, the video presentation sub-system 104, each distributor server 304 and the centralized resource server 302. The router 320 forwards data packets to the appropriate server, network, internet appliance, sub-system and other such destination. Additionally, the router 320 may include a firewall that supports secure communications with the mobile wagering sub-system.

Figure 4A:
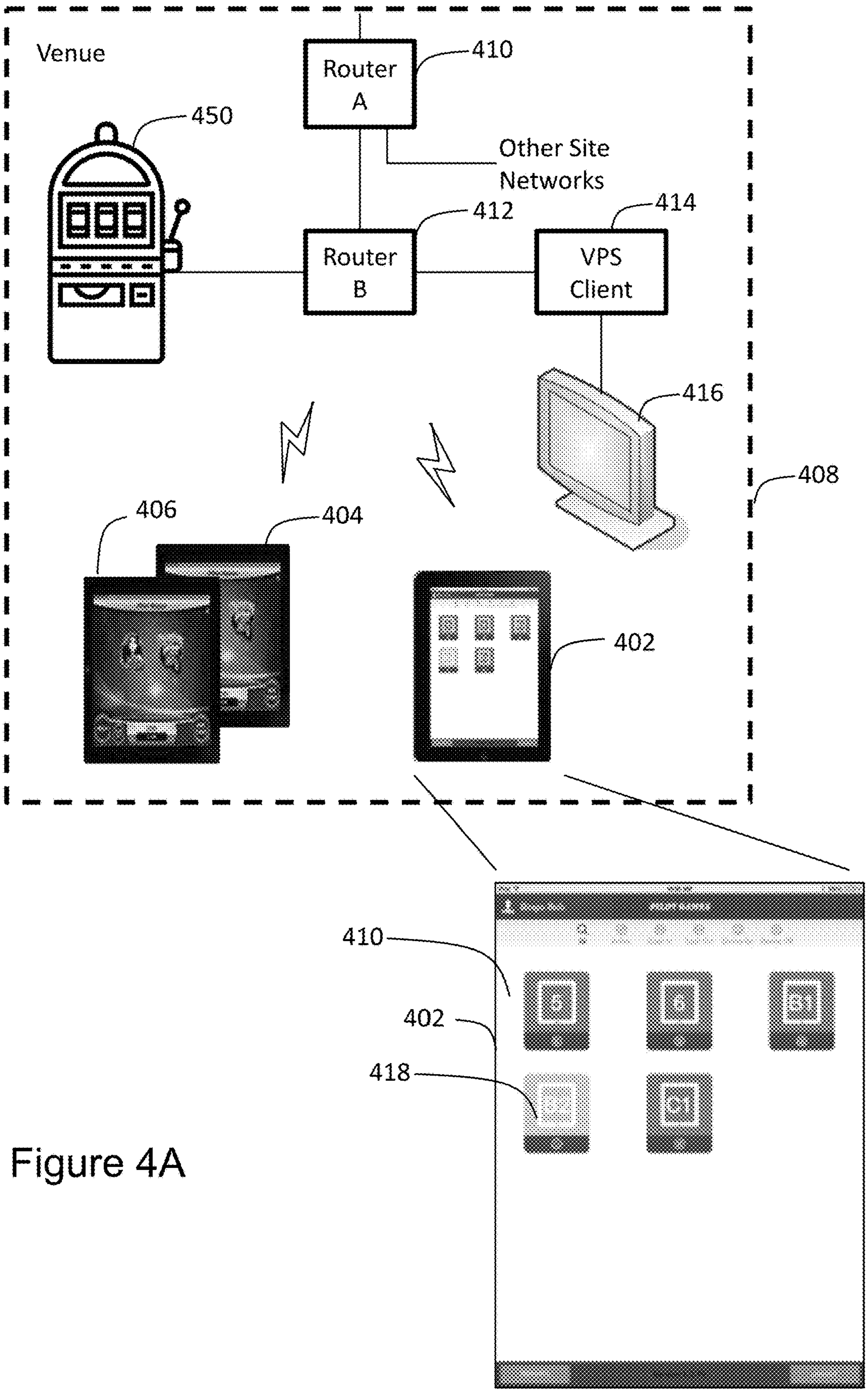
FIG. 4A shows an illustrative point-of-sale (POS) device communicatively coupled to authorized mobile and non-mobile devices in a gaming venue.

Referring now to FIG. 4A, there is shown an illustrative point-of-sale (POS) device 402 communicatively coupled to authorized devices 404, 406, 450 in a gaming venue 408. The illustrative POS device 402 is communicatively coupled to one or more authorized mobile devices 404 and 406 in gaming venue 408, and may further be communicatively coupled to one or more authorized non-mobile device 450 in the same gaming venue 408. By way of example and not of limitation, the illustrative POS device 402 is communicatively coupled to authorized mobile devices 404 and 406 with a native Socket implementation inside a Local Area Network. An exploded view of an illustrative user interface 410 corresponding to POS device 402 is also shown.

The point-of-sale device 402 is configured to manage all cash operations for the authorized mobile devices 404 and 406, such as cash-in operations and cash-out operations. The cash-in and cash-out operations may be requested by the authorized mobile device 404, the authorized mobile device 406, the POS 402 or any combination thereof.

The illustrative point-of-sale (POS) device 402 and authorized mobile devices 404 and 406 may be embodied as a mobile device as described above in FIG. 2. The illustrative POS device 402 is a client device configured to receive and operate an illustrative proprietary POS Application. The authorized mobile devices 404 and 406, as well as authorized non-mobile device 450, are client devices configured to receive and operate a proprietary Game Application. The illustrative POS device 402 and authorized mobile devices 404 and 406 are communicatively coupled with the mobile wagering sub-system 102. In the illustrative embodiment, the client devices 404, 406, 450 communicate with the mobile wagering sub-system 102 for each transaction. More generally, all wagering and accounting information is monitored and stored in the centralized gaming system 100 and the client devices always reflect the information received from the centralized gaming system 100. All game play decisions and financial data from each mobile client device 404 and 406 is hosted in the centralized gaming system and only visually reflected in the mobile client devices. Conversely, all game play decisions and financial data from each non-mobile client device 450 is hosted locally on each non-mobile client device and merely communicated for tournament accounting purposes to the centralized gaming system, i.e. the mobile wagering sub-system 102.

As shown in FIG. 4A, the illustrative wide area network 106, e.g. Internet, (shown in FIG. 1) is communicatively coupled to the illustrative gaming venue 408. In the illustrative embodiment, the illustrative wide area network terminates at Router A 410. The illustrative Router A 410 may be a pre-existing router located at the venue 408 and usable for multiple purposes, depending on the needs of the venue. For example, Router A 410 may be a component of a cable IV system. In the illustrative embodiment, a second Router B 412 is also communicatively coupled to router A 410. Illustrative Router B 412 is configured to support the requirements for communications with the mobile wagering sub-system 102 and video presentation sub-system 104.

In the illustrative embodiment, router B 412 establishes two private Wi-Fi SSIDs to be used only at a specific site. Each Wi-Fi SSID includes a security key that is unique to that site and is not available to site personnel. One SSID may be used for the exclusive use of the mobile wagering sub-system 102 and a second SSID may be provided for exclusive use of the video presentation system 104. Router B is also communicatively coupled to video presentation client 414, which is communicatively coupled to the monitor 416.

The illustrative POS 402 tablet is an electronic device that may be operated cashier in a venue. The POS device 402 provides control over financial activity within the venue. The illustrative POS Application program runs on a tablet device and supports the following illustrative operations, namely, a cash-in operation (sales), a cash-out operation (redemption) and a reporting operation.

In the illustrative embodiment, the cashier logs into the POS application program by providing a cashier user name and password. During the set-up process, the cashier name is associated with a cashier role that is associated only with a particular venue. After a successful login, the POS client retrieves relevant system information from an illustrative distributor server 304, which presents the user interface 410.

The illustrative user interface 410 associated with POS client 402 presents colored icons, in which each icon represents one of the authorized devices (such as authorized mobile devices 404 and 406) in the venue 408. Note that the illustrative authorized mobile devices 404 and 406 and the authorized non-mobile device(s) 450 may also be referred to as "a registered gaming client." By way of example, each icon 418 has a short identifier representing the local identification of the device, which is unique within that venue. For example, a grey icon may identify that the authorized mobile device has been registered with the mobile wagering sub-system; however, the authorized mobile device is not currently available for game play. Another illustrative icon may be a yellow icon, which represents that the authorized device is present and available. A green icon may represent that the authorized device has credit and is involved in a game session. A red icon may represent that a player input has been received that relates to a HELP button input command, a cash input command or a cash output command. These same indications may be provided for authorized non-mobile client devices.

In operation, an illustrative cashier that is interactive with the user interface 410 may select an icon associated with a particular authorized mobile device. After selecting the appropriate authorized mobile device, the cashier may interact with another user interface that enables the cashier to add cash to the authorized mobile device, to enable a player cash-out from the authorized mobile device, to display a log of recent play and transactional activity, which may be retrieved from the illustrative centralized resource server, the distributor server or any combination thereof.

A variety of other user interfaces may also be presented in the point-of-sale device. For example, a user interface may be presented that allows the illustrative cashier to access reports and to log-out from the POS device. For example, a reports screen may be presented that summarizes the business activity of the current day, the previous day or a historical period. The reports may include data regarding cash-in sales (in dollars), awarded prizes (in US Dollars) and net revenue, which is the difference between the cash-in sales and the awarded prizes. The illustrative reports screen may be refreshed in real time or in pseudo real time.

By way of example and not of limitation, a player may interact with the centralized gaming system 100 by purchasing play credits, e.g. funds, at the POS device 402. In some embodiments, a POS is integrated in with the non-mobile authorized client device 450. For example, the illustrative player requests an amount of credit and pays the cashier at POS device 402. Subsequently, a POS session is established with the central database 314 (shown in FIG. 3) when the illustrative distributor server 304 receives a cash-in message from the POS client device 402. The illustrative cash-in message identifies the session amount, the identification of the authorized mobile device to which the POS session amount is linked and the identity of the POS device initiating the transaction. The distributor server 304 acknowledges that POS transaction and provides update information to the specific game client indicating the amount of available at credit. In addition, a player may elect to add credit to an existing balance by purchasing such credit from a cashier, who may use a POS ADD CASH function to record the transaction in the server database and update the available credit total.

There are a variety of gaming technologies that are supported by the wagering and entertainment systems and methods described herein, including those integrated with a broadcast system. The "gaming technologies" supported by the wagering and entertainment systems and methods include at least one of network based components, authorized non-mobile devices (i.e., gaming machines), and authorized mobile devices (i.e., portable computing devices).

Figure 4B:
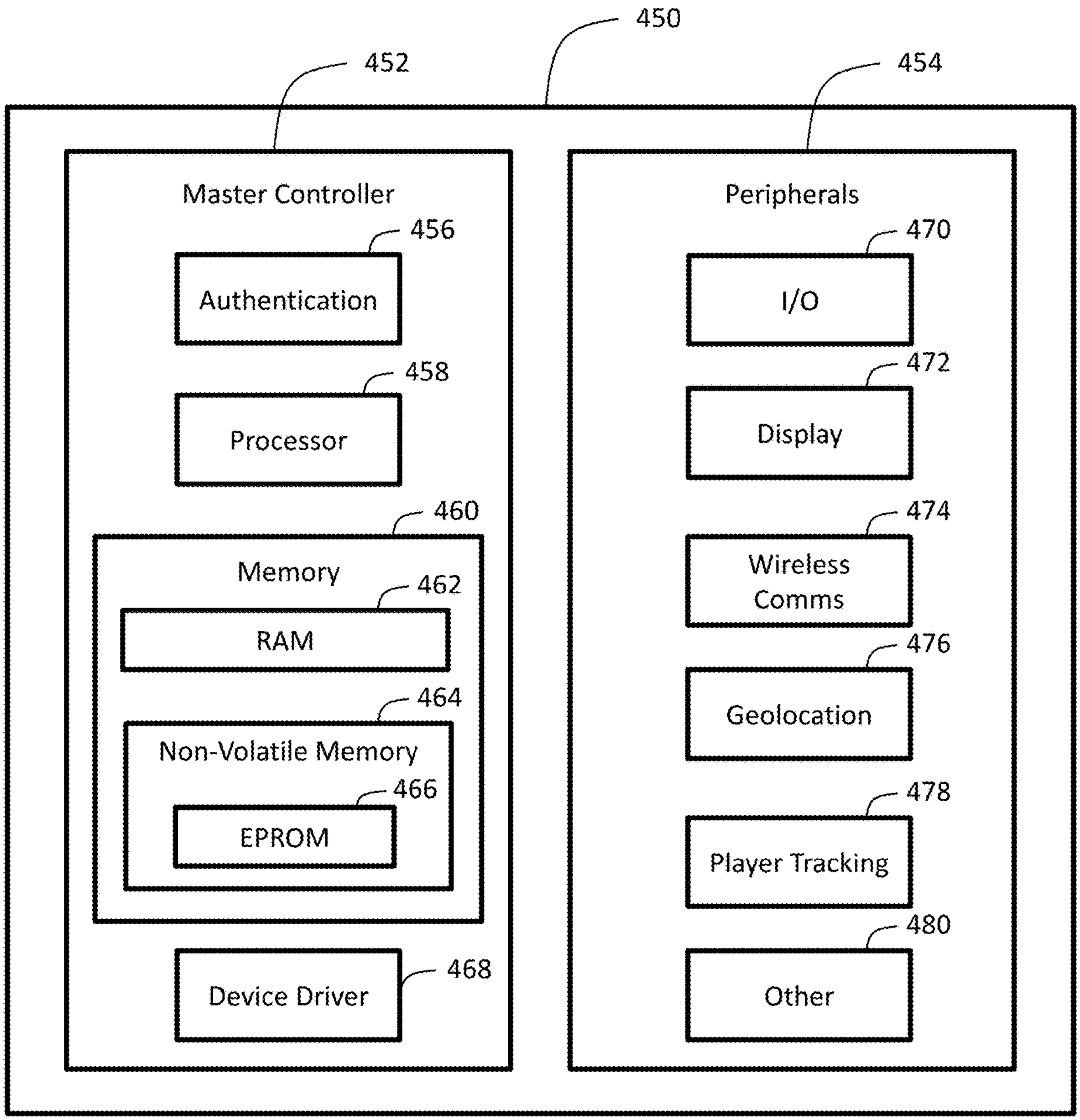
FIG. 4B shows a diagram of an illustrative gaming machine.

FIG. 4B shows a diagram of an illustrative gaming machine 450. The illustrative gaming machine 450 may include one, some, or all of the modules shown in FIG. 4B.

Gaming machine as used herein refers to regulated gaming machines such as slot machines, and generally includes class II and class III slot machines, video poker machines, video lotter terminals, video keno machines, video bingo machines, video pull-tab machines and other such regulated gaming machines. Gaming machine 450 is a specialized computing device that is capable of awarding million dollar prizes and, consequently, is highly regulated. Gaming machine 450 also complies with specific regulatory requirements and fault tolerances. For regulatory purposes, gaming machine 450 is designed to prevent cheating by having static instructions stored in non-volatile memory 464, e.g., EPROM 466, which must be approved by gaming regulators.

Gaming machine 450 is also designed as a state-based system that stores and maintains current game states in non-volatile memory 464 so that the game state can be preserved when there is a loss of power. For example, in one embodiment gaming machine 450 is a typical state-based gaming machine, that maintains the game state locally in its non-volatile memory 464. Thus, if gaming machine 450 awards a prize (game state) and the power goes out, the non-volatile memory 464 restores gaming machine 450 to the previous game state and awards the prize corresponding to that game state. More generally, there are various functions performed by gaming machine 450 such as bet, play, credits awarded, loyalty points awarded, and other such gaming functions, and each may be defined as a "state." During gaming play, gaming machine 450 manages game play operations by proceeding from one game state to another and storing critical data in the non-volatile memory 464.

Authorized mobile devices, i.e., portable computing devices refer to mobile devices, smartphones, laptops, and other such portable computing devices. Portable computing devices are designed as general purpose computers and do not typically operate like a state-based gaming machine.

The illustrative wagering and entertainment systems or "gaming systems" presented herein can include a plurality of networked gaming machines, which can communicate with portable computing devices using various network based components. Thus, there may be specific embodiments where the gaming machine 450 communicates with a remote server, such as the wagering sub-system, via a Wide Area Network (WAN), e.g., the Internet. Also, there may be specific embodiments where the portable computing device communicates with the remote server via the Internet.

Illustrative "network based components" or "network components" include virtual machines, containers, servers, controller, remote hosts, and other such network based (or cloud based) components. The Illustrative network based components are typically "centralized," however, the network based components may also be decentralized. The network based components may operate locally, remotely and as a hybrid combination of local and network components. The specific implementation may depend on regulatory, gaming, and/or engineering requirements.

Generally, networked embodiments can be more specifically described as "thin client" embodiments or "thick client" embodiments. In a "thick client" embodiment, a processor 458 residing on the gaming machine 450 executes most of the instructions associated with game play, particularly random number generation that determines a game result, which game results are displayed on the gaming machine 450. In "thick client" embodiments, some limited operations, such as progressive game play, are managed by other network components. In a "thin client" embodiment, one or more network components control game play, and the gaming machine 450 merely displays locally the results generated remotely by the networked component. Additionally, the "thin client" receives instructions from the player that are then communicated to the network components. Thus, in a "thin client" embodiment, the gaming machine 450 receives instructions from the player, which are communicated to the network component, and the gaming machine 450 displays the results generated by the networked component.

The illustrative gaming machine 450 includes a master controller 452 that communicates with the illustrative peripherals 454. The illustrative master controller 452 includes an authentication module 456 that authenticates gaming machine components such as hardware components, software components, firmware components, peripheral device components, user input device components and information stored in the memory 460.

The master controller 452 includes at least one processor 458. The processor 458 may be a microprocessor, a microcontroller-based platform, a suitable integrated circuit, or one or more application specific integrated circuits (ASICs). The processor 458 may execute operations such as communicating with a remote network based component via a communication interface (not shown) or communicating with one or more peripherals 454. Additionally, the processor 458 and memory 460 perform game related operations for the gaming machine 450, which may operate as a thin client gaming machine or a thick client gaming machine.

The memory 460 associated with master controller 452 includes, by way of example and not of limitation, an illustrative volatile RAM memory 462, an illustrative non-volatile memory 464, and unalterable EPROM memory 466. The memory 460 stores instructions that are executed by illustrative processor 458 to control the gaming machine 450. The memory 460 stores image data, event data, input data, random number generators (RNGs) or pseudo-RNGs, paytable data or information, and/or applicable game rules that relate to the play of one or more games on the EGM. The memory 460 also stores a plurality of device drivers 468. Examples of different types of device drivers 468 include device drivers for EGM components and device drivers for the peripheral components 454.

In certain embodiments, the peripheral devices 454 include several device interfaces such as an input/output (I/O) device 470, a display device 472, a wireless communication component 474, a geolocation module 476, a player tracking module 478, and other 480 such peripheral devices.

The I/O device 470 may include any suitable device that enables an input signal to be produced and received by the processor 459 of the EGM. One illustrative I/O device 470 may include a payment device (not shown), which is used to fund game play for the gaming machine 450. Another I/O device 470 may include a bet amount input that receives a user instruction regarding the bet amount. Yet another I/O device includes at least one game play activation switch. An additional I/O device includes a plurality of buttons that cause the gaming machine 450 to perform specific operations such as wager a specific amount. The I/O device 470 may also include a touch screen display that receives a variety of user instructions.

The display 472 provides information associated with a primary game which may be presented as a series of symbols on rotating wheels. Additionally, there may be other separate displays, or displays may be presented in a picture-in-picture type format. For example, there may be a secondary bonus display, a separate credit display that presents the current player's credits, and a separate bet display that displays an amount wagered.

The at least one wireless communication component 474 includes one or more communication interfaces having different architectures and utilizing a variety of NFC communication protocols and wireless communication protocols, such as Wi-Fi, Bluetooth™, cellular standards such as CDMA, CDMA2000, and WCDMA, RFID, infrared.

The geolocation module 476 receives or generates geolocation information from one or more remote sources and uses the acquired geolocation information to determine geographic information about the gaming machine or any other peripheral communicatively coupled to the gaming machine. For example, the geolocation module 476 receives GPS signal information to determine the location of the gaming machine 450. In another implementation, the geolocation module 476 determines the location of a portable computing device that is communicatively coupled to the gaming machine 450. In this implementation, the location of the portable computing device is determined relative to the gaming machine to which it is coupled. In another embodiment, the geolocation module 476 receives IP routing address information, trilateration information, triangulation information, BLE data, Wi-Fi data, cellular data, or any combination thereof to determine the location of the gaming machine and/or peripheral.

By way of example and not of limitation, an illustrative player tracking module 478 includes a card reader (not shown) communicatively coupled to processor 458. The player tracking module 478 is communicatively coupled to a player tracking system (not shown) that tracks the player's game play to award player loyalty points, credits, or a combination thereof.

The other peripherals 480 include, but are not limited to, bill dispensers, ticket dispensers, PIN keypad entry devices, card readers, electronic fund transfer terminals, cashless transaction peripherals. By way of example and not of limitation, an illustrative peripheral includes a ticket printer (not shown) that generates a physical ticket that has a monetary value, and which is dispensed when the player pushes a cashout button. Additionally, the other peripheral 480 may include a bill dispenser that dispenses paper currency. Note, that the I/O peripheral 470 generally refers to a peripheral that receives a player instruction and the other peripheral 480 are used to generally refer to various ways to cash players out of the game.

Other peripherals 480 may also include sensors (not shown) such as infrared sensors, image sensors, and biometric sensors (e.g., retinal scanner, fingerprint scanner), which may be used to identify and/or interact with the player. Additionally, the other peripheral device 480 may also include a smartphone or tablet that is communicatively coupled to the gaming machine 450 via wireless communication module 474.

Figure 5:
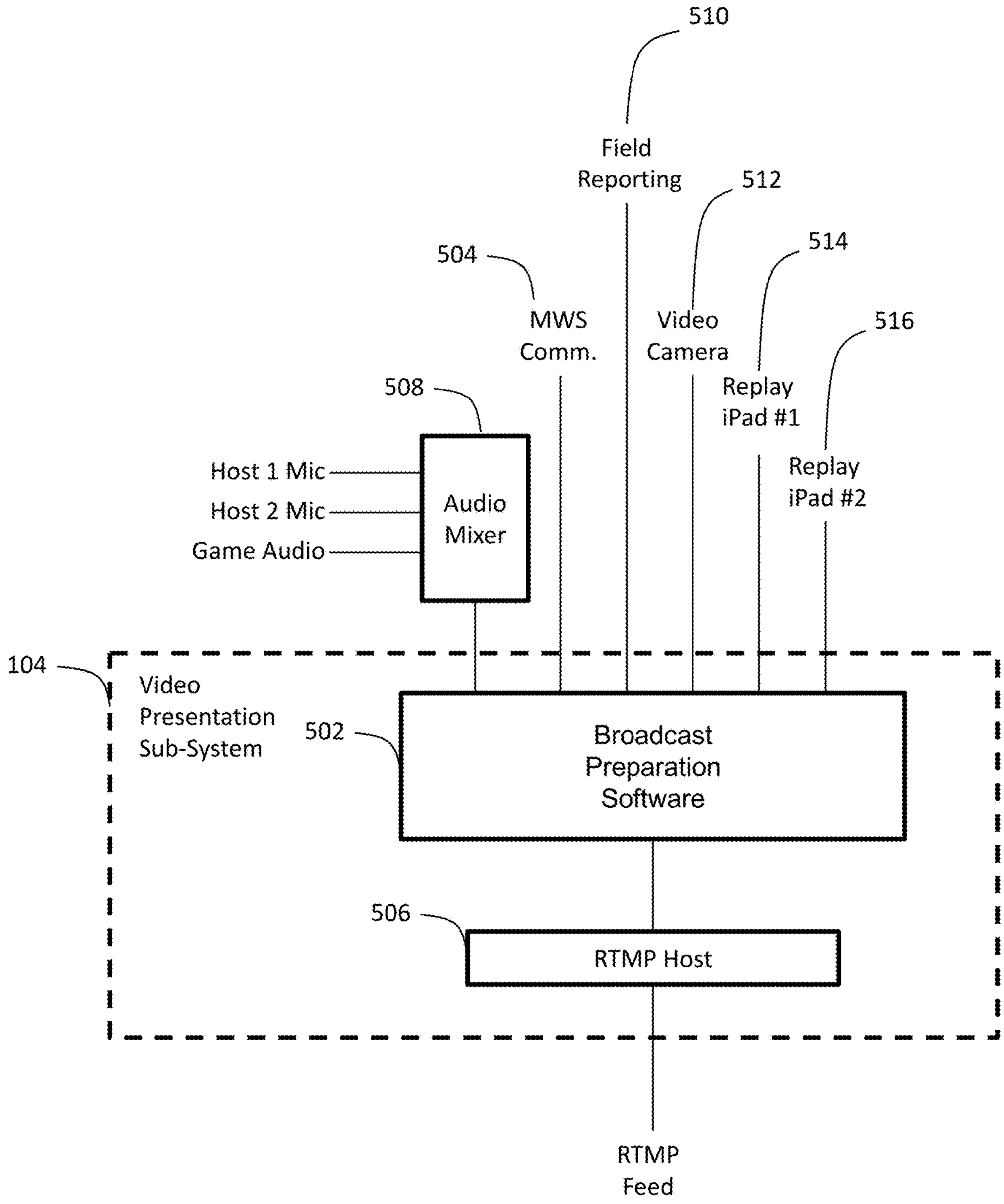
FIG. 5 shows an illustrative Video Presentation System.
Figure 6:
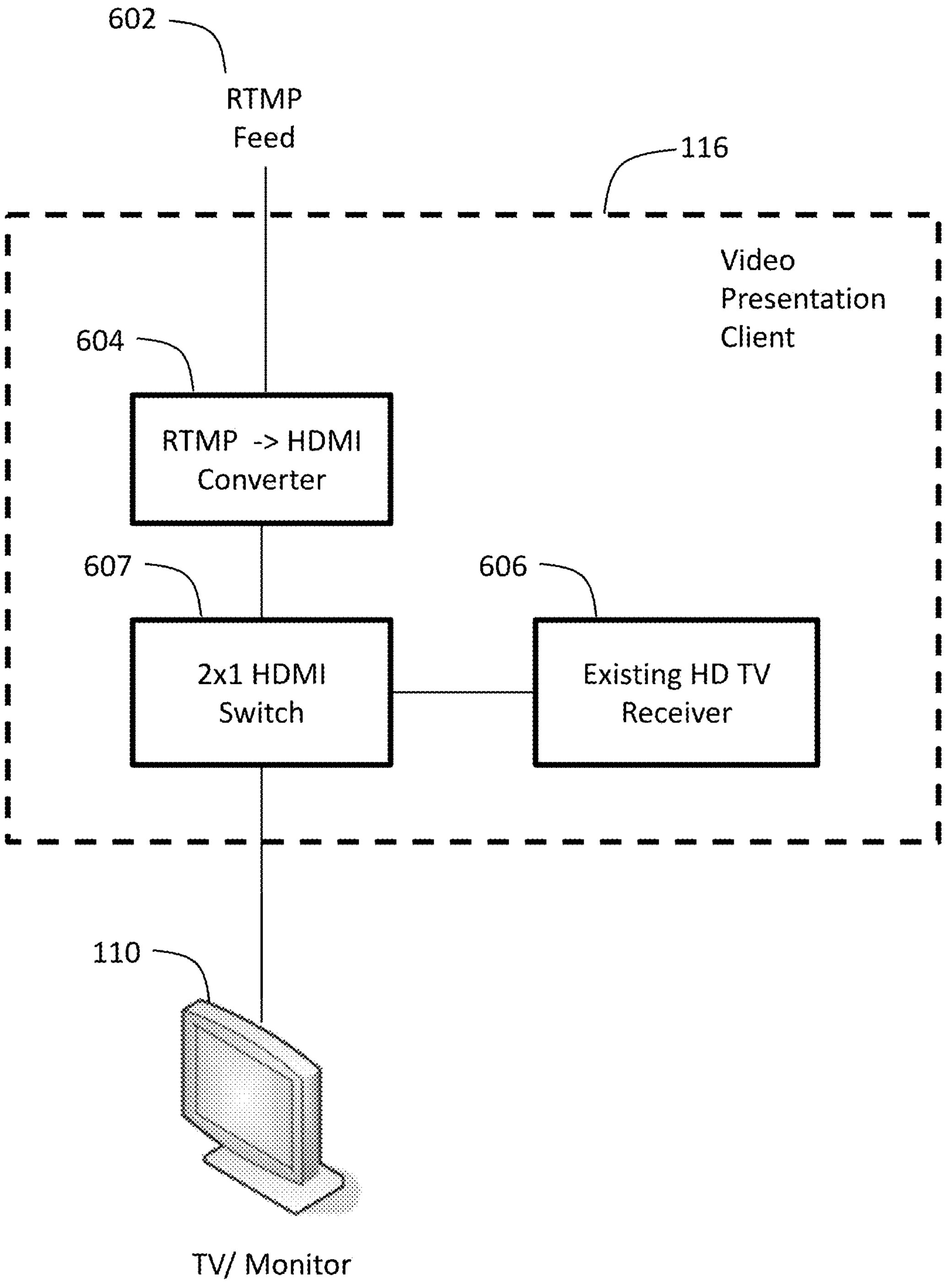
FIG. 6 shows a more detailed view of an illustrative video presentation sub-system (VPS) client.

Referring to FIG. 5, there is shown an illustrative Video Presentation System (VPS). In the illustrative embodiment, the video presentation system (VPS) 104 delivers television content to venues communicatively coupled to the centralized gaming system 100 shown in FIG. 1. The illustrative VPS 104 is communicatively coupled to a VPS client 116, which is also shown in FIG. 6 below.

By way of example and not limitation, the VPS 104 may be associated with linked bingo tournament (LBT) games. This content presented on illustrative monitors 110 (shown in FIG. 1) complements the game experience on the authorized gaming devices. Additionally, the content presented on monitors 110 is configured to involve other patrons at participating venues who are not participating in the games. This may create a social gaming environment that may appeal to a broad spectrum of players.

The illustrative VPS 104, shown in FIG. 5, includes a plurality of inputs that the system may incorporate into broadcast content. For example, communications with the MWS 102 may include a data feed generated by the MWS 102, which provides real time data on the status of an illustrative tournament. The illustrative data feed may include player names, player scores, remaining plays for player game sessions, time remaining in the tournament, prize values and other such tournament information.

A broadcast preparation software module 502 is configured to integrate a plurality of inputs into a broadcast data stream. In the illustrative embodiment, the integration is performed by a suite of commercial products such as Open Broadcaster™, Quicktime™ and proprietary software products. The tasks performed by the broadcast preparation software module 502 includes formatting an illustrative mobile wagering sub-system data feed 504. Note, the mobile wagering sub-system data feed 504 is generated by the mobile wagering sub-system 102. The mobile wagering sub-system data feed 504 includes information such as the tournament leader information, which can be converted into an easily readable display format.

For example, the mobile wagering sub-system data feed 504 may be transmitted over the Internet to a Real Time Messaging Protocol (RTMP) host 506, which may then transmit the data signal from the illustrative RTMP host 506 using an RTMP protocol over the Internet to the illustrative VPS client 116.

The broadcast preparation software module 502 may also be configured to interface with an illustrative audio mixer 508, which accepts a variety of audio feeds. The illustrative audio feeds received by the audio mixer 508 include host microphones and audio from selected live game play; a wide variety of such devices are commercially available. Additionally, the broadcast preparation software module 502 is configured to provide live field reporting 510 from game locations using a tool such as Facetime™. Live field reporting 510 may add excitement to the broadcast. Furthermore, the broadcast preparation software module 502 is configured to interface with various video signals that include studio video cameras 512 and live images captured from illustrative authorized mobile device and replayed as feed 514 and feed 516.

Referring to FIG. 6, there is shown a more detailed view of an illustrative video presentation sub-system (VPS) client 116. In the illustrative embodiment, the VPS client 116 is communicatively coupled to the video presentation sub-system 104 via an illustrative wide area network, e.g. Internet, and a local wireless connection, e.g. local Wi-Fi. The illustrative RTMP feed 602, which is generated by the RTMP host 506, is received by the VPS client 116. The VPS client is also operationally coupled to the illustrative stationary monitor 110.

The RTMP feed 602 is received at an illustrative gaming venue and the RTMP feed 602 is routed to the VPS client 116. By way of example and not of limitation, the RTMP feed 602 is communicated using a dedicated and secure Wi-Fi channel. In the illustrative embodiment, the RTMP feed 602 includes a streaming video data stream, which is converted to a video display signal. For example, the RTMP feed may be converted to an HDMI video signal with an RTMP/HDMI converter 604. For example, the RTMP/HDMI converter 604 may be implemented with special purpose firmware inside an embedded computing element, such as a Raspberry PI™. The resulting video signal generated by the RTMP/HDMI converter 604 is then sent directly to a compatible television or sent to the television using a commercial 2×1 switch 607, such as the Fosman 8024™, which may also be coupled to an existing HDTV data source such as receiver 606.

The illustrative converted HDMI video signal is then presented on the stationary monitor 110. This allows for a variety of installation models. Where there is a television dedicated to use with the VPS the output of the special purpose RTMP/HDMI converter 604 may be left permanently connected to the television or stationary monitor 110. If the television is used for different purposes at different times the data feed to the television can be switched on or off with the introduction of the 2×1 HDMI switch 607, allowing normal use of the television when the VPS data feed is not in use.

The centralized gaming system 100 described in FIG. 1 through FIG. 6 supports a variety of different types of games and game play. For the illustrative mobile wagering sub-system 102, a game session is initiated after a wager is received and the game session ends when game play is completed, when a prize is awarded, or according to any other predetermined game mechanic that reflects the game session has ended.

A variety of different game mechanics may be associated with each game session. For example, a tournament game awarding a limited number or prizes may present player rankings for prizes awarded to the ranked players.

The player rankings may then be presented on one or more of the authorized gaming devices. Additionally, the player rankings may result in the video presentation sub-system 104 generating a player rankings game session output that is presented on the stationary monitors 110.

Figure 7A:
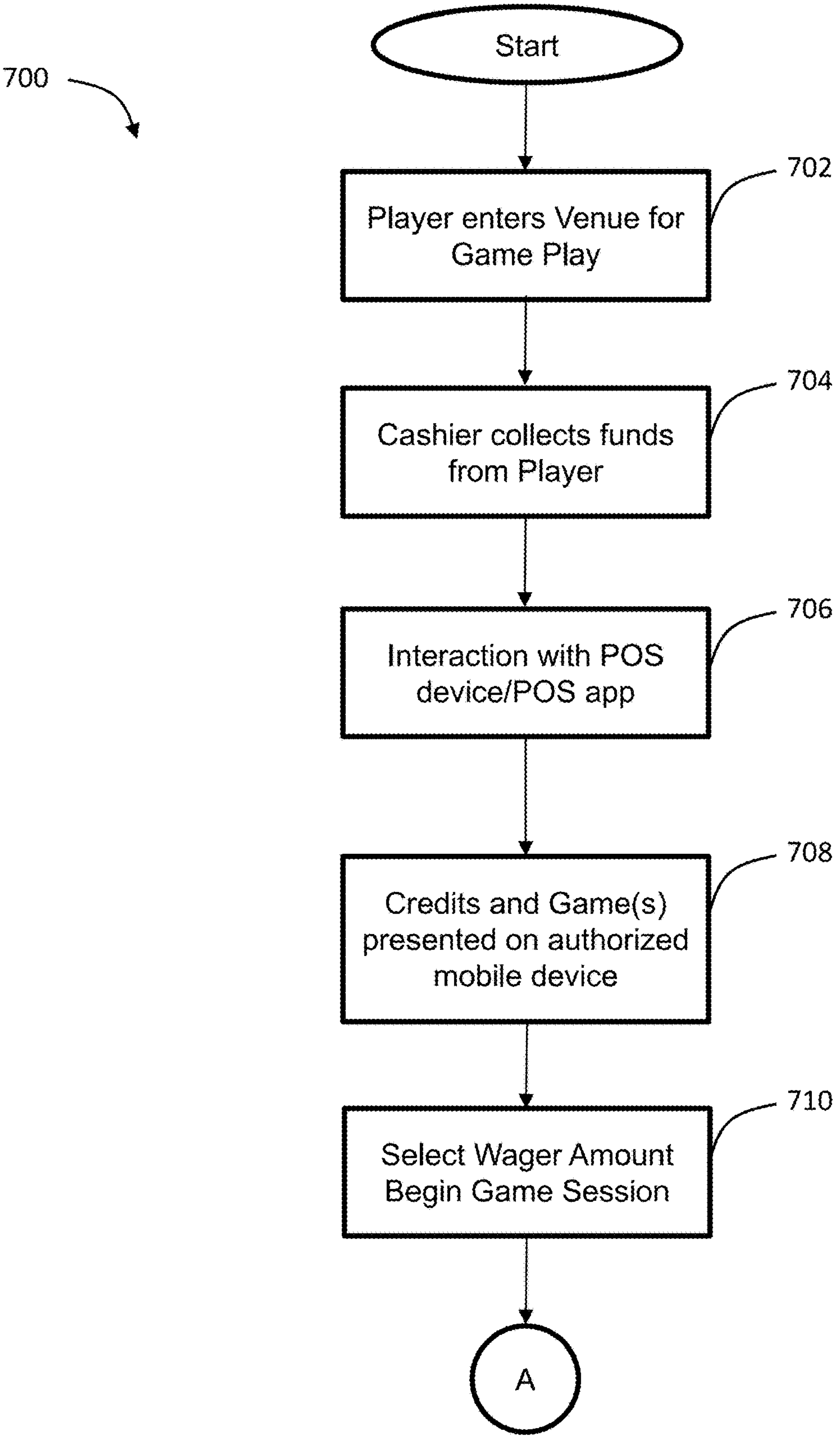
FIG. 7A and FIG. 7B show an illustrative centralized gaming method that describes the various steps performed by a player interacting with the gaming system.
Figure 7B:
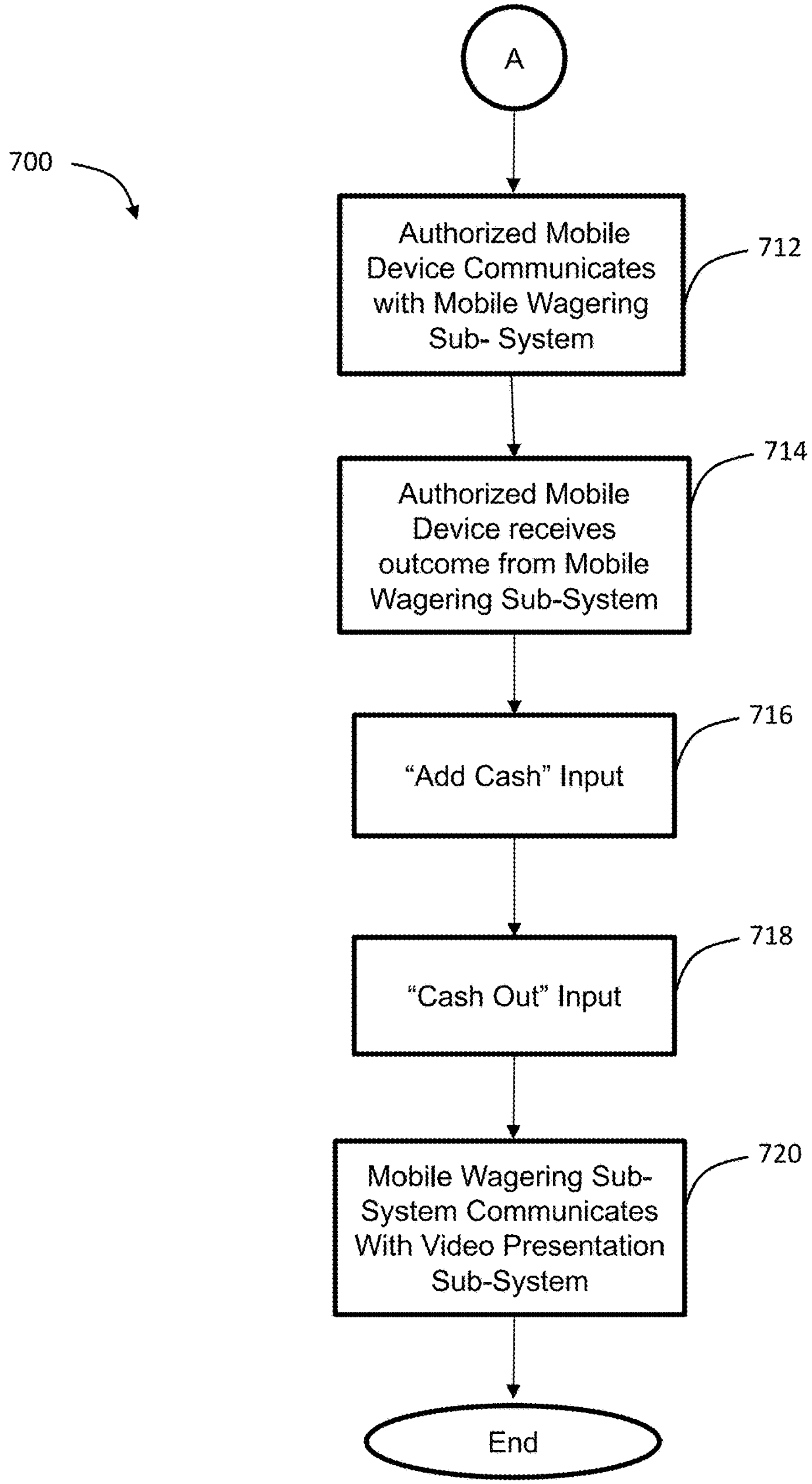

Referring to FIG. 7A and FIG. 7B, there is shown an illustrative centralized gaming method that describes the various steps performed by a player interacting with the gaming system. The illustrative centralized gaming method 700 begins at block 702 where an illustrative player enters one of the venues and indicates to the cashier or similar venue employee that the player wants to initiate game play with the centralized gaming system 100. The method then proceeds to block 704 where the illustrative cashier collects monetary funds such as cash, e-money, debit card, credit card and other such monetary funds as are appropriate depending on jurisdictional regulatory requirements.

At block 706, the illustrative cashier then proceeds to interface with a Point-Of-Sale (POS) application on a device such as POS device 114. In another embodiment, the player may interface with a kiosk version of the POS device 114 without the need to interact with a venue employee. In yet another embodiment, the POS application may be running on an authorized mobile device 112 and the player may interact directly with the POS application.

While interfacing with the POS device or POS application at block 706, the illustrative cashier identifies the authorized mobile device 112 associated with the player. The illustrative cashier then proceeds to enter the amount of credits to add to the authorized mobile devices. This amount of credits is stored in illustrative central database 314 (shown in FIG. 3).

At block 708, the total credits, which correspond to the collected funds, are presented on the authorized mobile device 112. The player may then interact with a game application running on the authorized mobile device. The player may also select from a variety of different game applications, which may be presented as a menu of games displayed on the authorized mobile device 112 screen. In operation, various game screens corresponding to the chosen game are presented to the player.

At block 710, the player can select a wager amount for a particular game session. In the illustrative embodiment, the wager amount includes the number of credits the player has selected to be wagered. Depending on jurisdictional requirements wager amounts can be expressed in dollars and cents (or other local currency) or in terms of credits, where each unit of credit has a monetary value. By way of example and not of limitation, the player may then initiate the game session by pressing a PLAY button, which is an illustrative game input received by the authorized mobile device 112.

At block 712, a game request is sent from the authorized mobile device 112 to the mobile wagering sub-system 102. The mobile wagering sub-system 102 processes the game request. In the illustrative embodiment, the mobile wagering subsystem 102 determines a prize result and a graphic representation (or representations) of the prize result. Additionally, the mobile wagering sub-system 102 logs the transaction, updates database game information, and updates an accounting module to reflect the amount spent and player winnings corresponding to the game session. Furthermore, the mobile wagering sub-system 102 sends a response message (or messages) to the authorized mobile device specifying the information to be displayed and the new value of the player account.

The method then proceeds to block 714 where the authorized mobile device 112 receives the outcome(s) from the mobile wagering sub-system 102. For example, the authorized mobile device 112 is configured to present animations and other results associated with the game session. The authorized mobile device 112 may also include an updated accounting of total credits and the prize amounts awarded. After the game session is completed, the player can return to the game menu at any time and select a different game to play.

At block 716, the authorized mobile device receives an "Add Cash" input. By way of example, the player decides to add funds to their play amount by providing the "Add Cash" input, which alerts the illustrative cashier that the player wants to add cash to their session total. The cashier then proceeds to interact with the POS device 114 or POS App (not shown). The illustrative cashier then proceeds to enter the amount of credits to add to the authorized mobile devices and the credits are stored in the illustrative central database 314.

At block 718, the authorized mobile device receives a "Cash Out" input. For example, when the player has finished the game session and wants to "Cash Out" the player presses a "Cash Out" button on the authorized mobile device 112. In the illustrative embodiment, after the authorized mobile device receives the "Cash Out" input, the illustrative cashier is notified that the player desires to "Cash Out." Using the POS device 114 of the POS App (not shown), the illustrative cashier selects the "Cash Out" input and obtains the total credits remaining on the authorized mobile device after has completed one or more game session. The remaining account total information is received from the mobile wagering sub-system 102. The cashier pays the player the amount due and confirms the payment at the POS. The client device is then available for use by another player.

The method then proceeds to block 720 where mobile wagering sub-system 102 is configured to communicate with the video presentation sub-system 104. At block 720, the video presentation subsystem 104 receives game play information and integrates it with other data sources as described above. The video presentation subsystem 104 generates a video presentation that is broadcast via a private network to participating gaming venues. As described above a stationary monitor 110 is communicatively coupled to the video presentation sub-system 104 via the video presentation client 116. The stationary monitor client is configured to receive and present the game session output generated by the video presentation sub-system. In one illustrative embodiment, the video content is designed to provide enhanced content to the players and to increase the interaction between the players and the games. Additionally, the video content adds interest and excitement to the games. In addition to game-specific content, such as broadcasting a live tournament, the system can be used for a multitude of purposes, including, but not limited to, announcements and pictures on winners, informational videos about sponsoring charities, announcements of new games and upcoming events, advertising, etc.

Figure 7C:
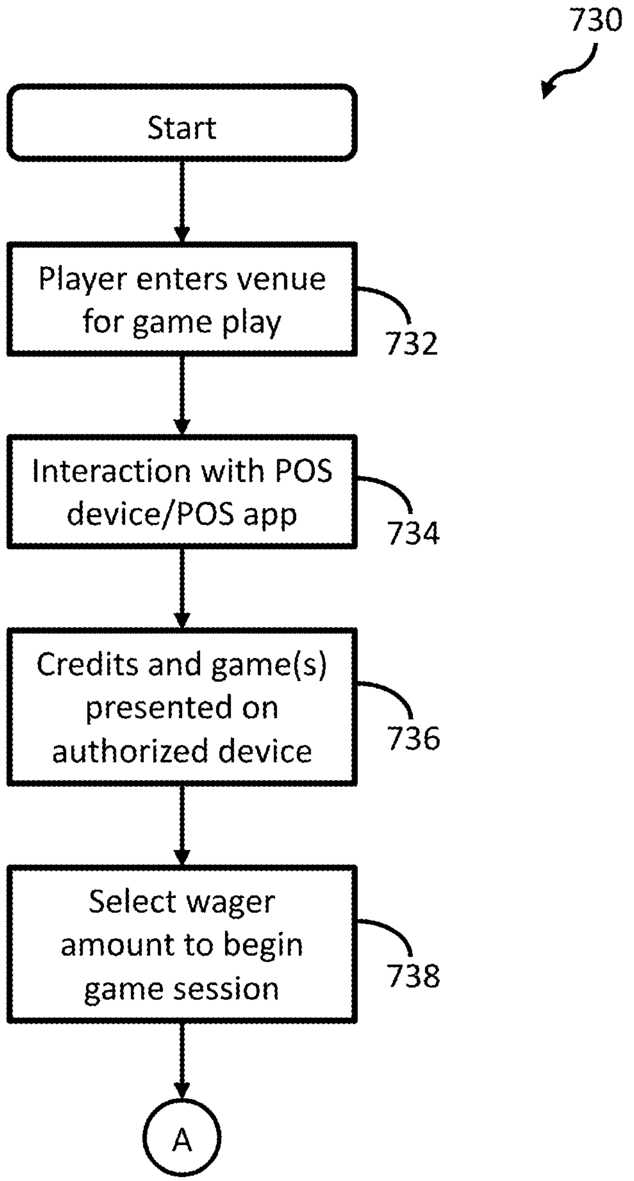
FIG. 7C and FIG. 7D show another illustrative centralized gaming method that describes the various steps performed by a player interacting with the gaming system.
Figure 7D:
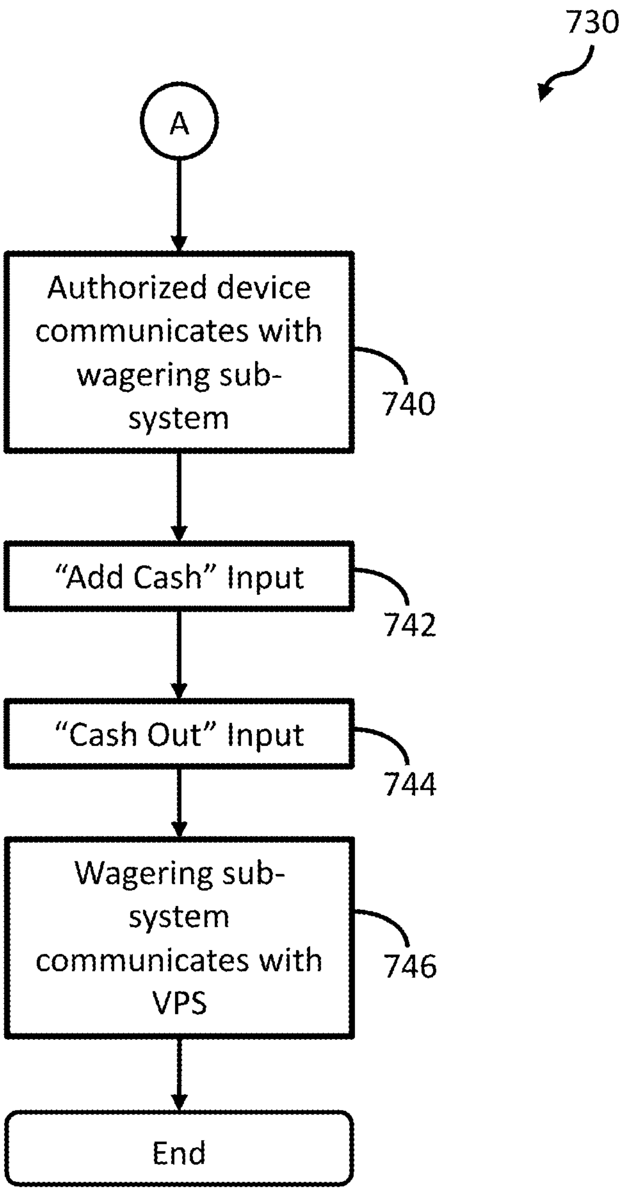

Referring now to FIG. 7C and FIG. 7D, there is shown another illustrative centralized gaming method 730 that describes the various steps performed by a player interacting with the gaming system. The illustrative centralized gaming method 730 is at block 732 where an illustrative player enters one of the venues and initiates game play with the centralized gaming system 100 through player input at a non-mobile authorized client device, such as an electronic gaming machine (EGM). The method then proceeds to block 734 where a virtual cashier or Point-Of-Sale (POS) application on the non-mobile client device collects monetary funds such as cash, e-money, debit card, credit card and other such monetary funds as are appropriate depending on jurisdictional regulatory requirements. In some embodiments, the POS application operates on a device such as POS device 114.

While interfacing with the POS device or POS application, the player is identified as associated with the authorized client device. The virtual cashier or player proceeds to input the amount of credits to add to the authorized client device(s). This amount of credits is stored in illustrative central database 314 (shown in FIG. 3).

At block 736, the total credits, which correspond to the collected funds, are presented on the authorized client device. The player may then interact with a game application running on the authorized non-mobile client device (gaming machine), such as a particular slot machine, video lottery terminal, video poker terminal, or EGM application operating on a gaming machine. The player may also select from a variety of different game applications, which may be presented as a menu of games displayed on the authorized client device screen. In operation, various game screens corresponding to the chosen game are presented to the player.

At block 738, the player can select a wager amount for a particular game session. In the illustrative embodiment, the wager amount includes the number of credits the player has selected to be wagered. Depending on jurisdictional requirements wager amounts can be expressed in dollars and cents (or other local currency) or in terms of credits, where each unit of credit has a monetary value. By way of example and not of limitation, the player may then initiate the game session by pressing a PLAY button, which is an illustrative game input received by the authorized client device. In one embodiment, pressing the PLAY button causes a non-mobile client device's local RNG to determine a game result. In another embodiment, pressing the PLAY button requests a game result from a remote game server, where the remote game server performs the RNG determination of the game result. Further, pressing the PLAY button may cause the generation of a game result that triggers a bonus game session associated with the wagering game session.

At block 740, the authorized client device determines a prize result and a graphic representation (or representations) of the prize result for a particular game play or slot pull. The authorized client device transmits the determined prize result and graphic representation(s) to the wagering subsystem, such as via a WAN or other network communication route, so that the wagering sub-system receives the determined prize result and graphic representation(s) from the authorized client device.

The mobile wagering sub-system 102 processes the prize result and graphic representation(s); and may additionally log the transaction, update a database of game information, and update an accounting module to reflect the amount spent and player winnings corresponding to the game session. In some embodiments, the mobile wagering sub-system 102 may further send a response message (or messages) to the authorized client device specifying the information to be displayed and the new value of the player account. In other embodiments, the non-mobile client device locally determines the information to be displayed and the new value of the player account with its own processor and memory.

The authorized client device may also include an updated accounting of total credits and the prize amounts awarded. After the game session is completed, the player can return to the game menu at any time and select a different game to play.

At block 742, the authorized client device receives an "Add Cash" input. By way of example, the player decides to add funds to their play amount by providing the "Add Cash" input, which alerts the illustrative cashier that the player wants to add cash to their session total. The player then interacts with the POS device 114 or POS App (not shown). The player then proceeds to enter the amount of credits to add to the authorized client devices and the credits may be stored in the illustrative central database 314.

At block 744, the authorized mobile device receives a "Cash Out" input. For example, when the player has finished the game session and wants to "Cash Out" the player presses a "Cash Out" button on the authorized client device. Using the POS device 114 of the POS App (not shown), the player selects the "Cash Out" input and obtains the total credits remaining on the authorized client device after completing one or more game session. The remaining account total information is received from the mobile wagering sub-system 102. After cashing out, the game session is terminated and the client device is then available for use by another player.

The method then proceeds to block 746 where mobile wagering sub-system 102 is configured to communicate with the video presentation sub-system 104. At block 746, the video presentation subsystem 104 receives game play information, such as the prize result and graphic representation(s), and integrates it with other data sources as described above. The video presentation subsystem 104 generates a video presentation that is broadcast via a private network to participating gaming venues. As described above a stationary monitor 110 is communicatively coupled to the video presentation sub-system 104 via the video presentation client 116. The stationary monitor client is configured to receive and present the game session output generated by the video presentation sub-system. In one illustrative embodiment, the video content is designed to provide enhanced content to the players and to increase the interaction between the players and the games. Additionally, the video content adds interest and excitement to the games. In addition to game-specific content, such as broadcasting a live tournament, the system can be used for a multitude of purposes, including, but not limited to, announcements and pictures on winners, informational videos about sponsoring charities, announcements of new games and upcoming events, advertising, etc.

Figure 8:
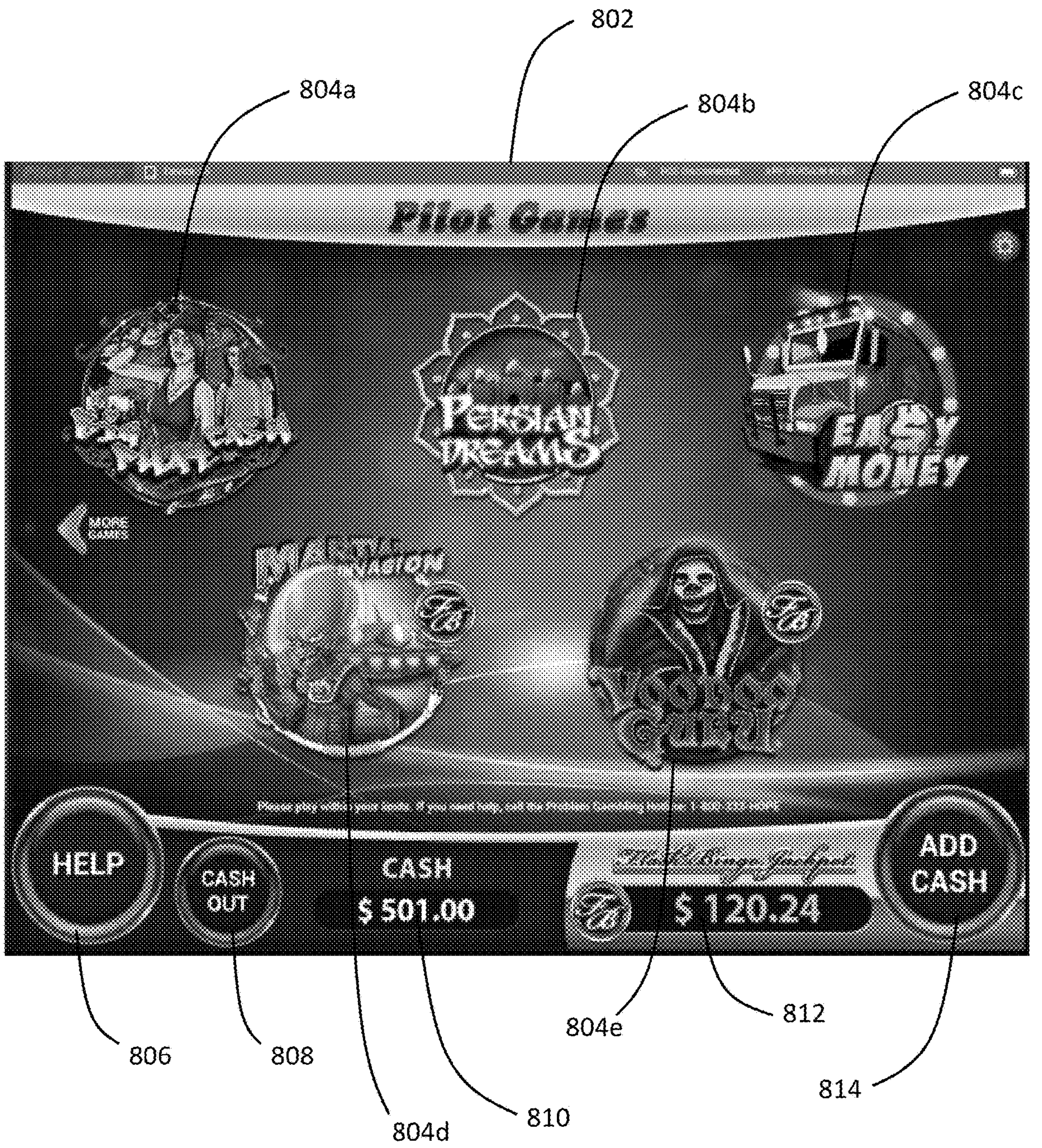
FIG. 8 shows an illustrative menu of games.

Referring to FIG. 8 there is shown an illustrative menu of games. In the illustrative screenshot 802, an array of icons 804*a* through 804*e* representing the menu of available games is presented. The player can then touch one of the game icons before beginning a game session. The game session may differ depending on the class or type of game selected. Types of games that can be supported include, without limitation, electronic pull-tabs, bingo, electronic high-speed bingo, electronic high-speed bingo tournaments and other such games of chance. Each game session involves communications with the mobile wagering sub-system 102, which determines the prizes awarded and selects the winners or receives communications of the determined prizes awarded and winners selected by each authorized client device. More detail on individual types of game play is provided below.

The illustrative screenshot 802 also includes a "Help" button 806 which is used to alert the illustrative cashier interacting with the POS device 114 that some assistance is required.

Additionally, the screenshot 802 includes a "Cash Out" button 808, which may initiate a redemption transaction at the POS device 114. A "Cash Out" input is received by the authorized mobile device when a player desires to conclude interacting with an authorized client device 112. Alternatively, the illustrative player may go directly to the cashier that interacts with the POS device and player can directly request a "cash-out" from the cashier. The illustrative cashier then proceeds to interact with the POS device (or POS app) by selecting the authorized client device 112 that is associated with player. After the POS device receives a cash-out input corresponding to the player's authorized client device 112, a cash-out request message is communicated to the appropriate distributor server 304. In the illustrative embodiment, the distributor server 304 communicates to the POS device the session balance 810 that is presented on the authorized mobile device. The POS device 114 is configured to receive a POS device cash-out input that confirms the actual amount or credits or funds indicated on the authorized client device 112. The POS device cash-out input is then communicated to the appropriate distribution server 304, which then proceeds to communicate that all player interactions with the authorized client device 112 have been terminated; and the authorized client device 112 displays a player account session balance of $0.00.

The session balance 810 or player account balance output is presented as a "cash" balance; however, "cash" is not stored on the authorized mobile device. The "cash" balance presented in the session balance 810 output represents credit or monetary value that is available for wagering, depending on jurisdictional requirements. If required, the credits may then be converted to fungible cash or other type of financial proceeds, e.g. chips or tickets, when the player cashes out.

The illustrative screenshot 802 also includes a jackpot value 812, which may correspond to a progressive prize. Progressive prizes are prizes that grow in real time as a function of game play. Some progressive prizes may accumulate prizes within a venue. More generally, progressive prizes accumulate prizes from multiple play locations.

An "Add Cash" button 814 provides an input that triggers a communication to the illustrative POS device 114, which notifies the illustrative cashier that the player accessing the authorized mobile device 112 wants to add credits or funds to the to the authorized mobile device for game play. The process of adding credits or funds to the authorized mobile device is described above.

By way of example and not of limitation, the types of games supported by the centralized gaming system 100 includes electronic pull-tab games, bingo, electronic high-speed bingo, electronic high-speed bingo tournaments and other such games of chance. The centralized gaming system 100 may further support receiving game outcome information, such as the prize result and graphic representation determined locally at each authorized client device.

Electronic pull-tab games are finite pool games that comply with jurisdictional rules limiting prize values and restricting types of permissible video animation. Typically, electronic pull-tab games have small finite-pool sizes, low wager denominations and low prize values compared to casino slot machines. Each game/denomination combination is associated with a different pull-tab deck. Electronic pull-tab games include at least one deck that is always open for each available game. Additionally, electronic pull-tab games include a deck serial number which is displayed on the client game screen as well as in an illustrative Game Information Screens. Typical pull-tab games are available in $0.25, $0.50, $1, $2, and $5 denominations. Available denominations and prize limits are generally controlled by jurisdictional regulations. Operators are able to select which games and denominations are active for each venue and to be able to close any deck.

Referring to FIGS. 9A through 9D there is shown a plurality of screen shots for an illustrative electronic pull-tab game. A variety of control buttons provide player inputs that are received by the authorized mobile device 112.

Figure 9A:
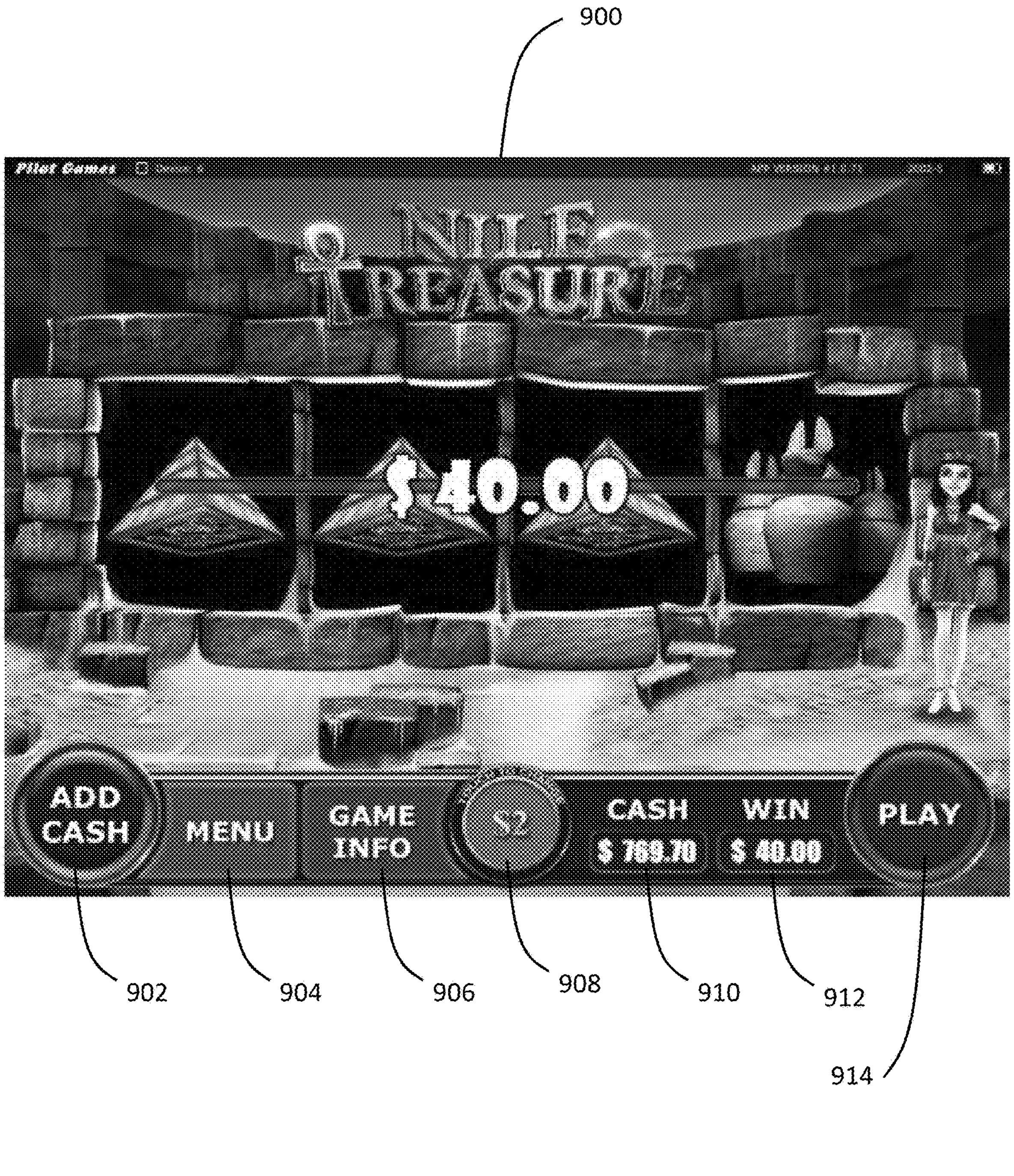
FIGS. 9A through 9D show a plurality of screen shots for illustrative electronic pull-tab games.

The player inputs shown in the FIG. 9A screen shot 900 includes an "Add Cash" control button 902, a "Menu" control button 904, a "Game Info" control button 906, a "Denomination" amount control button 908, a "Cash" credit counter 910, a "Win" credit counter 912, a "Play" control button 914.

More specifically, the "Add Cash" control button 902 is associated with a player input that allows the player to signal to the POS device 114 that the player wants to add more cash to the player account session. The "Menu" control button 904 allows the player to return to the game selection menu screen. The "Game Info" control button 906 provides access to screens which define prizes and rules of play. The "Denomination" amount control button 908 displays the current denomination and repeated presses of the Denomination amount control button may change the displayed denomination and cause the game to switch to a different finite pool. The "Cash" credit counter 910 displays the available cash credit balance that is available for game play. The "Win" credit counter 912 displays the amount won in the prior game session. For the illustrative pull-tab game, the "Play" control button 914 initiates a game session.

Figure 9B:
Figure 9B:

Referring now to FIG. 9B there are shown two screen shots associated with an illustrative game session. Screen shot 920 shows an unrevealed state corresponding to the pull-tab game before the authorized mobile device receives the "Play" game input. After receiving the "Play" game input, the illustrative game session is initiated and then the pull-tab game outcome is presented in a fully-revealed state as shown in screen shot 922.

As stated throughout, the mobile wagering sub-system 102 determines the outcome that is presented in the fully-revealed state presented in screen shot 922.

The pull-tab games presented herein include an auto-close option that may be selected by the operator, for any game played at a particular venue. The auto-close option automatically replaces a finite game pool with a new pool when all prizes exceeding a predetermined value for the deck have been exhausted and the game may no longer be desirable by players. When the auto-close option is turned "ON," a deck may automatically close and be replaced by a new deck when prizes over a game specific value set in the portal are gone. For example, a game may have 3 large value prizes and when the last prize is awarded, the deck may close and a new deck may open. By way of example and not of limitation, the auto close option is identified in the client game information when it is active, so players may know that it is active. A notification may also be given to all active clients when a new deck is open. This feature is attractive to players because they are always assured that there are always some valuable prizes remaining in a deck they may be playing.

There are a variety of other game features for the illustrative pull-tab games that include providing a reveal mechanism that displays the symbols in portions of the screen to create player anticipation. Another game feature includes background music that is unique to the game theme. Another game feature may include a sound that is triggered when each symbol is revealed; and the sound may be different for each game. A further game feature includes a prize rollup sound which is common to all games. Yet another game feature includes a celebration sound on all big wins. Additionally, game features may include a change in music during bonus rounds. Another game feature may include a prize rollup on the base game screen after a bonus round. A still further game feature may include symbols that slide in from the side or other such animated presentation. Yet another game feature includes game specific math that complies with jurisdictional Rules and Statutes.

Figure 9C:
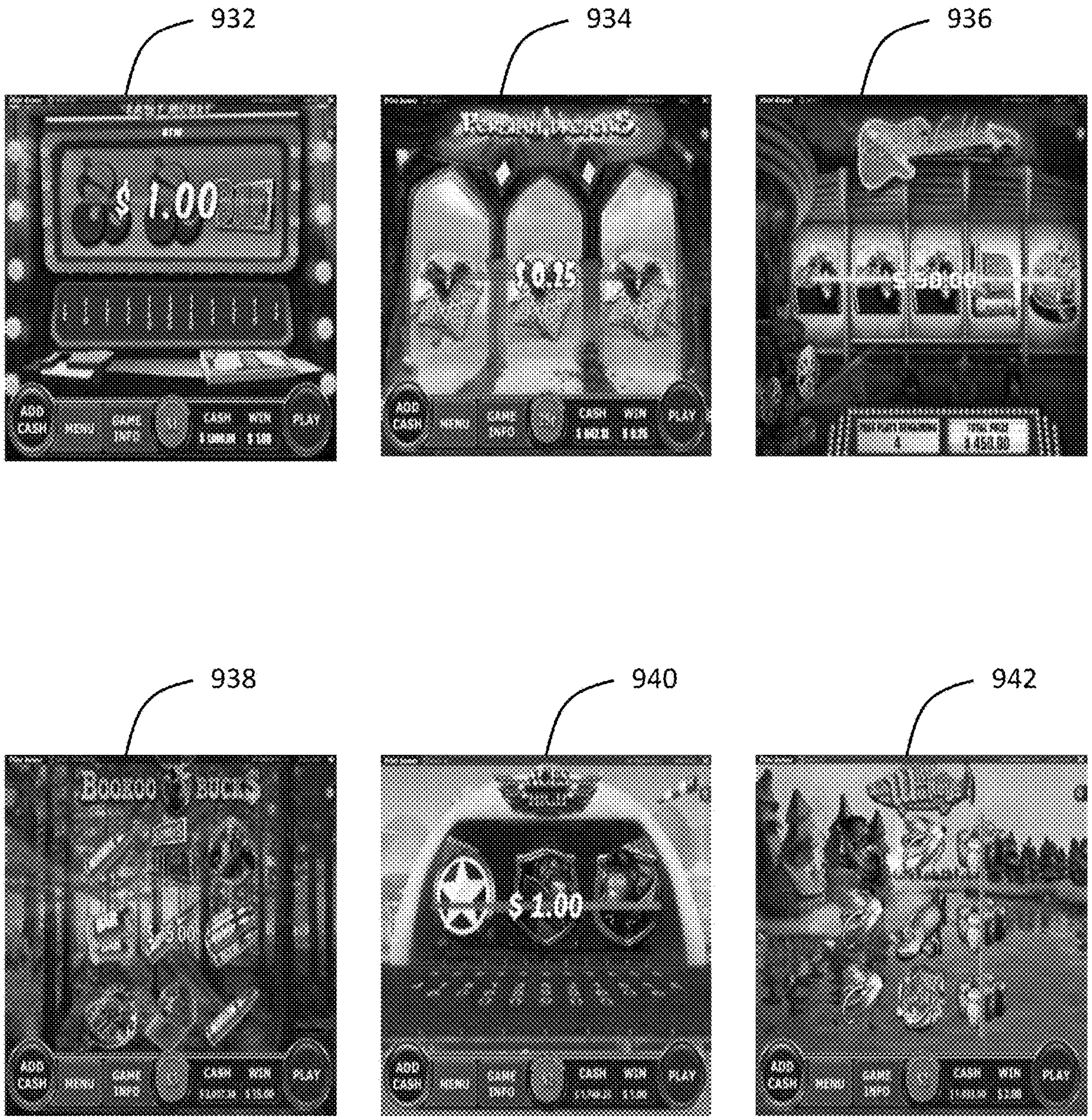

Referring to FIG. 9C there is shown some illustrative screenshots of electronic pull-tab games that include EASY MONEY™ 932, PERSIAN DREAMS™ 934, ROCK'N-'GOLD™ 936, BOOKOO BUCK$™ 940, ACES HIGH™ 942 and WILD WALLEYE™ 944. Other titles include ANCIENT PHARAOH™, BIG PHAT CASH™ and VEGAS VEGAS™.

Figure 9D:
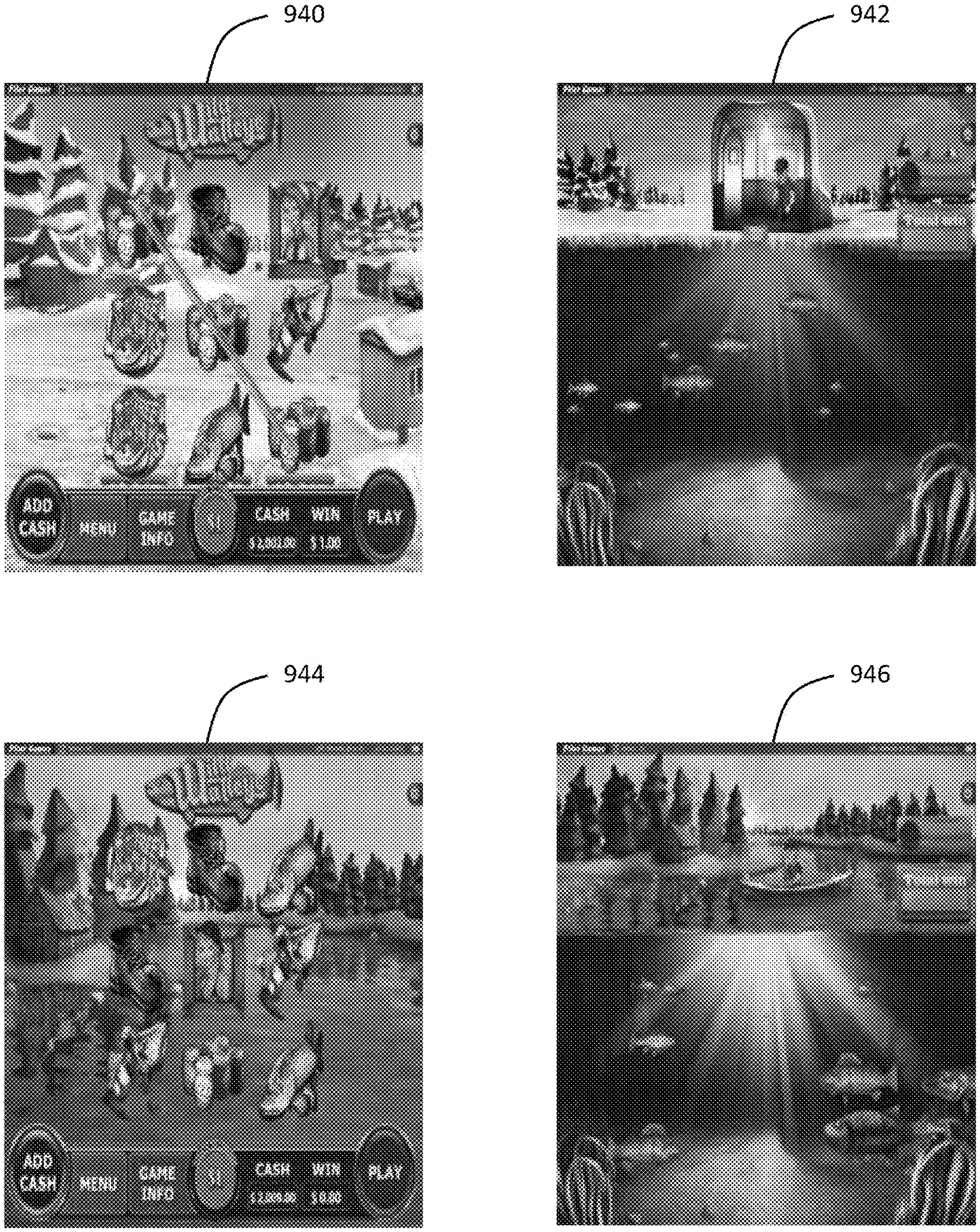

Referring to FIG. 9D there is shown some illustrative screenshots that changes the background graphics based on seasonal changes in the weather. For example, in the illustrative WILD WALLEYE™ shown in FIG. 9D, the graphic background presentation changes based on the seasonal changes in the calendar. Screenshots 940 and 942 present background graphics associated with a calendar period between November 1 and April 1, which depict ice-fishing graphics. Screenshots 944 and 946 are associated with the remainder of the year, and the graphics reflect summer boat fishing.

Figure 10B:
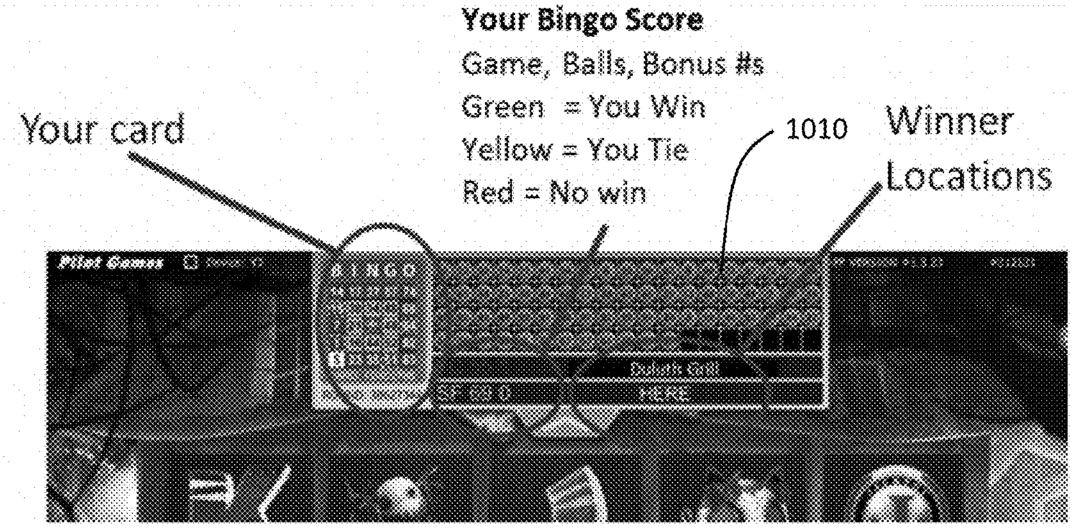
FIG. 10B shows further detail of the results summary line.
Figure 10A:
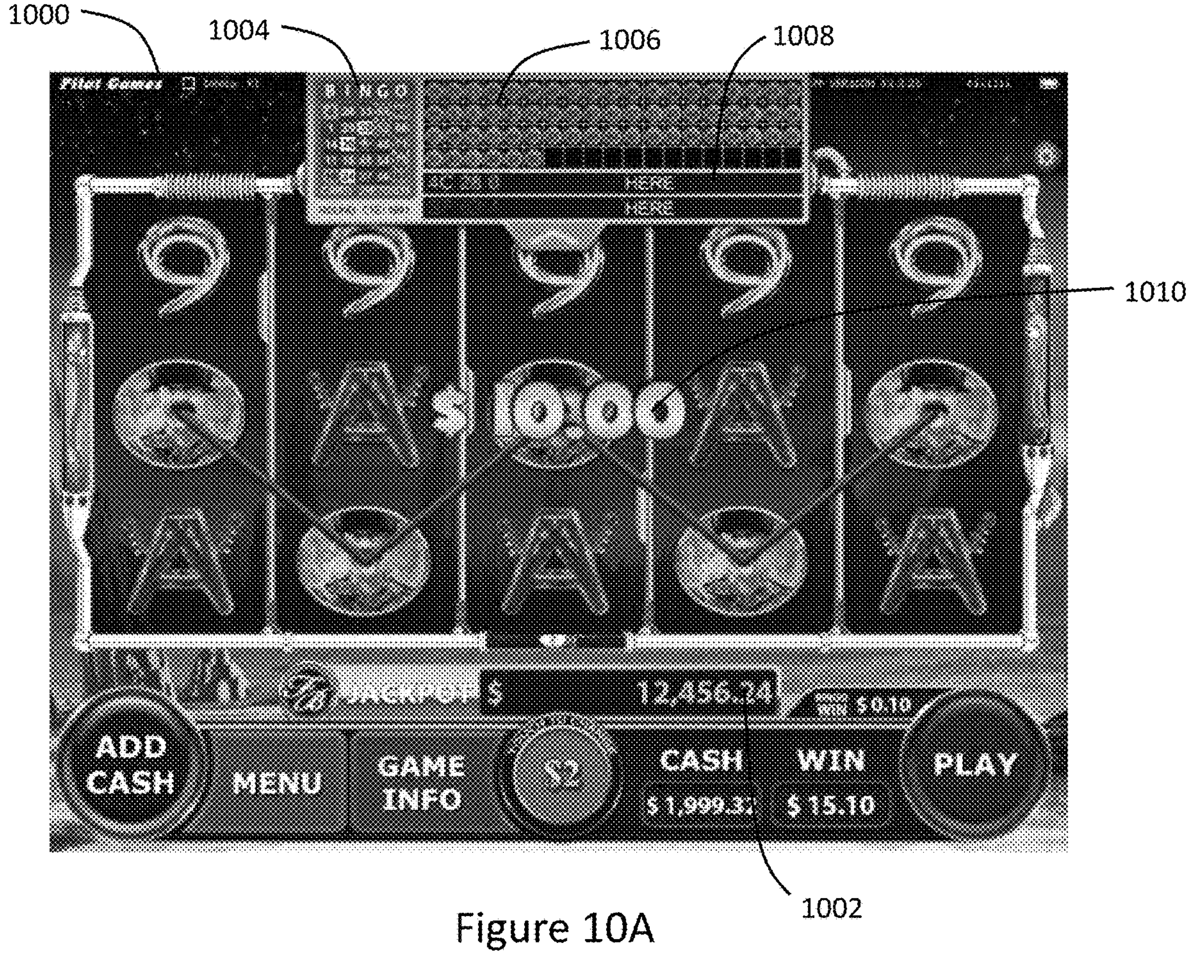
FIG. 10A shows a screenshot of an illustrative high speed bingo game.

Referring to FIG. 10A there is shown screenshot of an illustrative high speed bingo game. The screen shot 1000 is for an illustrative high speed bingo game that may be referred to as FLASH BINGO™. The panel displayed on the game screen is similar to the one displayed for the pull-tab games, with the addition of a Jackpot Display 1002, which presents the current value of a progressive game jackpot. In the illustrative embodiment, the jackpot size increases every play for the bingo game by a percentage of the wager amount; the percentage may be set as one of the portal control functions.

Additionally, the screenshot includes an image of a bingo card 1004 that is assigned to the player by the mobile wagering sub-system 102. The illustrative bingo card 1004 includes twenty-four (24) numbers, a free space in the middle and four (4) randomly located bonus squares. The panel also has a space for displaying ball draw results, termed the bingo display area 1006, from a set of 75 bingo numbers. Additionally, the panel includes a results display area, termed the results summary line 1008, for displaying bingo game results. The largest portion of the illustrative screenshot 1000 includes an entertainment display which is animated and displays the results of the bingo game in an entertaining format. In the embodiment shown the entertainment display portion includes a symbol matrix display 1010, where matching sets of symbols are used to equate to prize values generated from the bingo game.

The illustrative high-speed bingo game is played between players across the network who desire to play the game at approximately the same time. The illustrative high-speed bingo game is played by having the authorized client device 112 communicate with the mobile wagering sub-system 102, and the results generated by the mobile wagering sub-system 102 are communicated to the authorized client device 112, which presents the bingo game results in an entertaining manner that awards a prized that matches the bingo win.

In the illustrative embodiment, the high-speed bingo game includes two winning patterns, a Four Corner pattern, which is won by the first player (or players) to get all four corners of their bingo card called, and a Small Frame, which is won by the first player (or players) to complete the set of eight squares surrounding the center square. The illustrative game session for a high-speed game is initiated when a player touches the PLAY button to initiate the game session. The next game event includes having the bingo display area 1006 "drop down" and shows a blank bingo card and draw. A message is sent to the mobile wagering sub-system 102 requesting the initiation of a game session. The mobile wagering sub-system 102 determines if other players have made a similar request. If no other player is found in a specified time period then the initial play request is aborted and the cash balance in the player account is refunded the play amount.

If at least one other player is found within a specified wait time, then a bingo card is assigned to each player and the game is played rapidly by the mobile wagering sub-system 102. As an example, the total time for the MWS to process the wager may be under one second. The mobile wagering sub-system 102 then sends game information and results to each participating client. The game information broadcast by the mobile wagering sub-system 102 may include bingo card numbers, the location of bonus squares, color coded ball draw results (green for completion of the Four Corner (4C) game and blue for completion of the Small Frame (SF) game), results summary lines, prize value for each authorized client device and other such bingo or slot game information.

Referring to FIG. 10A, the illustrative mobile application running on the authorized mobile device 112 displays the bingo card and bonus squares. Additionally, the illustrative mobile application displays the ball draw in sequence and indicates squares on the bingo card image that have been called. The authorized mobile device also displays the results summary line 1008, which shows the results of the illustrative four corner competition and the status of the small frame competition.

Referring to FIG. 10B there is shown further detail of the results summary line. By way of example and not of limitation, the results summary line 1008 includes a) an abbreviation for the pattern type (4C or SF). Additionally, the results summary line 1008 includes b) the number of balls that it took to win the pattern. Furthermore, the summary results line 1008 includes c) the number of bonus squares that were in the winning pattern and the venue name(s) of all the participants(s). Note that fields a, b, c are color coded. Green means that this player was a winner. Red means that another player was the winner and yellow means that the player was tied with another player or players for the win.

The illustrative authorized mobile device 112 includes a touch sensitive display with visual elements that can be pulled or retracted from the touch sensitive display. For example, a tab may be "up" and not visible as it moves down during the game session to enable the player to see the bingo play and then automatically moves upwards and out of sight when the entertainment display begins. If the player touched the tab to "pull down" the display it may remain down during all phases of the play cycle.

In one example of the Flash Bingo game called Martian Invasion, the prize structure includes prizes for being the first card to complete a winning pattern such as a four (4) Corner Winner may receive 2.5% of the total wagered on the game by all participants and the Small Frame winner may receive 2.5% of the total wagered on the game by all participants. The illustrative Martian Invasion $2 theme may also have bonus prizes as follows:

| Number of Balls | Bonus squares in the winning pattern | Prize |
|---|---|---|
| 4 Corner Bonus prizes (all winners of the 4 corner game are eligible) | | |
| 5-10 | 1 | $200.00 |
| 5-10 | 0 | $150.00 |
| 11-15 | 1 | $100.00 |
| 11-15 | 0 | $70.00 |
| 16-20 | 1 | $50.00 |
| 16-20 | 0 | $40.00 |
| 21-30 | 1 | $25.00 |
| 21-30 | 0 | $15.00 |
| 31-35 | 0 | $10.00 |
| 36-40 | 0 | $6.00 |
| 41-45 | 0 | $3.00 |
| 46-75 | 0 | $1.00 |
| Small Frame Bonus Prizes (all winners of the Small Frame game are eligible) | | |
| 8-35 | 1 | $260.00 |
| 8-35 | 0 | $500.00 |
| 36-40 | 1 | $75.00 |
| 36-40 | 0 | $98.00 |
| 41-50 | 0 | $24.00 |
| 51-55 | 0 | $11.00 |
| 56 or more | | No Bonus Prizes |

Progressive prizes may also be associated with high-speed bingo game presented in FIG. 10. All players playing the same denomination, regardless of the Flash Bingo game theme chosen, participate in the same progressive jackpot game, with the same contribution percentage and the same probability of winning that prize. For example, the probability of winning that prize, which occurs when the 4 corner pattern is covered in 4 balls, is 0.00000082, or odds of 1 in 1,215,450. The game provider may provide a jackpot seed amount, and the jackpot may accumulate based on a percentage contribution from all Flash Bingo play. Although all players playing the same denomination contribute to and are competing for the same progressive jackpot prize, bingo games are specific to a particular game theme, so a player that has selected one game theme may only compete with another player or players who select that same theme. For example, the progressive jackpot for the $2 game denomination may have an initial prize of $5,000, or more. Player contributions may be set to 2%.

Figure 11A:
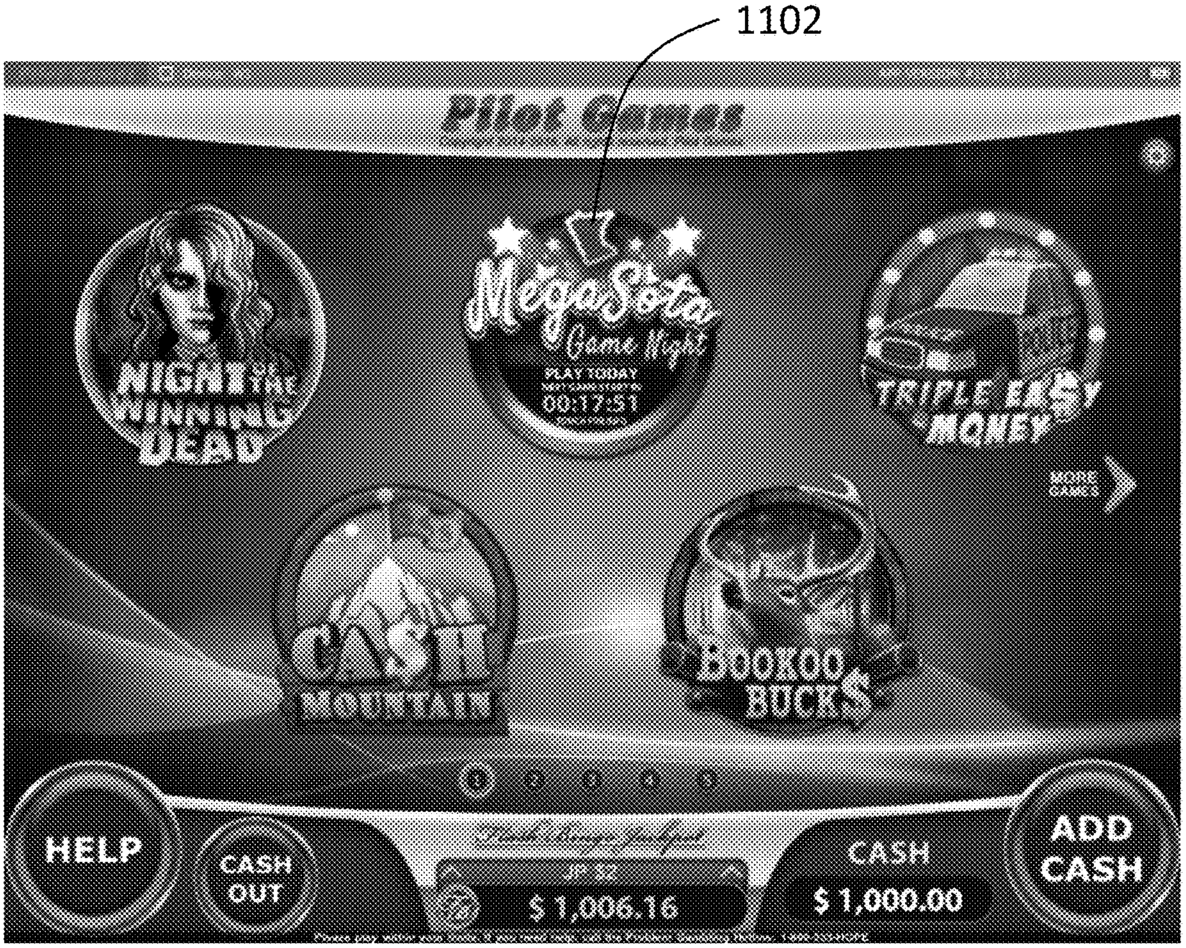
FIG. 11A shows an illustrative lobby with an icon labeled "MegaSota Game Nite," which identifies access to a Linked Bingo Tournament (LBT).

Referring to FIG. 11A there is shown an illustrative lobby with an icon labeled "MegaSota Game Nite," which identifies access to a Linked Bingo Tournament (LBT). The MegaSota icon 1102 identifies the data and time of the next scheduled tournament. If the next scheduled tournament is close then the timer may perform a count-down to the actual game start.

A Linked Bingo Tournament (LBT) is a variation of high-speed electronic bingo, in which players win prizes based on a series of bingo games played against other players for prize points during a predetermined interval. In the illustrative linked bingo tournament (LBT), players are charged a fee to enter the tournament. Similarly to the high-speed bingo game described above, all bingo games in the tournament are played against other tournament players. In the LBT bingo game winners are awarded points, instead of cash. At the end of the predefined tournament play period, cash prizes are given out to the players that have achieved the highest and/or lowest point scores during the course of the tournament. A pre-determined percent of the entry fees may be allocated for prizes to players.

In the illustrative embodiment, the linked bingo tournament (LBT) sessions are held on scheduled days of the week at specific times. For example, Tuesday evenings between 7:00 and 9:00 may be the schedule time slot for the LBT sessions. Using the Tuesday example, LBT games could begin at 7:00, 7:30, 8:00 and 8:30. The dates and times are scheduled using portal functions that create schedule files in the database of the central system and may be changed from time to time. Notifications of upcoming LBT times may be given to players on their game client devices.

Figure 11B:
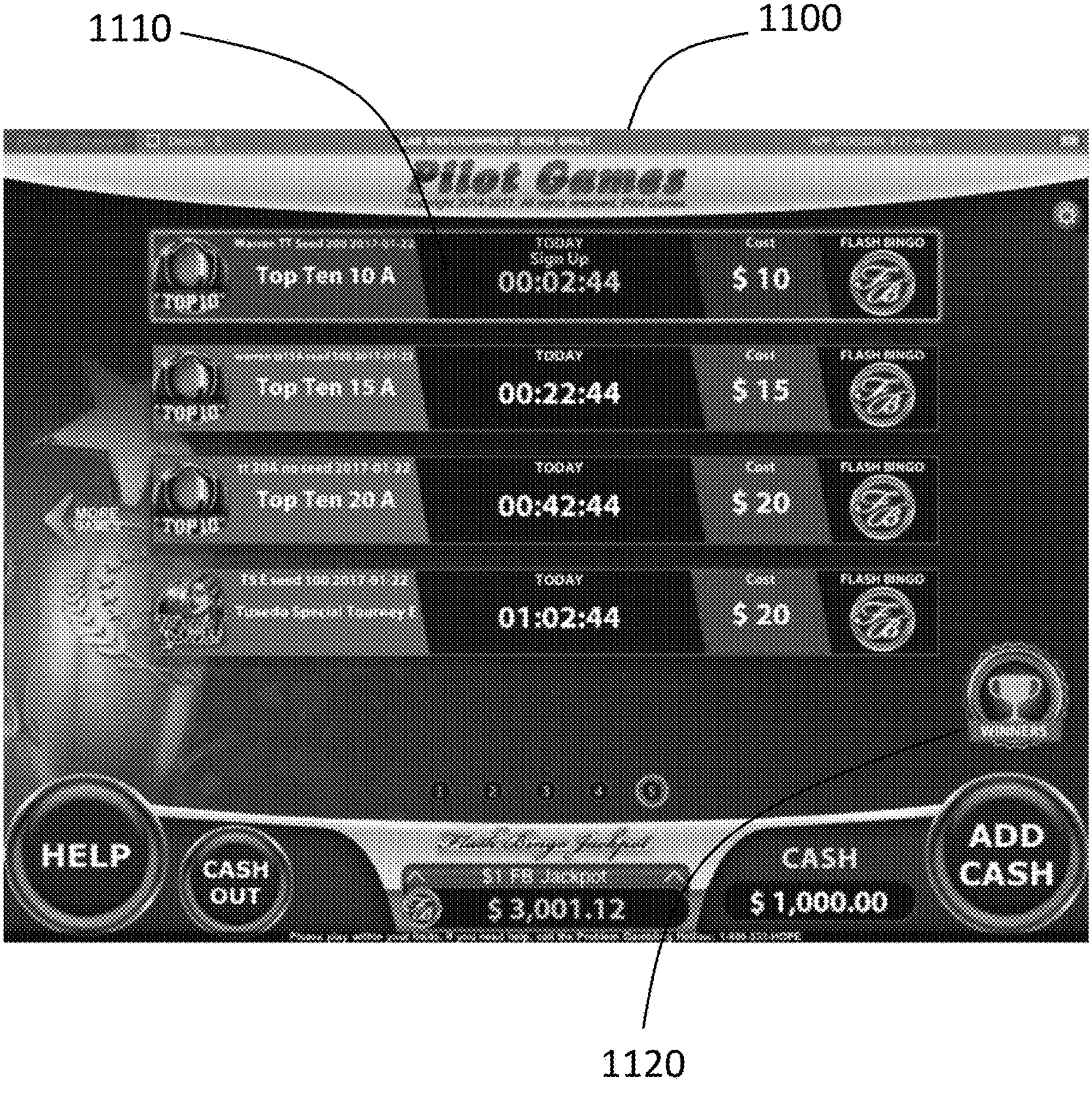
FIG. 11B shows the schedule of tournaments presented to the player that correspond to the MegaSota Game in FIG. 11A.

With reference to FIG. 11A, when a player touches the LBT icon, labeled MegaSota Game Nite 1102 in the illustrative example, the schedule of games shown in FIG. 11B may be shown to the player. This schedule may be available at all participating venues on all enabled devices. Players can participate in a common game experience across a wide geography. In one example, participating venues can be located all across the state of Minnesota, so many participants may be able to compete in real-time.

Figure 12:
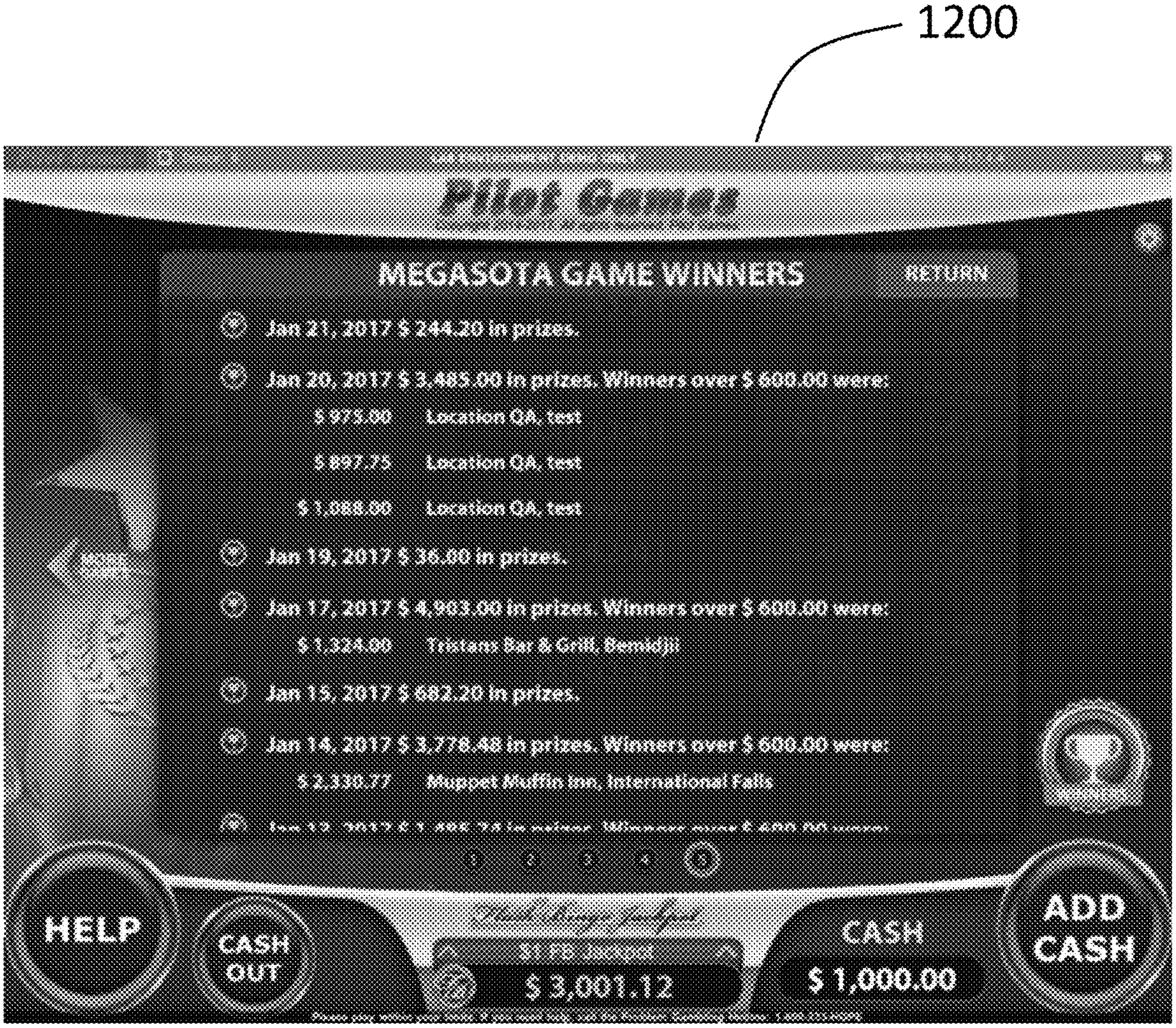
FIG. 12 shows a list of recent tournament winners associated with linked bingo tournaments (LBT).

With reference to FIG. 11B, a player may select a scheduled tournament. The menu item shows the date and time that the LBT is scheduled for. If the LBT is scheduled in the current business day, then the time is shown in the form of a countdown. If the LBT is in the pre-scheduled enroll period then the color of the time changes. The menu description also includes a name for the LBT, the name of the game theme being played, and the cost of entry. Another item on the LBT Menu screen is the WINNERS icon 1020. Touching the Winner icon brings up a list of recent tournament winners as shown in FIG. 12. This may include LBTs and/or Bingo games.

Figure 13:
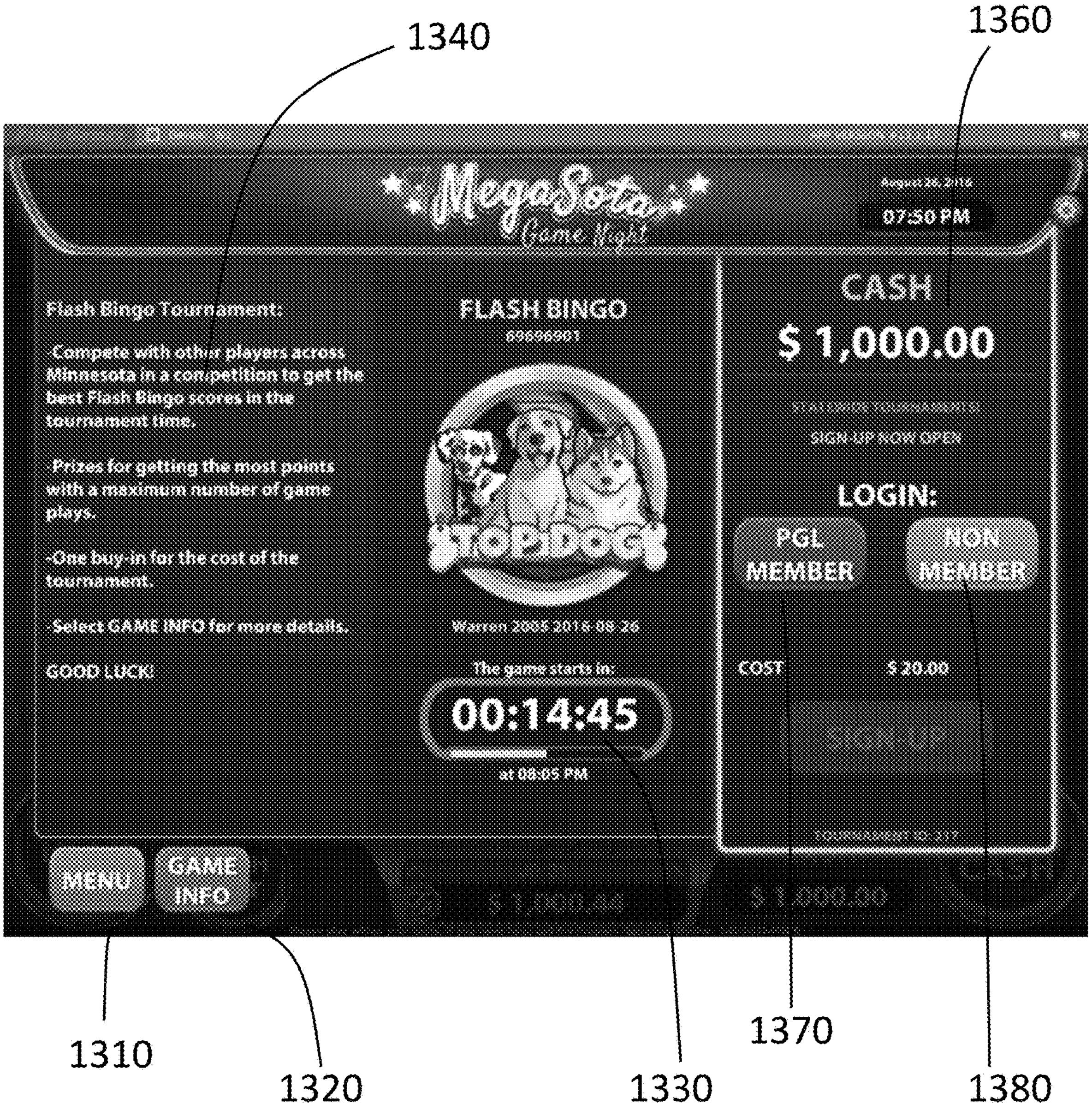
FIG. 13 shows a tournament login screen.
Figure 14:
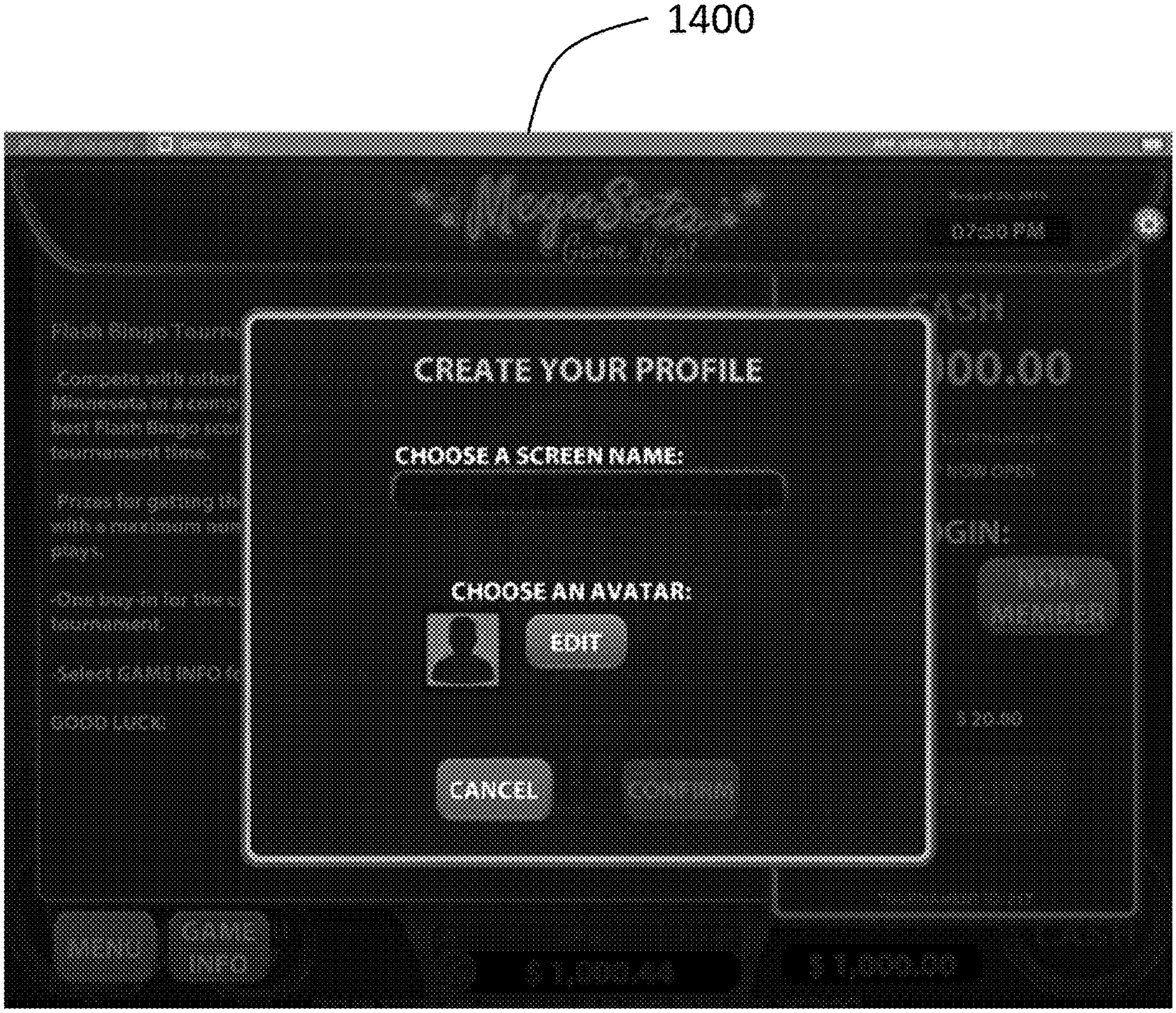
FIG. 14 shows a screen where a player chooses a screen name for a tournament.
Figure 15:
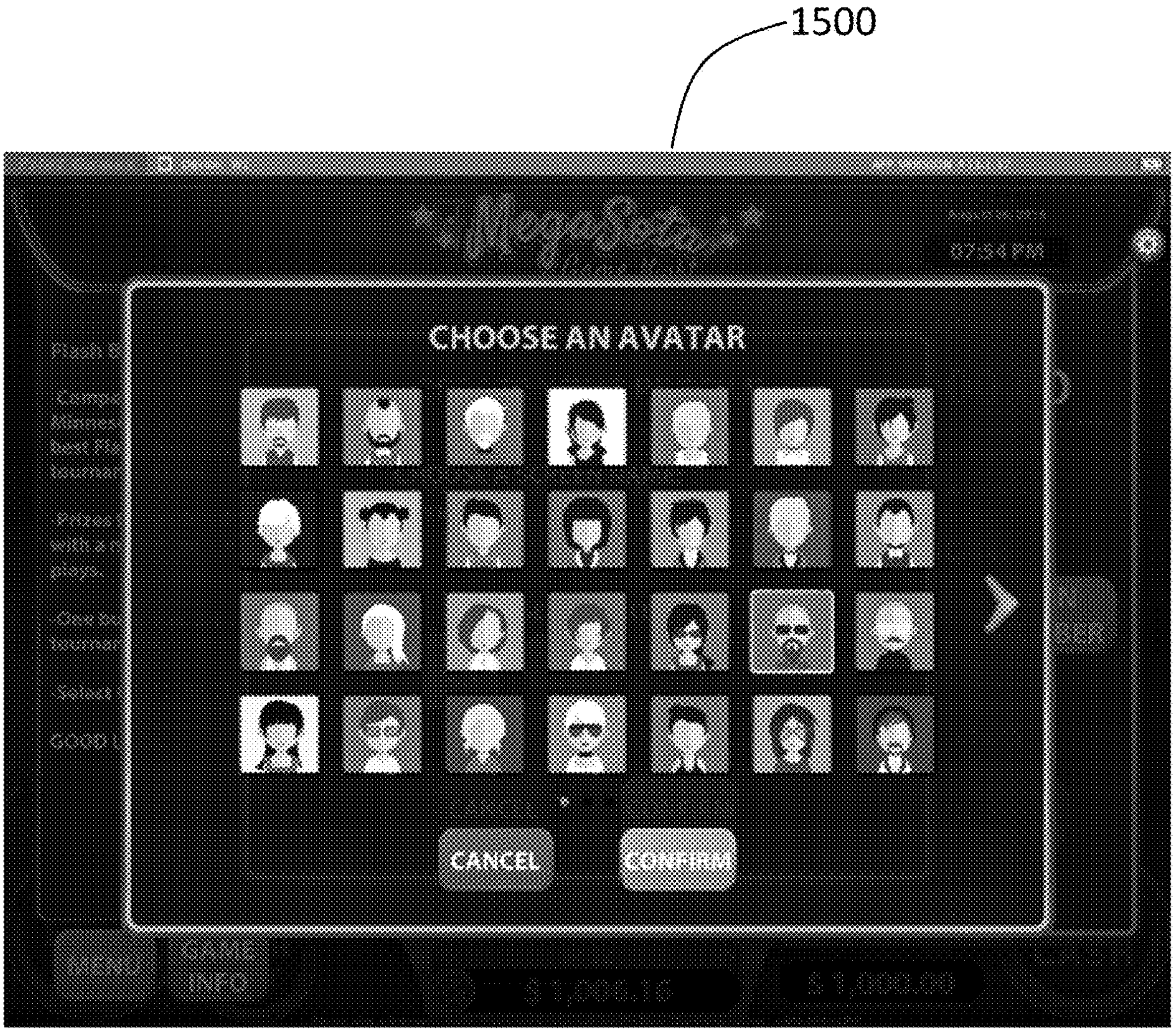
FIG. 15 shows an avatar selection screen.
Figure 16:
FIG. 16 shows a sign-up screen for a linked bingo tournament.

When the player selects a menu item 1110 as shown on FIG. 11B, the player is presented with the enrollment screen shown in FIG. 13. More specifically, FIG. 13 includes a Menu button 1310 that allows the player to return to the tournament menu screen. The Game Info button 1320 takes the player to descriptive information describing the play of the electronic high-speed bingo game, the points that can be won, rules for play, and the prizes available for final point score rankings. The screen also may have alternative buttons for logging in as a member of a group (PGL) or as an unaffiliated player (Non PGL). In either case, the player may be taken to a player profile screen as shown in FIG. 14. The player may be asked to enter a screen name, using an iOS or Android pop-up keypad and also to use the Edit button to bring up the avatar selection screen illustrated in FIG. 15. With reference to FIG. 16 once the player has selected an avatar and screen name they may be presented with the opportunity to sign up for the LBT using the SIGN UP button 1610 as shown in FIG. 16. In addition to those requirements the LBT must be in its pre-scheduled enrollment period and the player must have enough cash in his player account as shown on the screen 1620.

Figure 17:
FIG. 17 shows a successful sign-up screenshot.

When the player sign up is successful FIG. 17 may be shown until the tournament starts. In one implementation the player may leave this screen using the Menu button and play other games, such as electronic pull-tab games or Flash Bingo games until the tournament starts. If a player is enrolled in an upcoming tournament and is playing another game a special icon may appear on those games, similar to the one shown as 1720. Touching that icon may bring the player back to the tournament.

Figure 18:
FIG. 18 shows a tournament start screenshot.

The screen shown in FIG. 18 may show when the tournament starts. It shows the number of players in the tournament in all venues 1830, and also shows the total revenue 1820 which may determine prizes which may be a percentage of the LBT revenue. The Play button 1810 may take the player to the tournament game screen.

Figure 19:
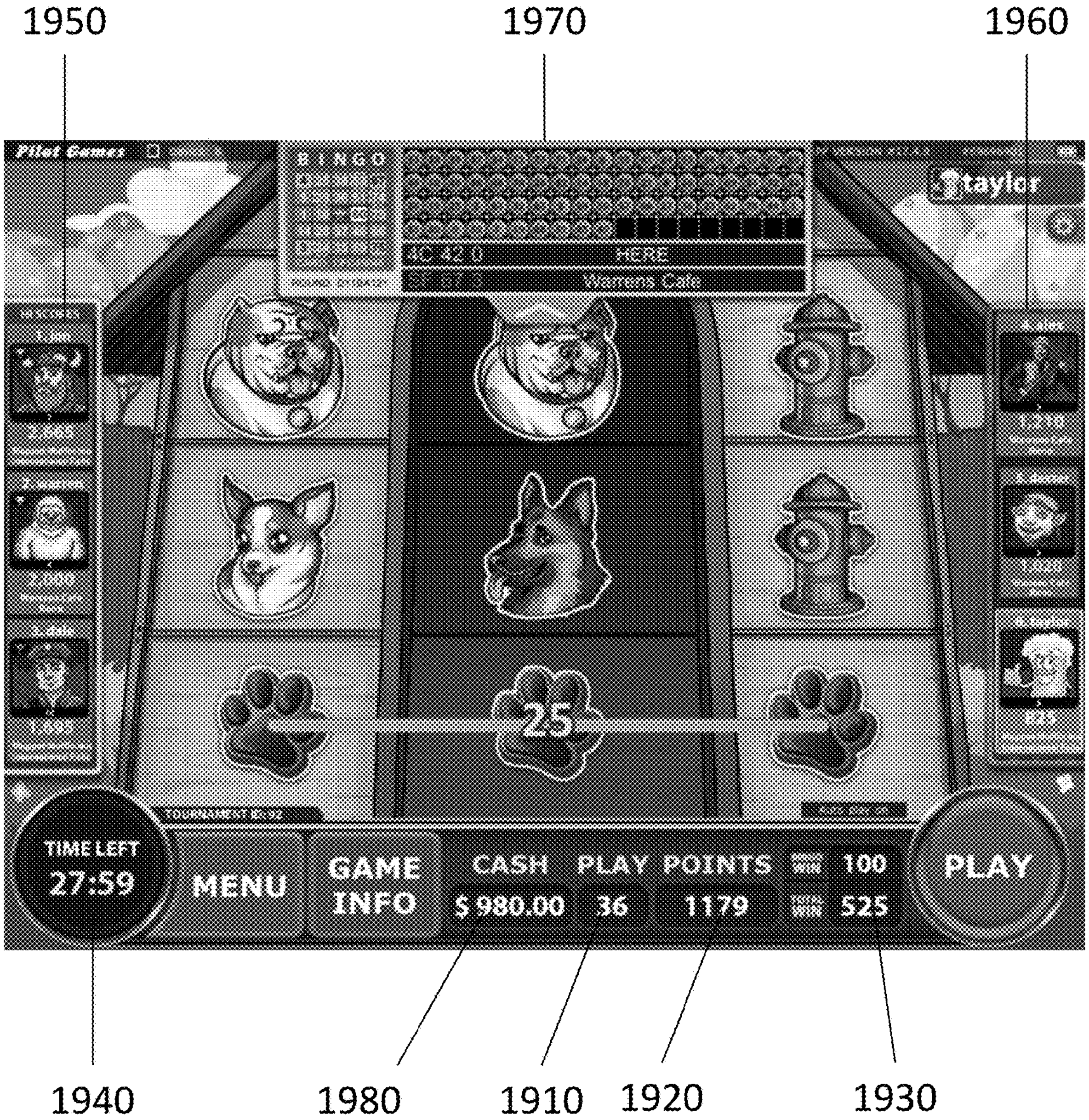
FIG. 19 shows an illustrative screenshot for an LBT game called Top Dogs.

FIG. 19 is an illustrative LBT game screen. It is a game them called TopDogs, but many game themes are possible. As with Flash Bingo all prize wins are determined by the result of a high-speed electronic bingo game 1970. In the case of the LBT the prizes are expressed in points. After the bingo game is complete the screen may be animated with symbols and the final position of the symbols may have values that add up to the total points awarded in the bingo game. The graphic entertainment is intended to make the game more interesting and entertaining for the player. The play count 1910 shows the number of plays left that the player has which decrements with each play from the starting point which is a predefined play total that is determined when the tournament is scheduled. The Points meter 1920 shows the total point accumulated by the player in the tournament. The Win meters 1930 show the points won by winning the bingo patterns and by winning bonus points. The clock 1940 show tournament time left and ticks downward from the starting value which is the prescheduled length of the tournament. On the left and right side of the screen are sets of screen names. Points, avatars and locations 1950 and 1960. These are a critical element in establishing the social nature of the competition. They give the screen names of the players they are playing against and where they are. The icons on the left 1950 are the 3 highest point earners. If the player on the device is not one of the top 3 point getters then the players position may be shown in the 3 icons on the right 1960, which may show the player's position and the players nearest to him or her.

Figure 20A:
FIG. 20A shows a tournament play screenshot in which all players have completed their allotted number of pays or the tournament time expires.
Figure 20B:
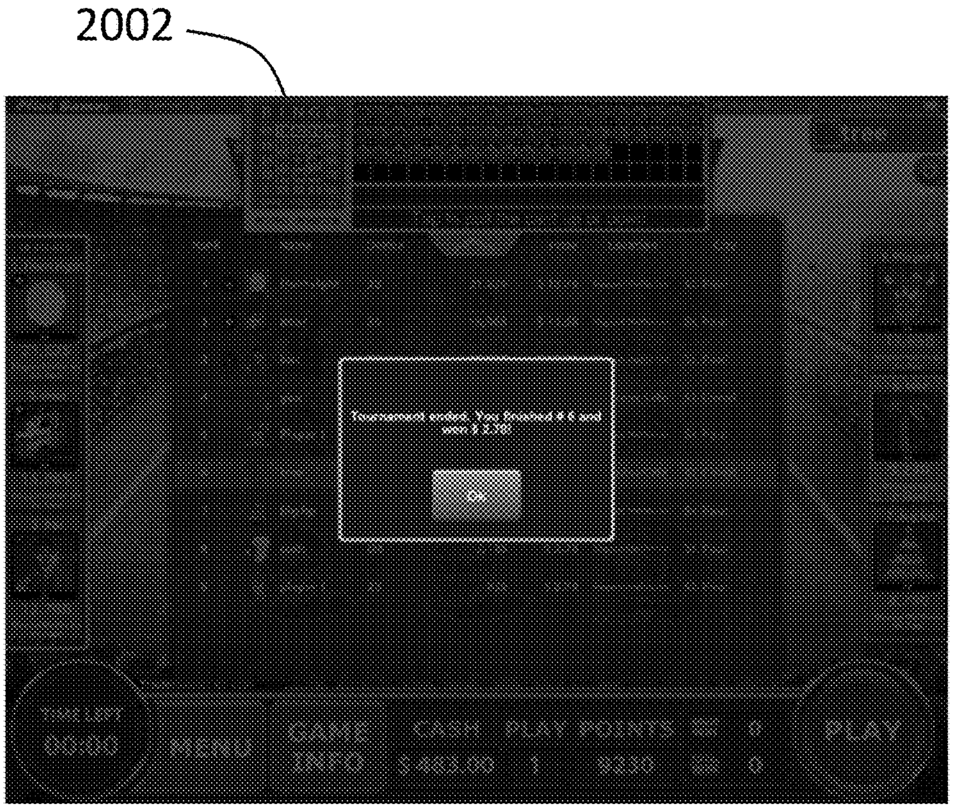
FIG. 20B shows a screenshot that the tournament has ended and that the player has been awarded a prize.

Tournament play continues until all players have completed their allotted number of pays or the tournament time expires, at which time a screen appears as shown in FIG. 20A. More specifically, FIG. 20A provides a screenshot 2000 associated with having completed the player's rounds and an instruction to wait until the end of the tournament to obtain the tournament results. FIG. 20B provides an illustrative screenshot 2002 that the tournament has ended and that the player has been awarded a prize.

A special provision may be made to cover the case where a player is trying to play a game and cannot complete it because bingo requires a competitor, and all other players may have completed their allotted games. In one illustrative embodiment, the player in that condition receives a predetermined allotment of points.

Figure 21:
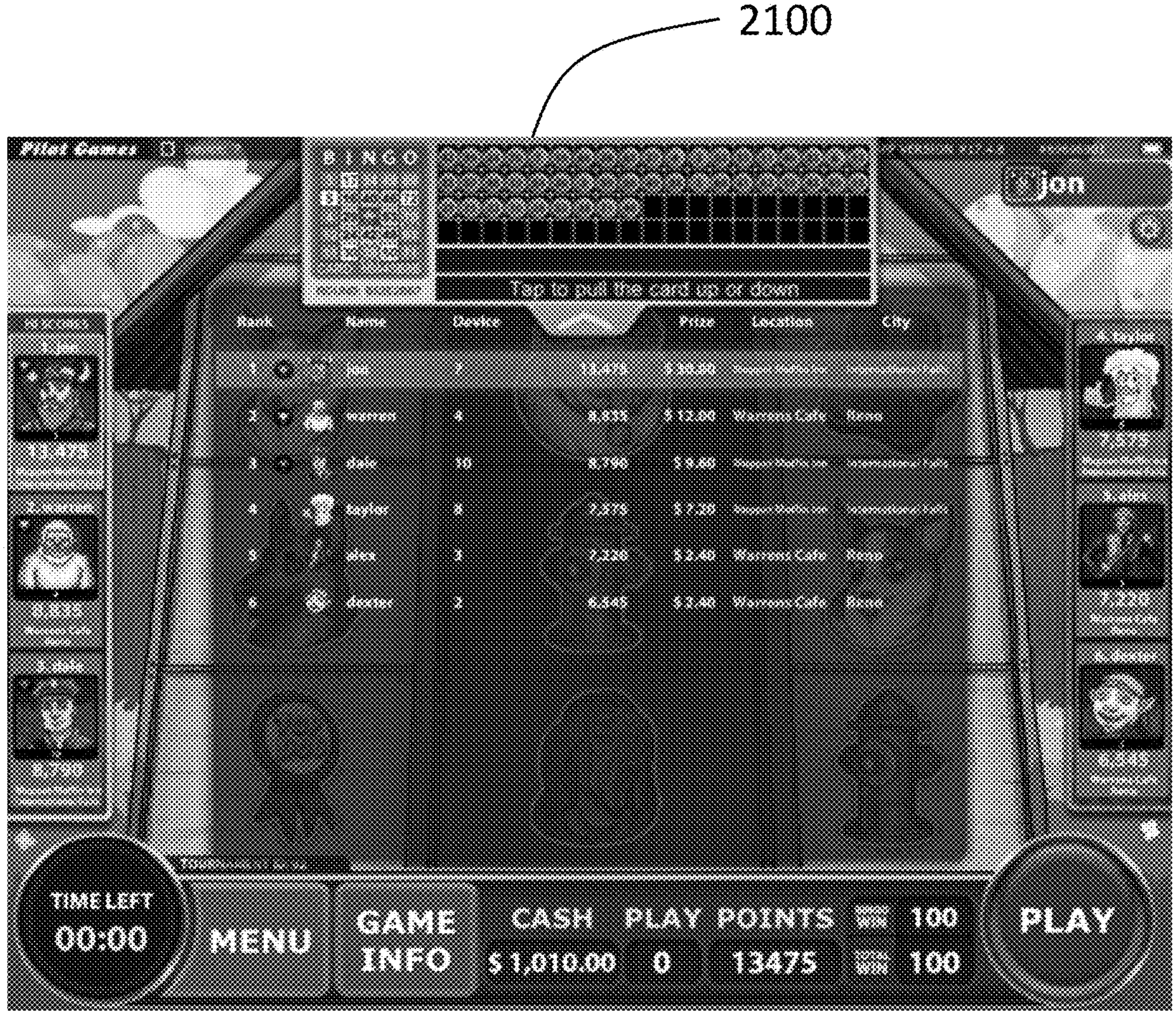
FIG. 21 shows a summary screenshot of players who won prizes.

FIG. 21 illustrates an implementation of a final screenshot 2100 showing all participating players a summary of all players who won prizes, including their screen name, point totals, prizes won, and location. For example, the top prize winner is "jon," and jon was playing at the Muppet Muffin Inn where he achieved 13,425 points in tournament play and won a prize of $30.00.

If the player interacting with the authorized mobile device 112 is a winner, the prize amount may normally be added to the players Cash, unless jurisdictional or IRS rules require special handling. After the tournament game session is completed, the player may cash-out to redeem their prize, or continue playing any offered games. Note, large prizes may be subject to reporting and claim procedures to comply with federal or jurisdictional reporting requirements.

Excitement and player enthusiasm for the illustrative linked bingo tournament (LBT) games are greatly enhanced when the basic game is combined with the video presentation sub-system (VPS) 104, a VPS monitor or stationary monitor 110 and broadcast content that includes player ranking information during the LBT game session or game sessions. For example, the video presentation sub-system 104 may be configured to combine output from the mobile wagering sub-system 102, such as one or more game session results and/or one or more bonus session results, with commentary from a broadcaster and visual images of the games in play. The video generated by the VPS 104 and presented on the venue VPS monitor or stationary monitor 110 converts an individual bingo gaming experience to a group bingo experience, in which many people in a venue can watch or participate. It may be expected that when a player in a venue is doing very well and competing against players in other venues in other towns in a visible way, that the local players may enthusiastically support their own player. Expanding the degree of involvement provides a significant way of converting individual game play into a social event that attracts other players.

By way of example and not of limitation, linked bingo tournament (LBT) games have a short duration, e.g. 15 minutes. LBT game count-downs may be shown on the authorized mobile device 112 and the venue's VPS monitor or stationary monitor 110. In the illustrative embodiment, the venue's VPS monitor or stationary monitor 110 may be activated at least 30 minutes before the LBT game session begins and through the duration of the LBT session and for at least 30 minutes after the completion of each LBT game session.

By way example and not of limitation, an illustrative tournament game session may include a game buy-in of $20 so that if a player elects to play the tournament, $20 may be transferred to the authorized mobile device 112 with a POS device 114 as described above. In the illustrative tournament game session, there may be 500 players participating and, thus, based on a fee of $20 per player, the total LBT game sales are: $20×500 persons=$10,000. If a further assumption is made to support an 85% prize pool, the total LBT game prizes awarded may be $8,500. Some of the LBT Game Prizes may be configured to contribute to an LBT Linked Tournament Jackpot, and players participating in an LBT game session may have an opportunity to win those prizes based on achieving a threshold total prize level, or other criteria. That jackpot could be a progressive and the pool would enlarge from tournament to tournament until a player met the winning criteria.

Multiple variants of the LBT may be available for schedule. Some tournament games may have a pay structure similar to the schedule presented below:

| Players in game | | 200 | 250 | 300 | 500 |
|---|---|---|---|---|---|
| Entry Fee | | $20.00 | $20.00 | $20.00 | $20.00 |
| Total Fees | | $4,000.00 | $5,000.00 | $6,000.00 | $10,000.00 |

-continued

| Players in game | | 200 | 250 | 300 | 500 |
|---|---|---|---|---|---|
| Total Prizes | | $3,400.00 | $4,250.00 | $5,100.00 | $8,500.00 |
| 1st Prize | 30.00% | $1,020.00 | $1,275.00 | $1,530.00 | $2,550.00 |
| 2nd Prize | 15.00% | $510.00 | $637.50 | $765.00 | $1,275.00 |
| 3rd Prize | 15.00% | $510.00 | $637.50 | $765.00 | $1,275.00 |
| 4th Prize | 10.00% | $340.00 | $425.00 | $510.00 | $850.00 |
| 5th Prize | 8.00% | $272.00 | $340.00 | $408.00 | $680.00 |
| 6th Prize | 6.00% | $204.00 | $255.00 | $306.00 | $510.00 |
| 7th Prize | 5.00% | $170.00 | $212.50 | $255.00 | $425.00 |
| 8th Prize | 3.00% | $102.00 | $127.50 | $153.00 | $255.00 |
| 9th Prize | 2.00% | $68.00 | $85.00 | $102.00 | $170.00 |
| 10th Prize | 1.00% | $34.00 | $42.50 | $51.00 | $85.00 |
| 11th Prize | 1.00% | $34.00 | $42.50 | $51.00 | $85.00 |
| 12th Prize | 1.00% | $34.00 | $42.50 | $51.00 | $85.00 |
| 13th Prize | 1.00% | $34.00 | $42.50 | $51.00 | $85.00 |
| 14th Prize | 1.00% | $34.00 | $42.50 | $51.00 | $85.00 |
| 15th Prize | 1.00% | $34.00 | $42.50 | $51.00 | $85.00 |
| TOTALS | 100.00% | $3,400.00 | $4,250.00 | $5,100.00 | $8,500.00 |
| Prize Return | | 85.00% | 85.00% | 85.00% | 85.00% |

In the event of a tie prizes may be divided equally among the players. For example, using the above prize structure, and assuming there are 200 players, and that the 4th and 5th place are tied, then the prize won by each of those players would be: ($340+$272)/2=$306. Rounding rules may be subject to jurisdictional regulations.

In the illustrative tournament bingo game session, the player's entry fee of $20 allows a fixed number of plays (e.g. 80). For each play, the players "Plays" meter 1306 may be decremented by 1. If a player wins a prize, the prize points are added to the "Points" meter 1204. All games are played against another tournament player for each round. Players may randomly compete versus different players on each card, based on timing of game starts. Only winners of the Small Frame or Four Corner games may receive any points. As in regular Flash Bingo, points may be awarded for winning those games and meeting criteria for winning bonus points associated with those wins.

In operation, LBT tournaments may be identified by a specific game icon on the game client Menu screen. Activation of the game requires that the player have sufficient credits to play according to the game rules. Also, a minimum number of participating players entering into the prize pool may be required to initiate a linked bingo tournament game. In the illustrative embodiment, each bingo tournament game session includes of at least two (2) players playing modified Flash Bingo with a standard 24 number bingo card numbered 1 through 75, B-1-N-G-O with a FREE space in the middle. Games are activated by a player pressing PLAY, which initiates play and selects auto-daubing for each round. During the roll-up period prior to the commencement of a linked bingo tournament (LBT) game session, information regarding the total number of player participants and total prize pool for that specific tournament may be exhibited on the player screen and VPS video monitor as shown in FIG. 22 and FIG. 23.

Figure 22:
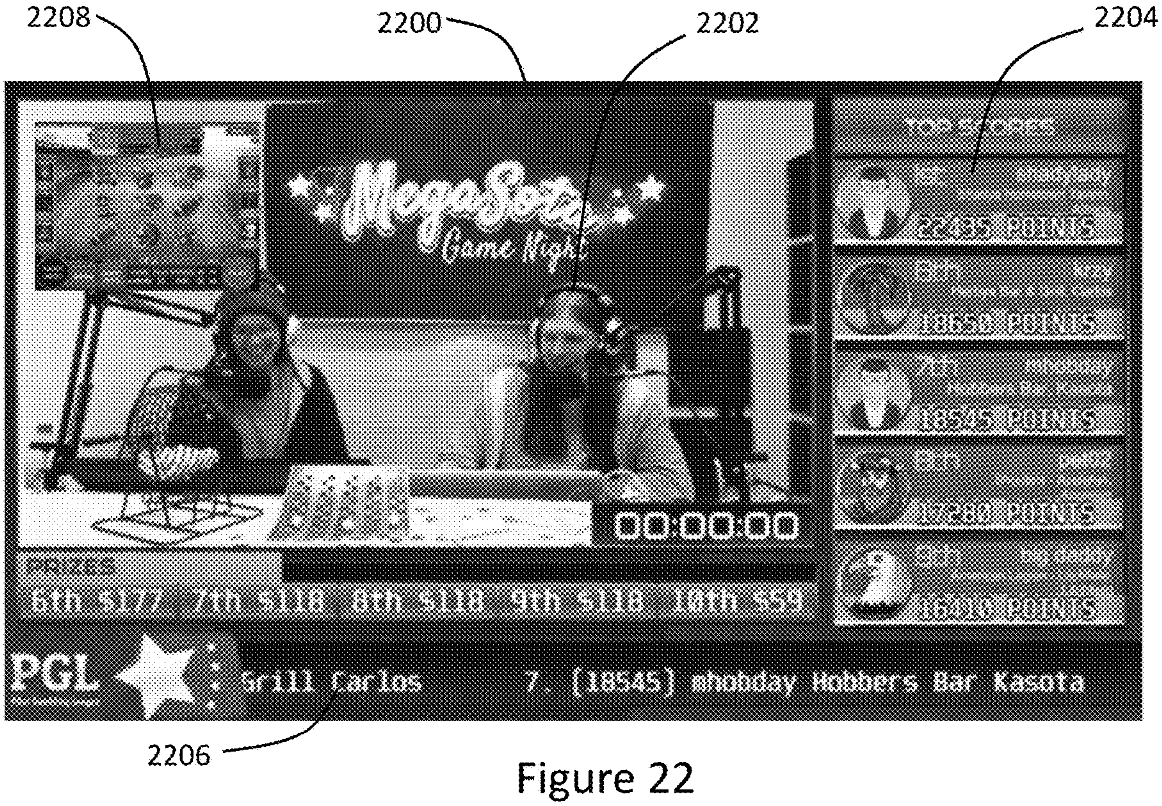
FIG. 22 shows an illustrative screenshot for a VPS broadcast of a Flash Bingo tournament that is presented on the venue based VPS video monitor.
Figure 23:
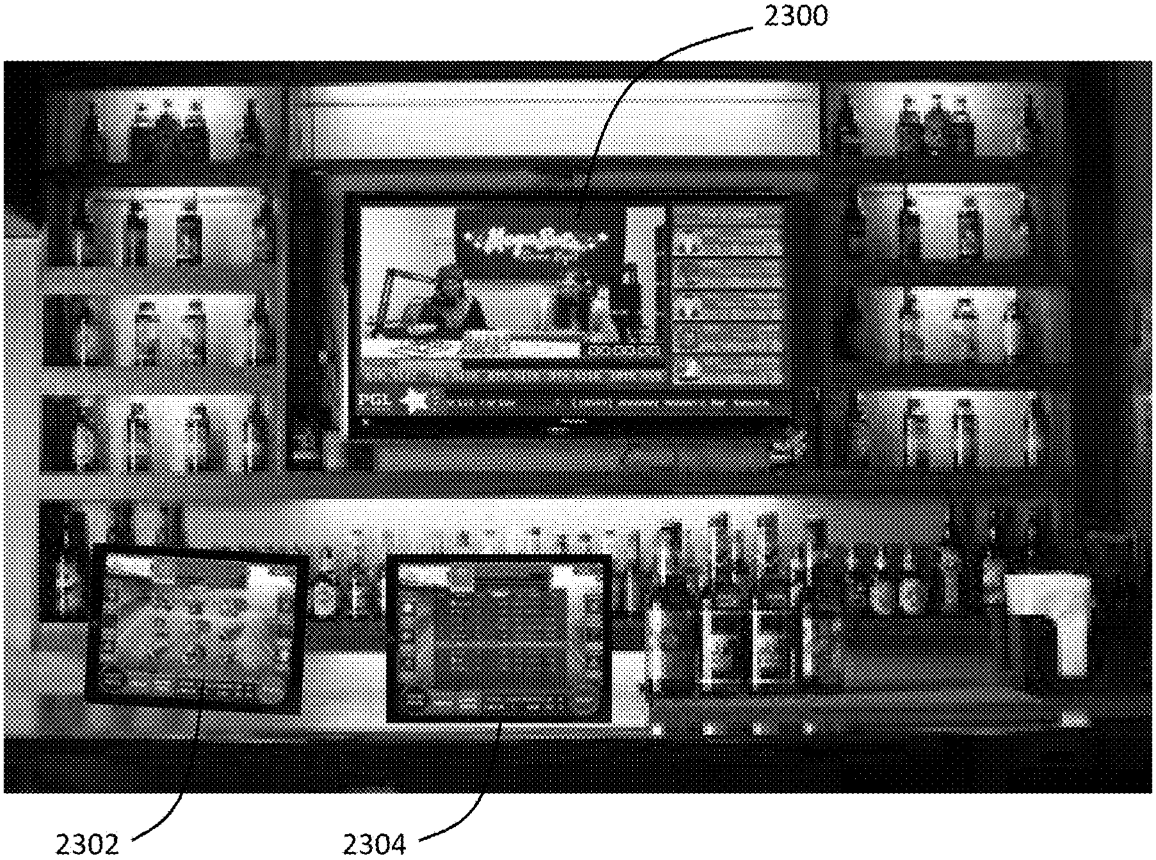
FIG. 23 shows an image reflecting the player experience at an illustrative venue.

Referring to FIG. 22, there is shown an illustrative screenshot for a tournament game coverage as implemented on the VPS) and is presented on the venue based VPS video monitor. The video screenshot 2200 includes a host 2202 that is presenting the tournament event, an updated leader board 2204, a banner with local site data 2206, and a background screen 2208 showing an illustrative tournament game from selected devices playing at selected venues.

The illustrative screenshot 2200 may be presented on a VPS monitor or stationary monitor 110. During the illustrative tournament game the venue based VPS video monitor or stationary monitor 110 may be configured to present a leader board 2204 to players on a real time basis. The VPS output may also be configured to show the point totals for leading players and identifies the city and venues where the players are playing 2204. Additionally, the VPS video monitor or stationary monitor 110 may display the time remaining in the tournament. In the illustrative embodiment, leading players are identified by a chosen screen name and player selected avatars. The centralized gaming system 100 incorporates a commercially available software filter to avoid use of improper names or initials on the leader board. As described above, the leader board may also be available on player's client devices.

In another illustrative embodiment the video presentation sub-system 104 provides streaming content to support mobile wagering sub-system 102 games, including Tournament Bingo. The video presentation sub-system 104 may be broadcasting 60 minutes, for example, prior to the illustrative linked bingo tournament (LBT) and 30 minutes following the conclusion of tournament sessions. By way of example and not of limitation, the content presented on the VPS video monitor may include: games promotional videos, streaming Flash Bingo Jackpot information, charity promotional videos, advertising and the actual sports-style coverage of the LBT games and bingo games themselves. It should be understood that the time period for a broadcast may be determined by the producers and can be any suitable length of time.

Referring now to FIG. 23 there is shown is an image reflecting the player experience at an illustrative venue. The VPS broadcast is shown on an illustrative TV monitor 2300, identified also in FIG. 6 as item 606, and gaming clients 2302 and 2304 are shown on a counter. An objective of the VPS system is to provide a social interaction that greatly enhances the interest and enjoyment in the play of the games. In addition, since the broadcast is designed for a large-format visual representation in the gaming venue, it is also visible by non-players and may advertise the game and in many cases find non-players in the venue rooting for the success of the active players in their location. This interactivity is a major component of generating a social quality to the game which may be especially attractive to desirable younger-generation players.

During the linked bingo tournament game session, the leader board information may scroll to show the top scores in the network on a "real-time" basis. This leader board information may be expected to cover a state, or more, depending on the jurisdiction hosting the game. The leader board updates may occur frequently, e.g. every 10 seconds. At the end of the LBT game, the winners, the venue where they played and the prizes won may be broadcast. This information may scroll and could remain on a split screen for a period of time. The top winner(s) may be celebrated. As described above, the prize meter indicates the total prize pool for an upcoming game based on the volume of players enrolling in the LBT.

By way of example and not of limitation, for an illustrative Tournament Bingo games the player is advised in real-time of information about the status of the tournament, including size of the jackpot pool, number of players, leaders (identified by a "handle" and location), and time remaining in the tournament. This data may be enhanced with visual representations and comments from a moderator and field reports. Thus, the player obtains a sense of community and competition which cannot be gained from the client game interface itself.

Another game style related to the Linked Bingo Tournament is Bingo. This is a more traditional style of bingo as compared to the high-speed bingo that is the basis for Flash Bingo and the Linked Bingo Tournaments.

Bingo games may be scheduled in the tournament menus interspersed with linked bingo tournaments. In one example, a tournament series may be scheduled that has four (4) events, namely, two (2) Flash Bingo Tournaments and two (2) bingo games. Each event may take 30 minutes, so the entire session, supported by the VPS would be a two hour session.

The following describes an illustrative implementation of a bingo tournament session. From the tournament menu illustrated in FIG. 11B a player may select a bingo game.

Figure 24:
FIG. 24 shows an illustrative bingo game enrollment screen for an illustrative bingo game.

Referring to FIG. 24 there is shown an illustrative bingo game enrollment screen for an illustrative bingo game. An illustrative embodiment may present a broad array of bingo variations, distinguished by graphic theme, jackpot possibilities, winning patterns, wagering denomination and prize structures. In the illustrative embodiment, different customizable bingo games may be scheduled and configured through the management system portal. The illustrative enrollment screen 2400 requires that a player select a screen name in space 2410, which is performed with a pop-up keypad. A jackpot value, if appropriate to the bingo variant, is displayed in space 2420. Space 2430 indicates a countdown to the game start. The purchase price and control of the number of cards to be purchased is presented in space 2440. Players can purchase a minimum number of cards which may be as low as one and vary between bingo game variants up to a maximum number which may be set by jurisdictional regulations. The system may support incremental sales, allowing a player to make a purchase and then add to it. Alternatively, there is also allowance for a player to cancel a sale.

Figure 25:
FIG. 25 shows a screenshot of bingo game play.

Referring now to FIG. 25, there is shown a screenshot 2500 of bingo game before the player initiates game play. In the illustrative embodiment, the player may be required to touch the PLAY button 2510 to enter the game after the game countdown goes to zero. When it is time for the game to start, the number of players enrolled in the game and the total revenue 2530 may be displayed on the right side of screenshot 2500. Additional game information including rules and prizes may be provided by having the player touch the "Game Info" button 2540. When the bingo game play is occurring, the status 2550 indicates that the bingo game is being played and the player should press the PLAY button 2510 to join the game. When the game is joined, FIG. 25 illustrates the main game screen which may display up to 5 cards. If the player has more than 5 cards in play the screen can be scrolled or moved to show the additional cards, 8 to a screen.

Figure 26:
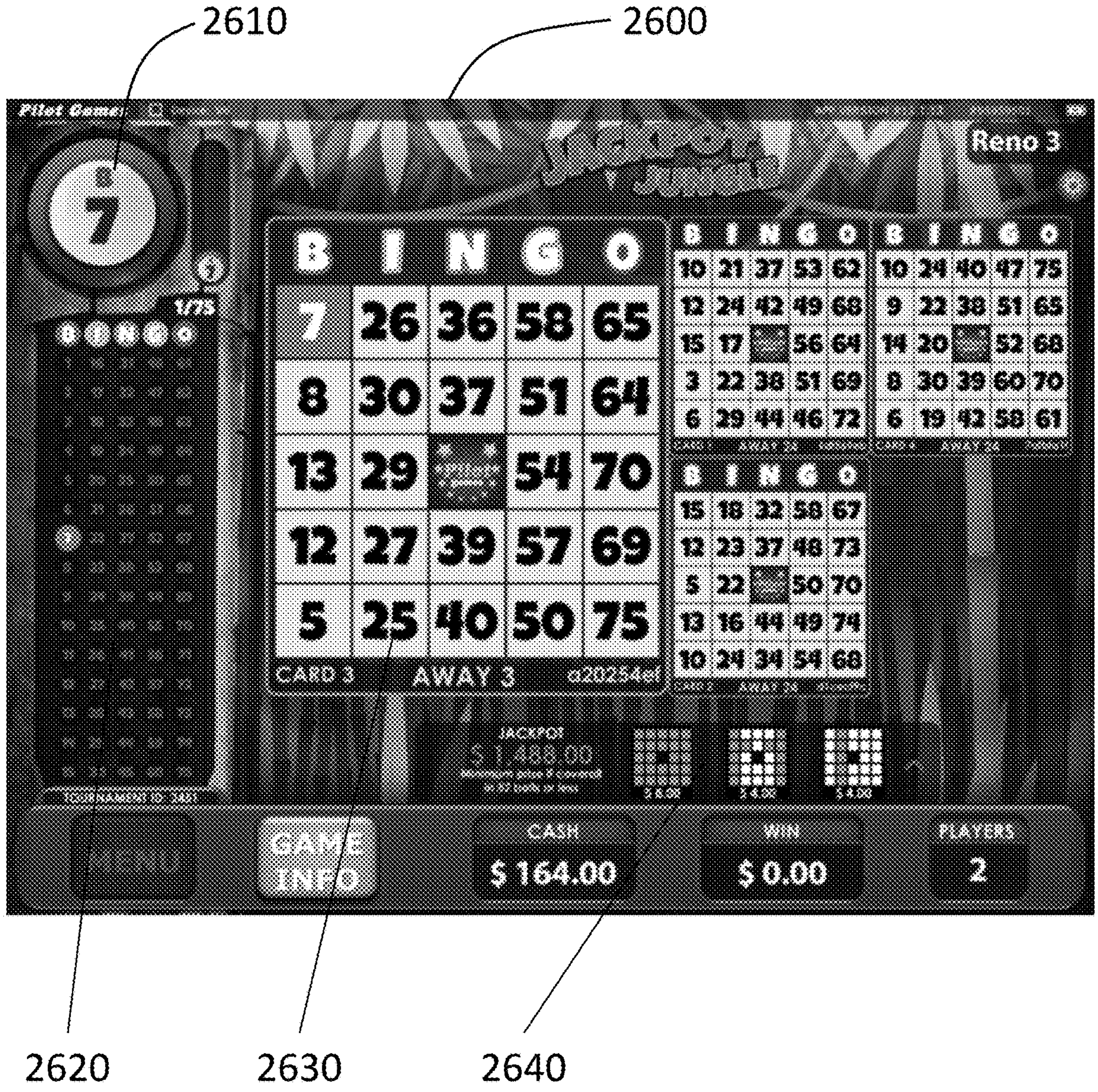
FIG. 26 shows an illustrative screenshot of bingo game play with multiple bingo cards.

Referring still to FIG. 26, there is shown an illustrative screenshot of bingo game play with multiple bingo cards. In the illustrative embodiment, the large card on the first screen is always the one that is closest to getting the next winning pattern. Each card face at the bottom says AWAY X, where X is the number of spaces that need to be filled on the card to get the next winning pattern.

In operation, the central system 100 sends down messages with the ball draws. As each ball draw is revealed the ball is shown on the screen in space 2610. The game board 2620 displays all called numbers and all player cards are marked on the screen as each ball is called. Balls are called at a settable rate in the central system 100. A typical rate may be one ball each 10 seconds, which is similar to the familiar rate that a ball "caller" in a traditional bingo hall might announce balls as they are drawn. A jackpot value may be displayed in space 2630 and the winning patterns and associated prizes are displayed in area 2640. During the ball call the game client may include audio simulating the voice of a caller calling the balls. In the illustrative embodiment, the game displayed has three winning patterns—a straight line, a large M, and a coverall or "blackout", meaning that all 24 fillable spaces are called.

Figure 27:
FIG. 27 shows an illustrative screenshot for a winning bingo pattern.

Referring to FIG. 27 there is shown an illustrative screenshot for a winning bingo pattern. In the illustrative screenshot 2700, the winning bingo pattern is a large M and the awarded prize 2720 is $4.00. As each prize is awarded, the corresponding authorized mobile device presents the awarded prize, e.g. $4.00. If a player is not awarded a prize, then the corresponding authorized mobile device presents a message indicating that another player has been awarded the prize, including the amount, player screen name, and location.

Figure 28:
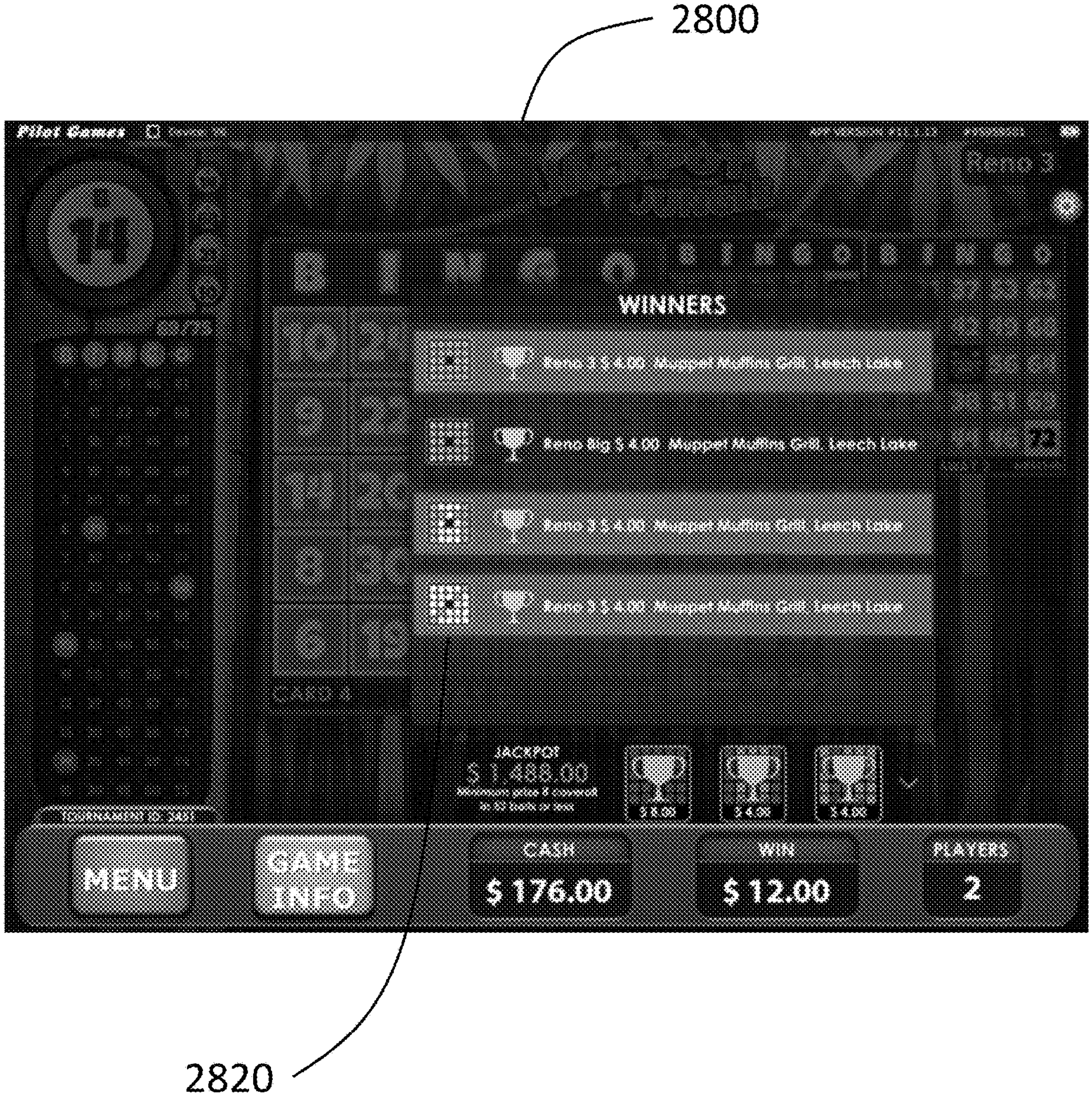
FIG. 28 shows an illustrative winner summary screenshot indicating that all prizes have been awarded for the bingo game.

Referring to FIG. 28, there is shown an illustrative winner summary screenshot indicating that all prizes have been awarded for the bingo the game. In the illustrative embodiment, the illustrative bingo game continues until all patterns are complete. At the end of the bingo game, a list of prize winners is presented to each participating player as shown in the winner summary screenshot 2800. The location, player screen name and amount for each prize awarded are presented in the winner summary screenshot 2800. Prizes may be directly added to the player account balance, except where regulatory or IRS regulation require specific processes.

Figure 29:
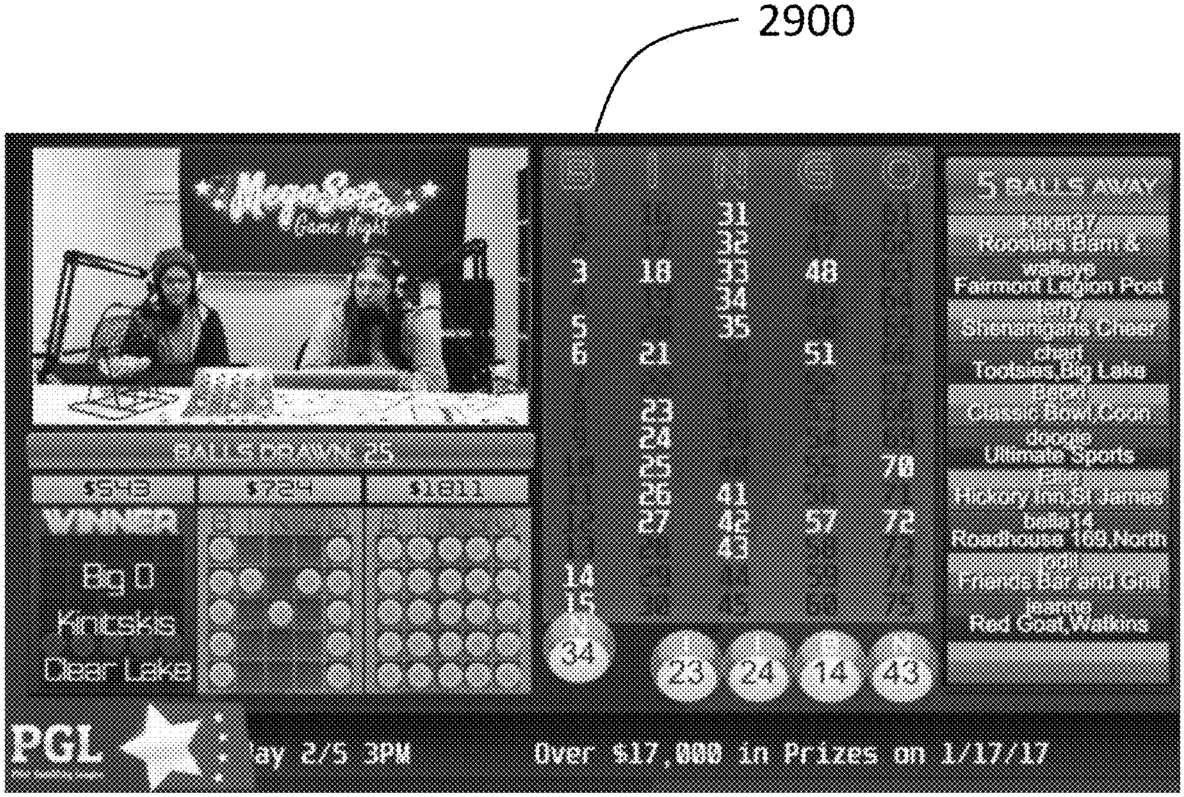
FIG. 29 shows an illustrative VPS broadcast for the bingo game.

Referring to FIG. 29 there is shown an illustrative VPS broadcast 2900 as it might be shown during a bingo game. The player enjoyment of the bingo games is significantly enhanced by the associated presentation on the VPS broadcast. Not only is there the human interest supplied by live hosts, but a competitive element is supplied by listing cards that are getting close to a winning pattern.

Figure 30:
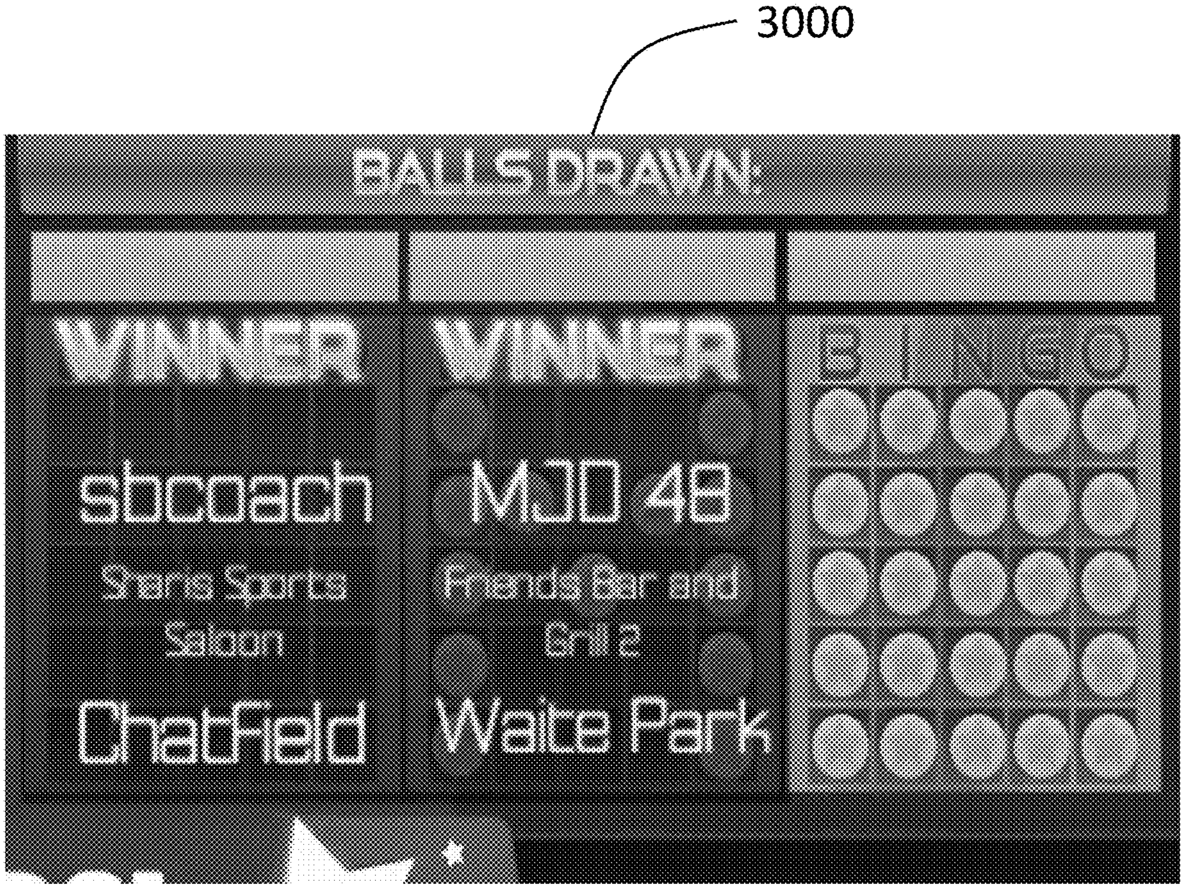
FIG. 30 shows an illustrative screenshot of graphics for a large VPS stationary display.

Referring to FIG. 30, there is shown an illustrative screenshot of a VPS broadcast focusing on winner data during a bingo game. The screenshot 3000 provides an increased awareness of the winner or winners because the large screen identifies the winning players, their venue and location in real-time during bingo game play.

Figure 31:
FIG. 31 shows an illustrative Gaming League Website (GLW) main screen.

Referring to FIG. 31, there is shown an illustrative main screen 3100 for a Gaming League Website. The system and methods presented herein support a Gambling or Gaming League Website (GLW), which is a web-based sub-system that interfaces with and is complimentary to the Mobile Wagering Sub-System 102 shown in FIG. 1. In the illustrative embodiment, the illustrative gambling league website is commercially identified as the PILOT GAMBLING LEAGUE™ (PGL). The illustrative PILOT GAMBLING LEAGUE™ provides functionality intended to promote player competition between players playing the same game, but in a multiplicity of venues that could be separated by hundreds of miles, and thereby enhancing the feelings of a community event and increasing interest in the associated wagering activity.

Referring back to FIG. 1, there are two technical components of the illustrative Gambling League Website. The first component is referred to as a GLW website server 120, which is accessed with a common browser, e.g. Internet Explorer, Chrome, Safari, or other such browser. Additionally, the GLW website server 120 may be accessed using a computing device 130 that is configured to run a custom Android or iOS "APP." The computing device may be wired or wireless and includes, by way of example, a PC, tablet or other such computing device that provides Internet access.

The illustrative GLW website server 120 includes a SOL Server database and a software architecture based on .NET, C# and other such computing languages. The illustrative GLW website server 120 is also communicatively coupled to the mobile wagering sub-system (MWS) 102 with an interface that allows players to log into the GLW 120 or the MWS 102 with the same screen name and password. Additionally, the GLW 120 and MWS 102 both support the common use of player-chosen avatars. Note, in the illustrative embodiment there is no requirement for players on the MWS 102 to login with a password, so that anonymous play is fully supported. However, if players do desire to identify themselves to the MWS 102 with their GLW 120 screen name and password, then they can have the benefit of having aspects of their play transferred to their GLW account. Information that may be transferred from the GLW 120 to the MWS 102 includes scores of tournament, prize winnings, play totals, play locations, number of play sessions, and other such game information.

In operation, periodic tournament scores may be tracked based on the results from the MWS 102 activity. Additionally, the periodic tournament scores are also available to each player that accesses the GLW website server 120. The type of data collected and corresponding data attributes may vary based upon jurisdictional regulations. In the illustrative embodiment, players may be identified by their chosen screen name and general location. The illustrative website server 120 presents the top players in each region and their corresponding scores and home town.

Figure 32:
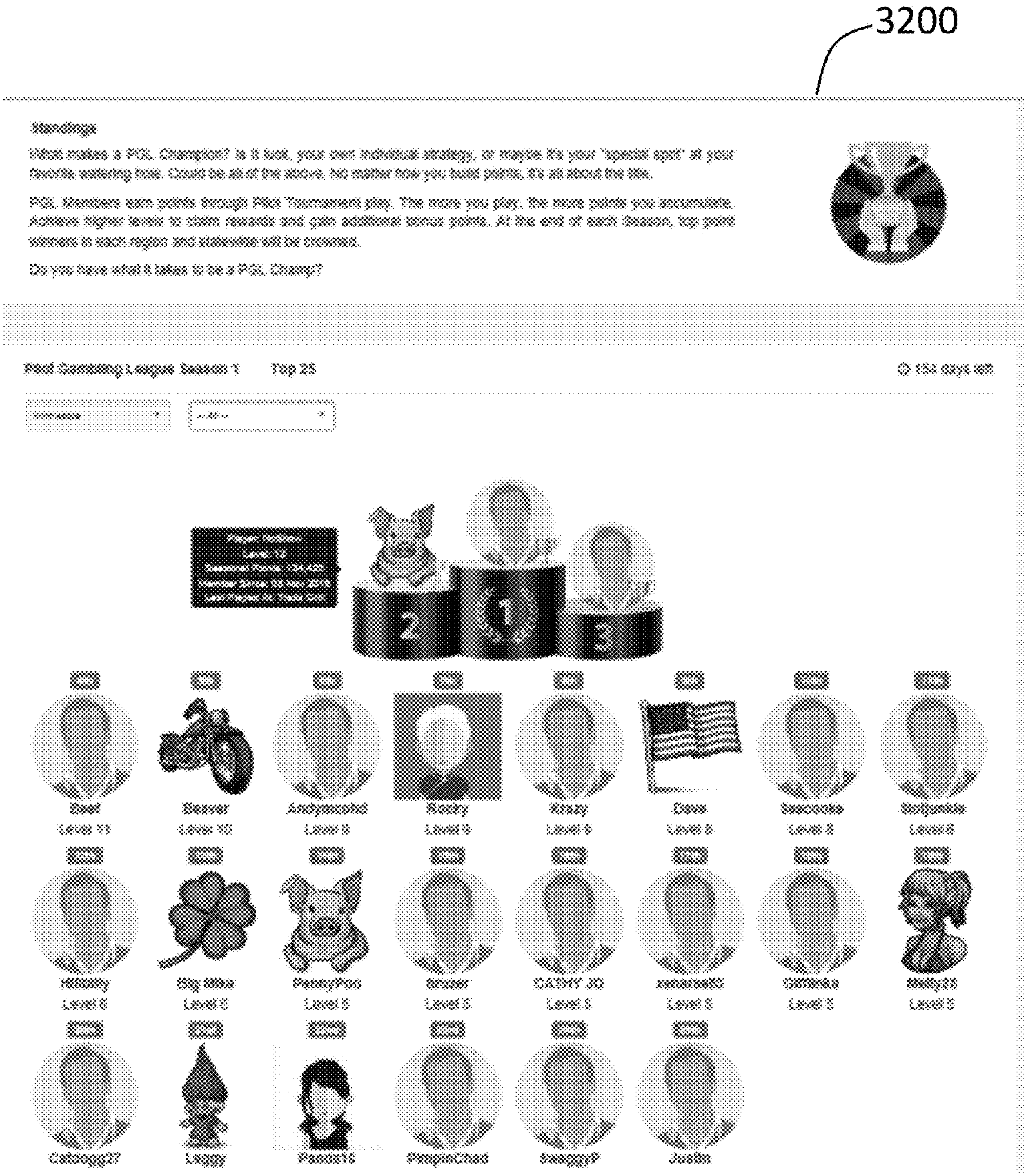
FIG. 32 shows an illustrative GLW screenshot of player standings in a regional or system competition.

FIG. 32 shows an illustrative screenshot of player standings in a regional or system competition. The illustrative screenshot 3200 includes the top players in a particular region.

Figure 33:
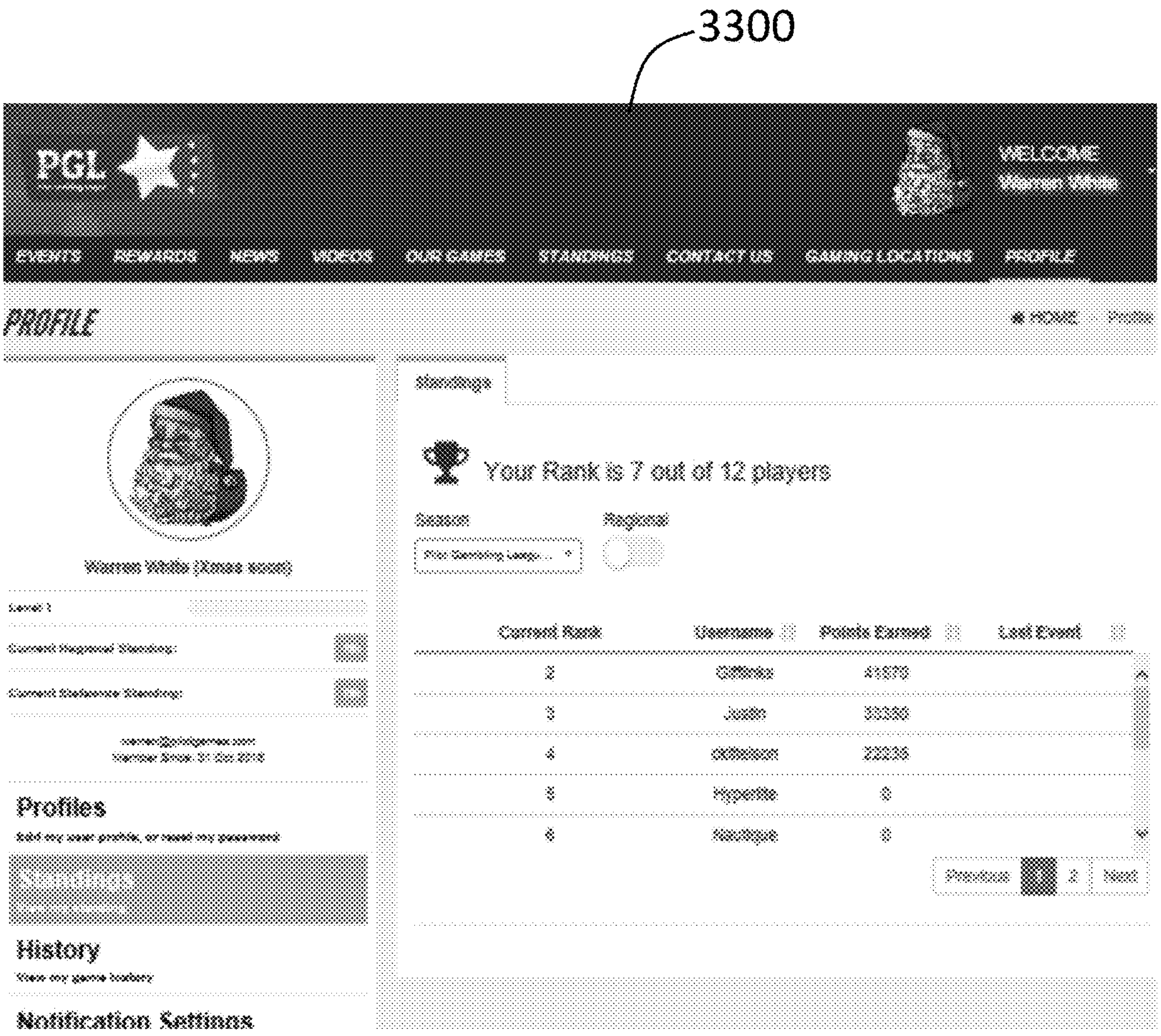
FIG. 33 shows an illustrative GLW portion of the player profile.

Referring to FIG. 33 there is shown a screenshot 3300 of an illustrative portion of the player profile. The screenshot includes the particular player's ranking and additional profile information including profiles, standings, history and notification settings.

Figure 34:
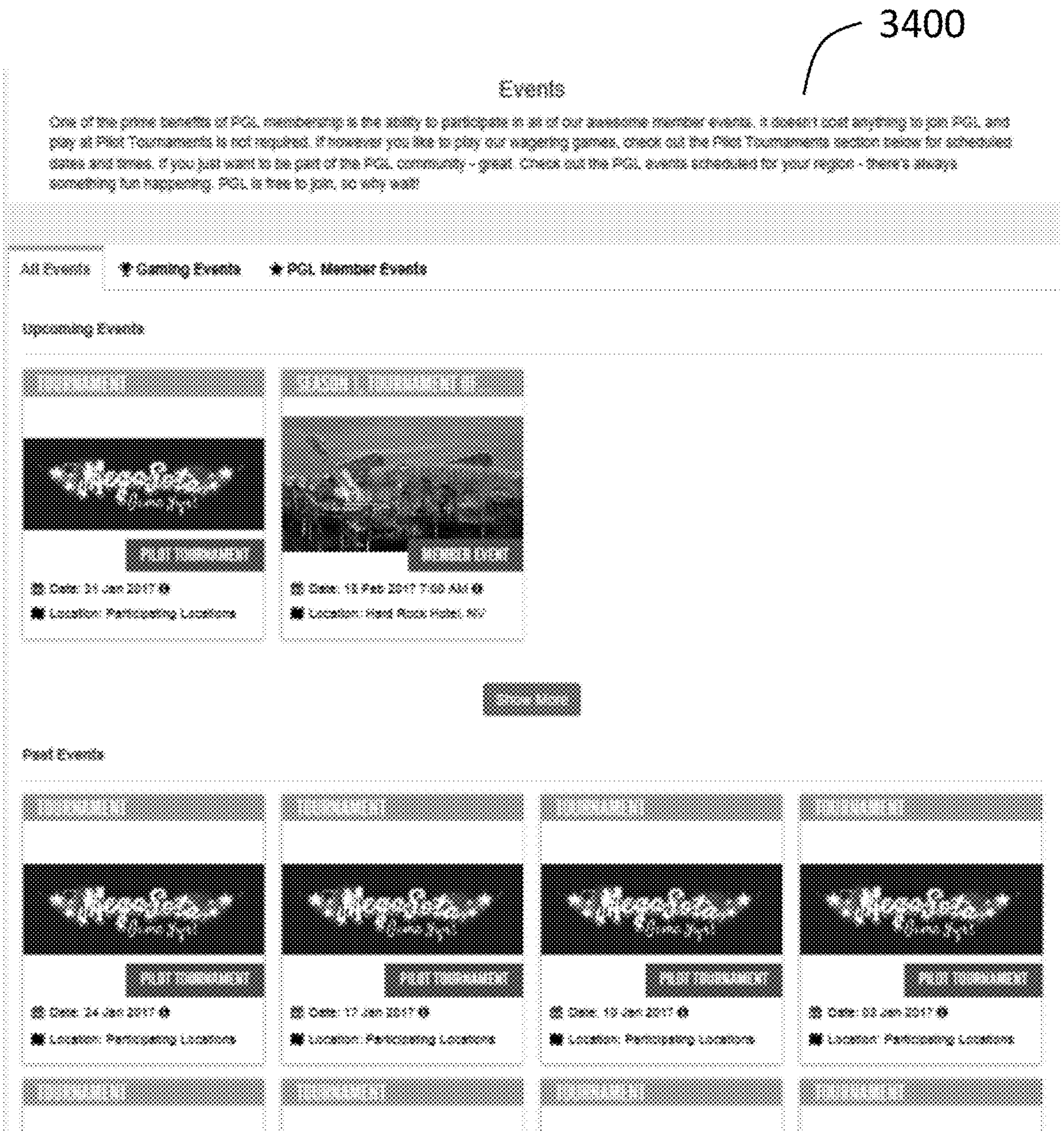
FIG. 34 shows illustrative GLW past events and future events.

Referring to FIG. 34 there is shown illustrative screenshot 3400 of past events and future events. By way of example and not of limitation, the past and future events are tournament events as described above.

Figure 35:
FIG. 35 shows a GLW web page that includes gaming venues that are communicatively coupled to the mobile wagering sub-system locations.

Referring to FIG. 35 there is shown a web page that includes gaming venues that are communicatively coupled to the mobile wagering sub-system locations. The players may access this "locations" web page 3500 to locate venues for game play that support the systems and method presented herein.

Figure 36:
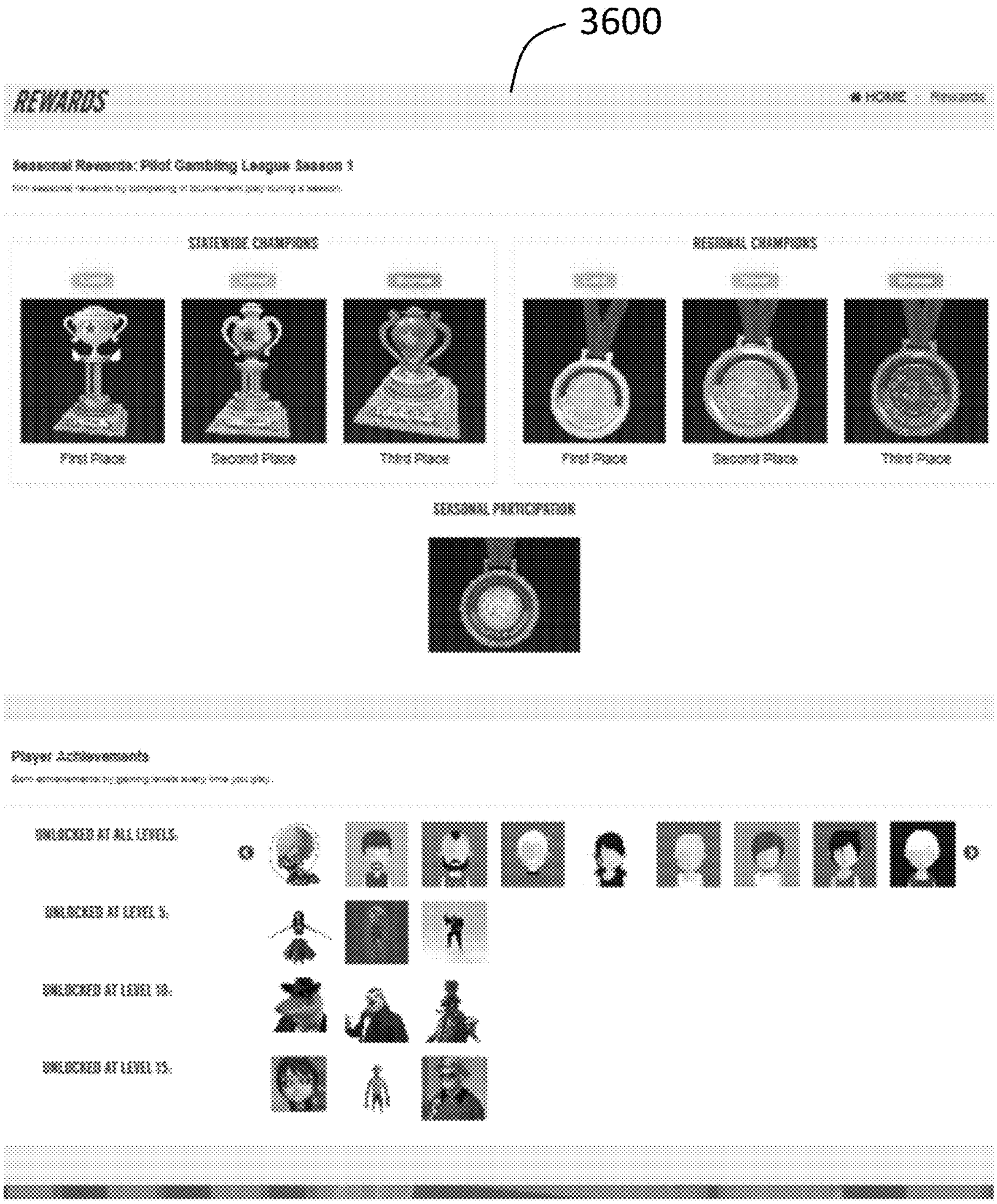
FIG. 36 shows an illustrative GLW screenshot of a player's available virtual rewards.

Referring to FIG. 36 there is shown an illustrative screenshot 3600 of a player's virtual rewards. For example, players may also qualify for "vanity awards." These vanity awards may be granted based on player performance. The vanity awards may provide an expanded choice of avatars, a graphic trophy or trophies that are associated with their screen names, and other such virtual items or awards. The vanity awards may be presented in at least one of the GLW website server 120, the mobile wagering sub-system 102 and the Video Presentation System 104. For example, if a player has won a regional virtual gold trophy prize, then the virtual gold trophy prize may be displayed on the VPS television when the player plays in a new tournament. The player's chosen screen name, avatar and the virtual gold trophy may be displayed on the various VPS television, which may be located in hundreds of participating venues.

Figure 37:
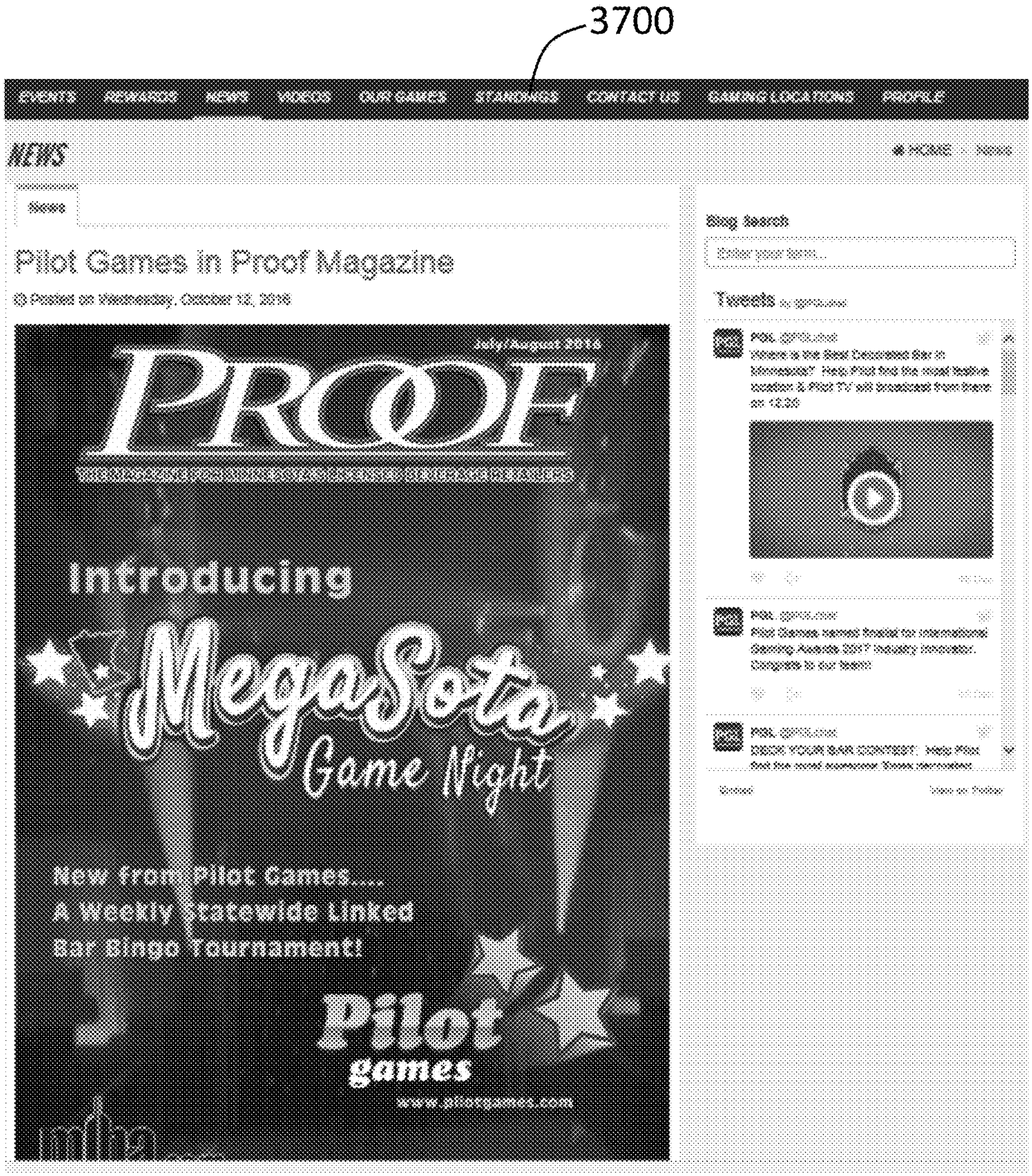
FIG. 37 shows an illustrative GLW screenshot of news, blogs and tweets.

Referring to FIG. 37 there is shown an illustrative screenshot 3700 of news, blogs and tweets for the Gaming League Website. The illustrative screenshot 3700 may be used to periodically invite GLW members to a regional tournament at a venue in the region. Additionally, non-wagering competitions may be set up at those venues where actual promotional prizes may be awarded. Furthermore, winners of regional tournaments may be invited to a Tournament of Champions, which will take place at a premium location. Further still, a Grand Prize winner may also be selected for a promotional cash or merchandise prize. These competitions or events may be shown live or on video to all players in their normal gaming venues using the Video Presentation System 104.

Figure 38:
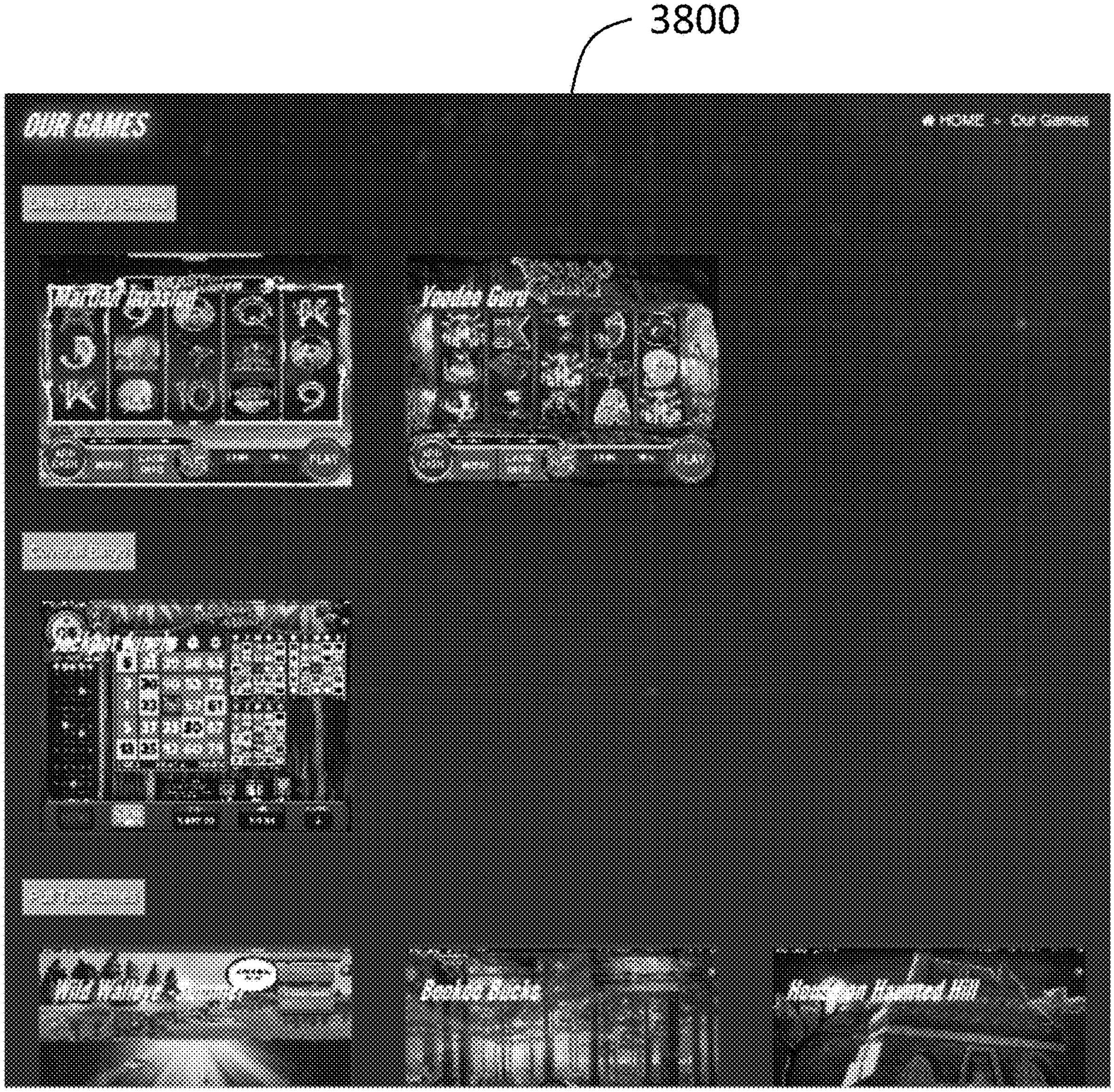
FIG. 38 shows an illustrative GLW embodiment of MWS game libraries presented to players.

Referring to FIG. 38 there is shown an illustrative screenshot of the MWS 102 game libraries presented to players. The screenshot 3800 shows that there are three different game types, namely, tournament bingo games, coverall bingo and pull tab games.

The GLW 120 and MWS 102 systems are communicatively coupled to the VPS 104, which is communicatively coupled to the VPS video display as shown in FIG. 1. The VPS display provides the opportunity to highlight GLW players and the GLW events. The VPS display may be used to highlight regional standings, announce regional winners, show live or video clips of regional events, show live or video clips of the Tournament of Champions, show Interviews with PGL players, and other such GLW information. This close interaction between the VPS 104, MWS 102 and GLW 120 creates a social atmosphere, a spirit of competition, a sense of accomplishment, and improve the success of the wagering enterprise.

The illustrative gaming systems and methods presented above may include a plurality of server applications that are configured to provide high-availability and redundancy, processes all inputs, generates outputs, and maintains a central database for accounting, game play, system configuration data, and other such data types. By way of example and not of limitation, critical system data regarding clients may be maintained on a repository associated with the illustrative gaming system. Historical games results and leader board information may be maintained on a remote server and/or the wagering sub-system. Printable versions of this information may be available on the portal.

The illustrative client devices described in the illustrative embodiments are communicatively coupled to a gaming system database, which stores client device data. Additionally, the illustrative gaming system database is configured to be secure. Furthermore, the illustrative gaming system database manages the data that is received from client devices in geographically dispersed gaming venues.

The illustrative centralized gaming system may be disposed in a central site as described herein. The illustrative centralized gaming system may process information received over the internet backbone from client devices such as mobile devices, management terminals and other such client devices.

The illustrative MWS sub-system manages the funding of game play and operation of wagering games and overall system management for authorized mobile devices and authorized non-mobile devices. In some embodiments, wagering game operations and game play funding are performed locally on authorized non-mobile devices, such as EGMs, by a processor and memory of the non-mobile device. All gaming messaging between servers and client devices is sent and received over a secure internet network that directs network traffic to the appropriate server elements. A Portal service receives messages from management terminals and provides functionality to authorized users to control the system and access real-time and historical data. All server applications are structured to be deployable in a virtual server environment, configured for high availability with fail-over capabilities on hardware components and database structures that keep a multiplicity of all data records.

By way of example and not of limitation, the games supported by the wagering system include electronic pull-tabs, linked bingo, high-speed linked bingo with entertainment, bingo tournaments, slot games, video poker, multiplayer poker, blackjack, roulette, and other casino or entertainment games. The wagering system may further support slot tournaments, EGM tournaments, video lottery tournaments, and/or video poker tournaments.

Many game types, including electronic pull-tabs and the entertainment aspect of linked bingo have bonus modes that award prizes based on a theme-specific animation. Often these features take more play time than a conventional game. While these features are entertaining, many players who have played the games for some period of time find the time spent in animation wasteful. Therefore, this system features a unique option at the beginning of any potentially long bonus animation. The player is presented with a screen announcing the bonus and then is presented with an option to proceed with the bonus animation or bypass the animation and go directly to the prize award at the end of the animation.

It is clear that the infrastructure of the MWS with the added capabilities of the VPS can support a wide variety of game types, in addition to the ones described herein. Those games include slot machine games, video lottery games, poker, blackjack, skill-based wagering games, among others.

It should be noted that in jurisdictions that allow gaming outside of physically licensed areas some of the above-mentioned security considerations may be relaxed or replaced by more appropriate mechanisms.

It is to be understood that the detailed description of illustrative embodiments are provided for illustrative purposes. Thus, the degree of software modularity for the transactional system and method presented above may evolve to benefit from the improved performance and lower cost of the future hardware components that meet the system and method requirements presented. The scope of the claims is not limited to these specific embodiments or examples. Therefore, various process limitations, elements, details, and uses may differ from those just described, or be expanded on or implemented using technologies not yet commercially viable, and yet still be within the inventive concepts of the present disclosure. The scope of the invention is determined by the following claims and their legal equivalents.

What is claimed is:

1. A centralized gaming system comprising:

a gaming venue including a plurality of gaming machines;

a wagering sub-system communicatively coupled to each of the plurality of gaming machines via a Wide Area Network (WAN), wherein each gaming machine is associated with a particular wagering game session and corresponding wagering game result;

the wagering sub-system receives the particular wagering game result associated with each gaming machine via a first secure networking protocol;

a video presentation sub-system that is communicatively coupled to the wagering sub-system;

wherein the video presentation sub-system receives a first wagering game session result corresponding to a first wagering game session that is associated with a first gaming machine of the plurality of gaming machines via a second secure networking protocol selected from a plurality of secure networking protocols that includes the first secure networking protocol from the wagering sub-system;

wherein the video presentation sub-system receives a second wagering game session result corresponding to a second wagering game session associated with a second gaming machine of the plurality of gaming machines via the second secure networking protocol from the wagering sub-system;

wherein the video presentation sub-system generates an integrated video broadcast announcement, which combines the first wagering game session result, the second wagering game session result, and a live host commentary input;

a stationary monitor client communicatively coupled to the video presentation sub-system; and the stationary monitor client displays the integrated video broadcast announcement from the video presentation sub-system.

2. The centralized gaming system of claim 1 wherein the first wagering game session includes a first bonus game session; and wherein the second wagering game session includes a second bonus game session.

3. The centralized gaming system of claim 1 wherein each wagering game session includes a bonus game session.

4. The centralized gaming system of claim 1 wherein each gaming machine generates the wagering game result corresponding to the particular gaming machine.

5. The centralized gaming system of claim 1 wherein a gaming server generates the wagering game result associated with each wagering game session.

6. The centralized gaming system of claim 1 wherein each gaming machine is one of a video lottery terminal, a slot machine, an electronic game machine, and a video poker terminal.

7. The centralized gaming system of claim 1 wherein the integrated video broadcast announcement further includes a first bonus game session result, a second bonus game session result, and a commentary about the first bonus game session result and the second bonus game session result.

8. The centralized gaming system of claim 1 further comprising a second plurality of devices associated with a second gaming venue that includes a second stationary monitor client, wherein the second stationary monitor client is communicatively coupled to the video presentation sub-system and the second stationary monitor client displays the video output integrated video broadcast announcement.

9. The centralized gaming system of claim 1 wherein a tournament session includes each wagering game session;

wherein the tournament session further includes a plurality of prizes that are awarded when each wagering game session is completed;

wherein a plurality of player rankings correspond to the awarded prizes; and wherein the player rankings are presented on at least one of the gaming machines.

10. The centralized gaming system of claim 1 wherein a tournament session includes each wagering game session;

wherein the tournament session further includes a plurality of prizes that are awarded when each wagering game session is completed;

wherein a plurality of player rankings correspond to the awarded prizes; and wherein the player rankings are presented on the stationary monitor client.

11. The centralized gaming system of claim 1 further comprising a progressive prize, wherein the progressive prize accumulates from a percentage contribution from each wager input.

12. A centralized gaming method comprising:

associating each wager input of a plurality of wager inputs with a particular wagering game session on one gaming machine of a plurality of gaming machines, wherein each wager input is communicated to a wagering sub-system via a wide area network using a first secure networking protocol;

communicatively coupling to each of the plurality of gaming machines with the wagering sub-system via the wide area network, wherein at least one of the plurality of gaming machines is disposed in a gaming venue;

receiving, by the wagering sub-system via a second secure networking protocol selected from a plurality of secure networking protocols that includes the first secure networking protocol, a wagering game result that is associated with the particular wagering game session;

communicatively coupling a video presentation sub-system to the wagering sub-system;

receiving, by the video presentation sub-system via a third secure networking protocol selected from the plurality of secure networking protocols that includes the first secure networking protocol and the second networking protocol, a first wagering game session result corresponding to a first wagering game session that is associated with a first gaming machine of the plurality of gaming machines from the wagering sub-system;

receiving, by the video presentation sub-system via the second secure networking protocol, a second wagering game session result corresponding to a second wagering game session associated with a second gaming machine of the plurality of gaming machines from the wagering sub-system;

combining, by the video presentation sub-system, the first wagering game session result, the second wagering game session result, and a live host commentary input to generate an integrated video broadcast announcement;

communicatively coupling a stationary monitor client to the video presentation sub-system via the wide area network;

receiving, by the stationary monitor client, the integrated video broadcast announcement from the video presentation sub-system via the wide area network; and displaying the integrated video broadcast announcement at the stationary monitor client.

13. The centralized gaming method of claim 12 wherein the first wagering game session includes a first bonus game session; and wherein the second wagering game session includes a second bonus game session.

14. The centralized gaming method of claim 12 wherein each wagering game session includes a bonus game session.

15. The centralized gaming method of claim 12 wherein each gaming machine generates the wagering game result corresponding to the particular gaming machine and transmits that wagering game result to the wagering sub-system.

16. The centralized gaming system of claim 12 wherein a gaming server generates the wagering game result associated with each wagering game session and transmits that wagering game result to the wagering sub-system.

17. The centralized gaming method of claim 12 wherein each gaming machine is one of a video lottery terminal, a slot machine, an electronic game machine, and a video poker terminal.

18. The centralized gaming method of claim 12 wherein the integrated video broadcast announcement further includes a first bonus game session result, a second bonus game session result, and a commentary about the first bonus game session result and the second bonus game session result.

19. The centralized gaming method of claim 12 further comprising:

communicatively coupling a second stationary monitor client to the video presentation sub-system via the wide area network, wherein the second stationary monitor client disposed in a second venue;

receiving, by the second stationary monitor client, the integrated video broadcast announcement from the video presentation sub-system via the wide area network; and displaying the integrated video broadcast announcement at the second stationary monitor client.

20. The centralized gaming method of claim 12 further comprising:

operating a tournament session that includes each wagering game session;

awarding one of a plurality of prizes when each wagering game session is completed, wherein a plurality of player rankings correspond to the awarded prizes; and presenting the player rankings on at least one of the gaming machines.

21. The centralized gaming method of claim 12 further comprising:

operating a tournament session that includes each wagering game session;

awarding one of a plurality of prizes when each wagering game session is completed, wherein a plurality of player rankings correspond to the awarded prizes; and presenting the player rankings on at least one of the stationary monitor client.

22. The centralized gaming method of claim 12 further comprising accumulating a progressive prize from a percentage contribution from each wager input.

23. A centralized tournament gaming system comprising:

a plurality of casino slot machines, wherein each casino slot machine of the plurality of casino slot machines is communicatively coupled to a wagering sub-system;

a centralized tournament including a casino slot machine tournament result and a casino slot machine tournament session that occurs at a scheduled tournament time for a casino slot machine tournament duration of time, wherein the casino slot machine tournament session includes a plurality of game sessions during the casino slot machine tournament duration of time;

a game session prize awarded by the wagering sub-system during the casino slot machine tournament session when a game session output satisfies a game session prize requirement;

a casino slot machine tournament session prize awarded by the wagering sub-system after the plurality of game sessions are completed;

a video presentation sub-system communicatively coupled to the wagering sub-system;

wherein the video presentation sub-system generates an integrated video broadcast announcement about the casino slot machine tournament session, which combines the casino slot machine tournament result and a live host commentary input;

a stationary monitor client communicatively coupled to the video presentation sub-system; and the stationary monitor client displays the integrated video broadcast announcement from the video presentation sub-system.

24. The system of claim 23 wherein the game session prize requirement includes a score based on a plurality of points.

25. The system of claim 23 further comprising a casino slot machine tournament session prize payout structure.

26. The system of claim 23 further comprising a leader board that includes player rankings associated with the casino slot machine tournament session.

27. The system of claim 26 wherein the leader board is communicated to each casino slot machine of the plurality of casino slot machines.

28. The system of claim 26 wherein the leader board is communicated to the stationary monitor client.

29. The system of claim 23 wherein the video presentation sub-system receives a first casino slot machine game session result corresponding to a first casino slot machine game session that is associated with a first casino slot machine of the plurality of casino slot machines from the wagering sub-system;

wherein the video presentation sub-system receives a second casino slot machine game session result corresponding to a second casino slot machine game session that is associated with a second casino slot machine of the plurality of casino slot machines from the wagering sub-system; and wherein the integrated video broadcast announcement further includes commentary about at least one of the first game session result and the second game session result.

30. The system of claim 23 wherein each casino slot machine includes a user interface that displays at least one of a plurality of game content, a plurality of game results, and a plurality of combinations of game content and game results associated with the casino slot machine tournament session.

31. The system of claim 23 wherein the stationary monitor client disposed at a gaming venue.

32. A method of operating a centralized tournament comprising:

communicatively coupling each casino slot machine of a plurality of casino slot machines to a wagering sub-system;

operating, by the wagering sub-system, a casino slot machine tournament session that occurs at a scheduled tournament time for a casino slot machine tournament duration of time, wherein the casino slot machine tournament session includes a plurality of game sessions during the casino slot machine tournament duration of time and a casino slot machine tournament result;

awarding, by the wagering sub-system, a game session prize during the casino slot machine tournament session when a game session output satisfies a game session prize requirement;

awarding, by the wagering sub-system, a casino slot machine tournament session prize after the plurality of game sessions are completed;

communicatively coupling a video presentation sub-system to the wagering sub-system;

generating, by the video presentation sub-system, an integrated video broadcast announcement about the casino slot machine tournament session that includes the casino slot machine tournament result and a live host commentary input;

communicatively coupling a stationary monitor client to the video presentation sub-system; and displaying, by the stationary monitor client, the integrated video broadcast announcement.

33. The method of claim 32 wherein the game session prize requirement includes a score based on a plurality of points.

34. The method of claim 32 further comprising generating a casino slot machine tournament session prize payout structure before initiating the casino slot machine tournament session and after closing entry to the casino slot machine tournament session.

35. The method of claim 32 further comprising broadcasting a leader board that includes player rankings associated with the casino slot machine tournament session.

36. The method of claim 35 further comprising communicating the leader board to each authorized device of the plurality of authorized devices.

37. The method of claim 35 further comprising communicating the leader board to the stationary monitor client.

38. The method of claim 32 wherein the integrated video broadcast announcement further includes commentary about at least one game session of the plurality of game sessions.

39. The method of claim 32 wherein each casino slot machine includes a user interface that displays at least one of a plurality of game content, a plurality of game results, and a plurality of combinations of game content and game results associated with the slot machine tournament session.

40. The method of claim 32 wherein the stationary monitor client disposed at a gaming venue.

* * * * *